(12) United States Patent
Kope et al.

(10) Patent No.: US 8,047,729 B2
(45) Date of Patent: *Nov. 1, 2011

(54) ENHANCED CAMERA TRANSPORT SYSTEM AND METHOD

(75) Inventors: Tyler R. M. Kope, Seattle, WA (US); Ronald D. Henry, Seattle, WA (US)

(73) Assignee: Black Rapid, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/964,047

(22) Filed: Dec. 9, 2010

(65) Prior Publication Data

US 2011/0081143 A1 Apr. 7, 2011

Related U.S. Application Data

(63) Continuation of application No. 12/105,222, filed on Apr. 17, 2008, now Pat. No. 7,866,899.

(60) Provisional application No. 60/912,382, filed on Apr. 17, 2007.

(51) Int. Cl.
*G03B 17/00* (2006.01)
*B65D 85/38* (2006.01)

(52) U.S. Cl. ..................................... 396/423; 206/316.2

(58) Field of Classification Search .................. 396/423; 206/316.2

See application file for complete search history.

(56) References Cited

U.S. PATENT DOCUMENTS

| | | | |
|---|---|---|---|
| 3,305,148 A | 2/1967 | Zimmerman | |
| 3,905,526 A | 9/1975 | Tomatsuri | |
| 4,136,726 A | 1/1979 | Lee | |
| 4,247,028 A | 1/1981 | Maitani et al. | |
| 4,328,917 A * | 5/1982 | Reeberg | 224/254 |
| 4,649,973 A | 3/1987 | Uchin | |
| 5,014,892 A | 5/1991 | Copeland | |
| 5,065,919 A | 11/1991 | Sims | |
| 5,172,838 A | 12/1992 | Rowell et al. | |
| 5,360,149 A * | 11/1994 | Lucot | 224/257 |
| 5,375,749 A | 12/1994 | Oliva | |
| 6,662,984 B2 | 12/2003 | Mor | |
| 7,387,225 B2 | 6/2008 | Fox | |
| 7,866,899 B2 * | 1/2011 | Kope et al. | 396/423 |

FOREIGN PATENT DOCUMENTS

| | | |
|---|---|---|
| GB | 680194 | 1/1952 |
| JP | 20000308512 | 11/2000 |
| JP | 2002196412 | 7/2002 |
| JP | 2004320695 | 11/2004 |

OTHER PUBLICATIONS

U.S. Appl. No. 12/105,222, filed Apr. 17, 2008, Kope.
U.S. Appl. No. 12/841,499, filed Jul. 22, 2010, Kope.

* cited by examiner

*Primary Examiner* — Rodney Fuller
(74) *Attorney, Agent, or Firm* — Davis Wright Tremaine LLP; George C. Rondeau, Jr.

(57) ABSTRACT

An enhanced camera transport system and method includes a strap and coupler. The coupler is configured to engage with an attachment point on a camera otherwise reserved by engagement with a camera stand such as a tripod, monopod, or the like. Following general camera construction, the attachment point is found on the bottom of the camera. In some implementations, the coupler is slideably attached to the strap to assist with repositioning of the camera from a transport position to a picture taking position. Other implementations include an enclosure for storage of the camera while not being used.

30 Claims, 38 Drawing Sheets

US 8,047,729 B2

ENHANCED CAMERA TRANSPORT SYSTEM AND METHOD

CROSS-REFERENCE TO RELATED APPLICATIONS

This application claims priority benefit of U.S. patent application Ser. No. 12/105,222 filed Apr. 17, 2008, and of U.S. Provisional Application No. 60/912,382 filed Apr. 17, 2007, the contents of both of which are incorporated herein in their entireties.

BACKGROUND OF THE INVENTION

1. Field of the Invention

The present invention is generally related to camera equipment.

2. Description of the Related Art

Conventional camera storage and carrying systems help to store and transport cameras when not in use. Unfortunately, they include aspects that can hinder retrieval of a camera being stored or transported so that photographic opportunities can be missed.

BRIEF DESCRIPTION OF THE SEVERAL VIEWS OF THE DRAWING(S)

DETAILED DESCRIPTION OF THE INVENTION

Figure 1:
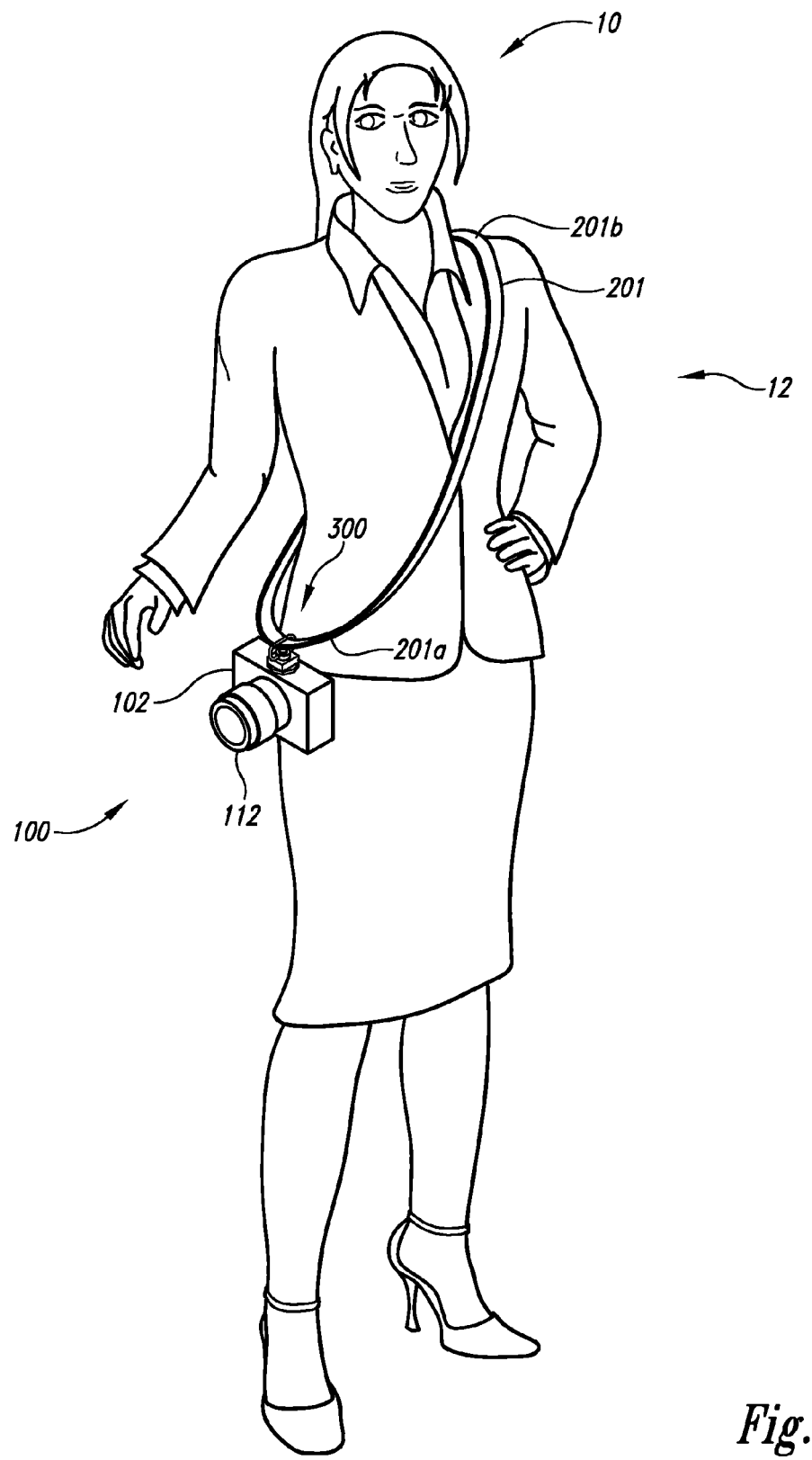
FIG. 1 is a view of an implementation of a camera transport system, shown with the camera in a resting position, and the strap being worn diagonally across the torso of a user.

As discussed herein, an enhanced camera transport system and method includes a strap 201 and coupler 300. The strap is worn by a user 10, typically over the user's shoulder. The coupler is configured to engage with an attachment point on a camera 102 otherwise reserved by engagement with a camera stand such as a tripod, monopod, or the like. Following general camera construction, the attachment point is found on the bottom of the camera. In some implementations, the coupler is slideably attached to the strap to assist with repositioning of the camera from a transport position to a picture taking position by sliding the camera along the strap. Other implementations include an enclosure 400 for storage of the camera while it is not being used.

The strap 201 can be used for retention, support, and/or suspension of the coupler 300, camera 102, and enclosure 400. In some implementations holders, receptacles, pouches, or other containers can be integrated within the strap to storing items, such as a phone, flashlight, memory, film, batteries, keys, business cards, or other items. The strap can be worn, by the user, diagonally across the torso like a bandolier, or worn vertically from a shoulder. The strap can further include a variety of adjusters for adjusting its length, tension and fit. Further included can be a variety of release mechanisms and fasteners. Still further included in the strap can be a variety of pads or materials to promote comfort for the user, and to further maintain the strap in a proper location for use.

In implementations the coupler 300 can be used to couple the strap 201 to a camera, video camera, or image capture device, and thus further secure the device to a user. The coupler can include a first portion 301a that has a threadable element that engages with a conventional threadable stand socket (such for a tripod or a monopod) of a camera or lens. Further included can be a lock nut or resilient material residing between the coupler and the camera, or lens, to help promote a secure engagement of the coupler to the camera or lens.

The coupler can include a second portion 301b, like a threaded coupler, that slideably engages with the strap 201 that allows the camera 102 to be moved along the length of the strap, from a storage or transport location, to a resting position, and further to a shooting position and back again into the resting position or storage location. Further included in the first portion of the coupler can be additional components to allow for quick engagement and disengagement of the coupler with the strap. The coupler can include a tether to locate the camera a distance away from the strap, and thus a distance from the user. The coupler can be configured to components with a multitude of various rotational axes to promote proper placement of the camera on the user, as well as prevention of binding or tangling of the system.

Compartments can be included in the enclosure 400 for stowing camera components, such as a camera, lens, flash, or other auxiliary camera components in a protected location when not in use, while leaving the components readily accessible for use. The compartments of the enclosure can include closures to envelope the camera gear in a safe environment. To promote a safe environment for the camera components, the storage compartments can be made, in part or in whole, of resilient materials, padded materials, and/or water or chemical resistant materials. Further included in the enclosure can be one or more support straps, such as used on a backpack, handbag, or bandolier style bag. The support straps can also include a variety of adjusters and/or release mechanisms. Further included on the support straps can exist receptacles for holding and permitting access to various items, such as a phone, flashlight, memory, film, batteries, keys, business cards, or other items.

Figure 2:
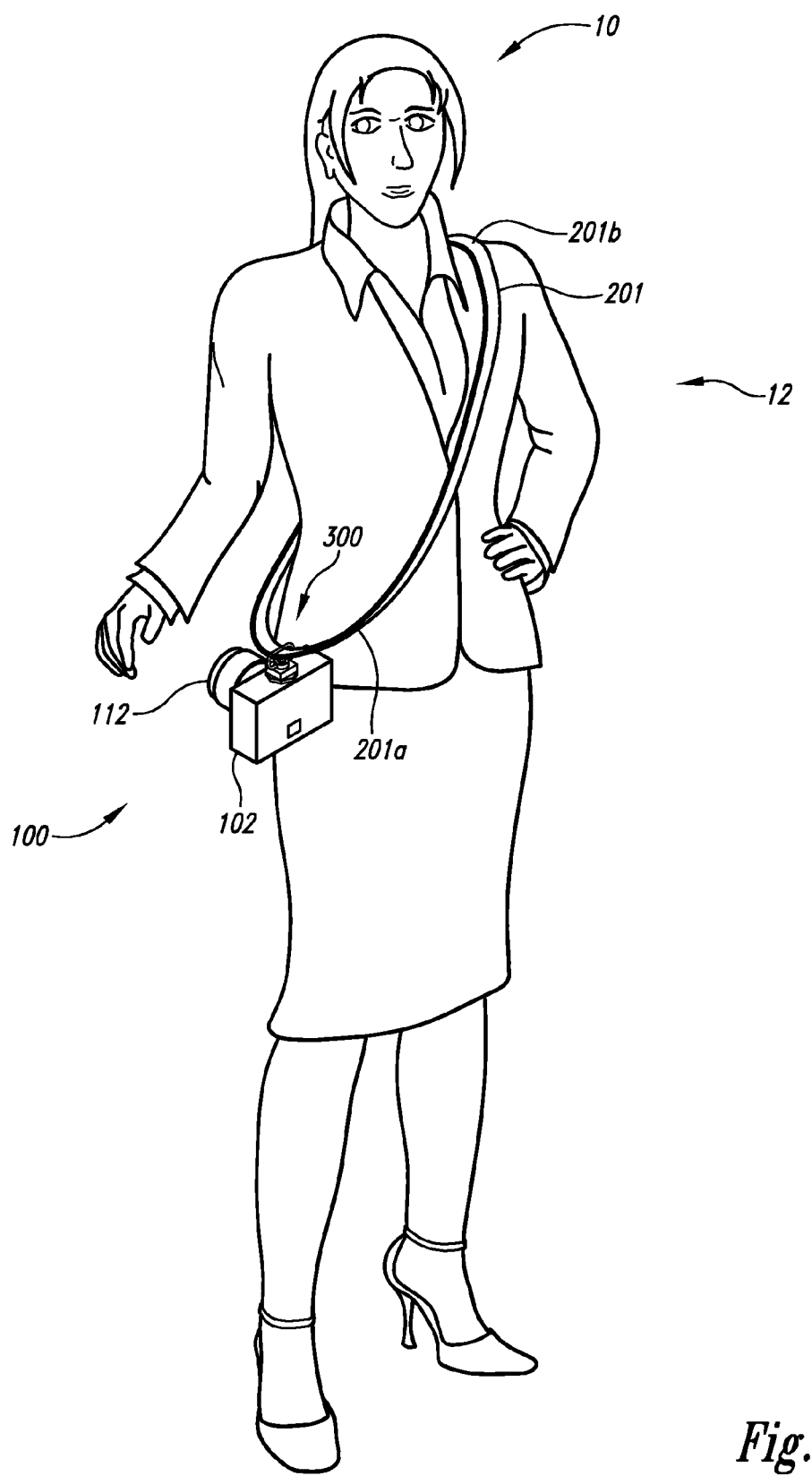
FIG. 2 is a view of the same system depicted in FIG. 1, shown in an alternate resting position.
Figure 3:
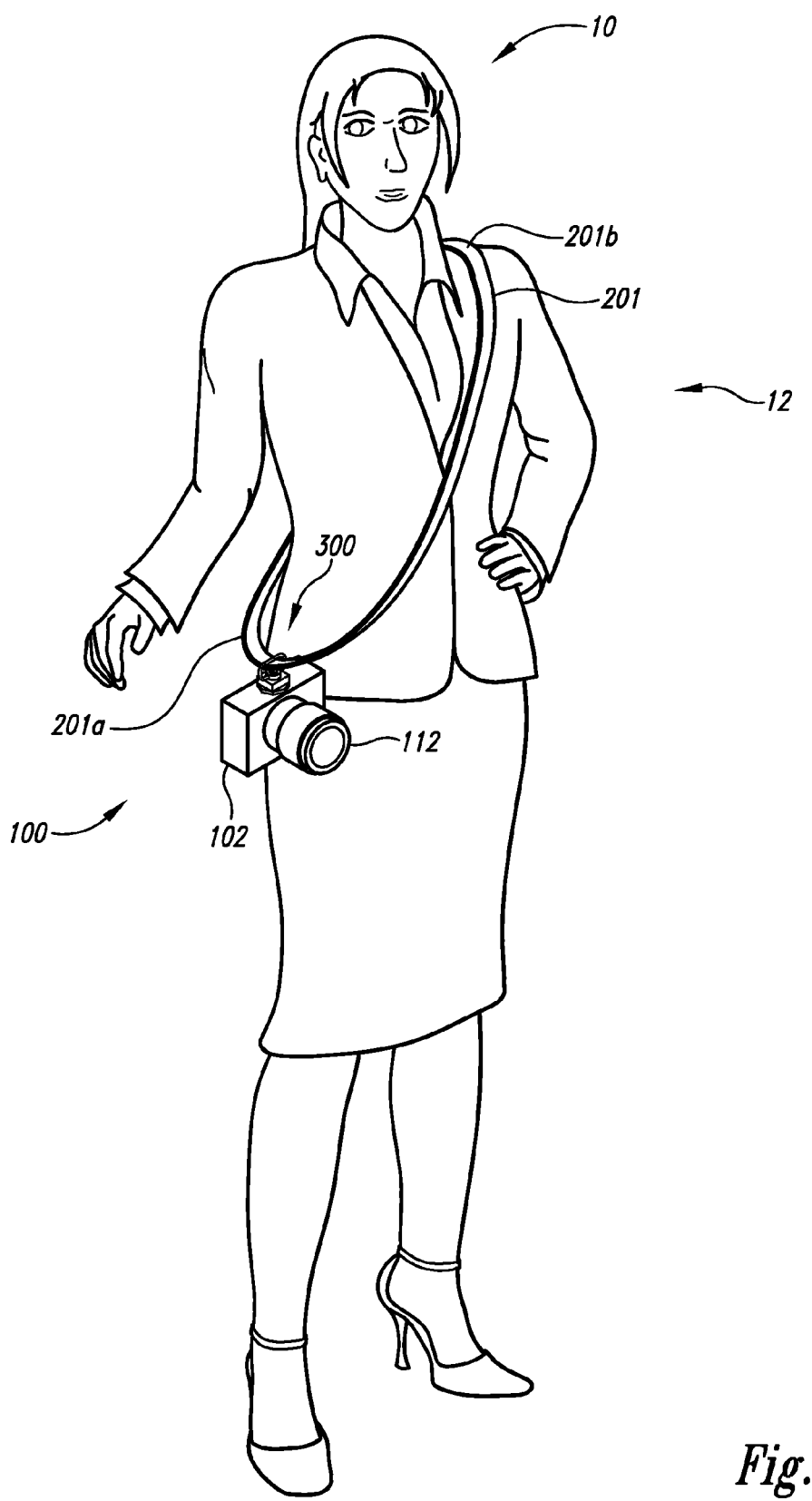
FIG. 3 is a view of the same system depicted in FIG. 1, shown in a further alternate resting position.

As shown in FIG. 1, a system 100 can include of a strap 201 with a first end portion 201a and a second end portion 201b. In some implementations, the strap 201 has a flat sectional profile as shown and in other implementations the strap can have other sectional profiles such as including oblong and round. The strap 201 is formed into a loop and sized to fit over the torso 12 of a user 10, and worn diagonally, like a bandolier. A camera 102, with an engagement portion configured to receive an engagement portion of a tripod, also know as a stand socket in some implementations is slideably, rotatably, pivotally, and releasably coupled to the strap 201 via a coupler 300. The camera 102 can then rest near the first end portion 201a of the strap 201 in various positions as desired by the user, when not in use. Such resting positions for the camera 102 can include hanging topside-down with the lens 112 pointing away from the side of the user (as shown in FIG. 1), towards the rear of the user (as shown in FIG. 2), or towards the front of the user (as shown in FIG. 3).

Figure 4:
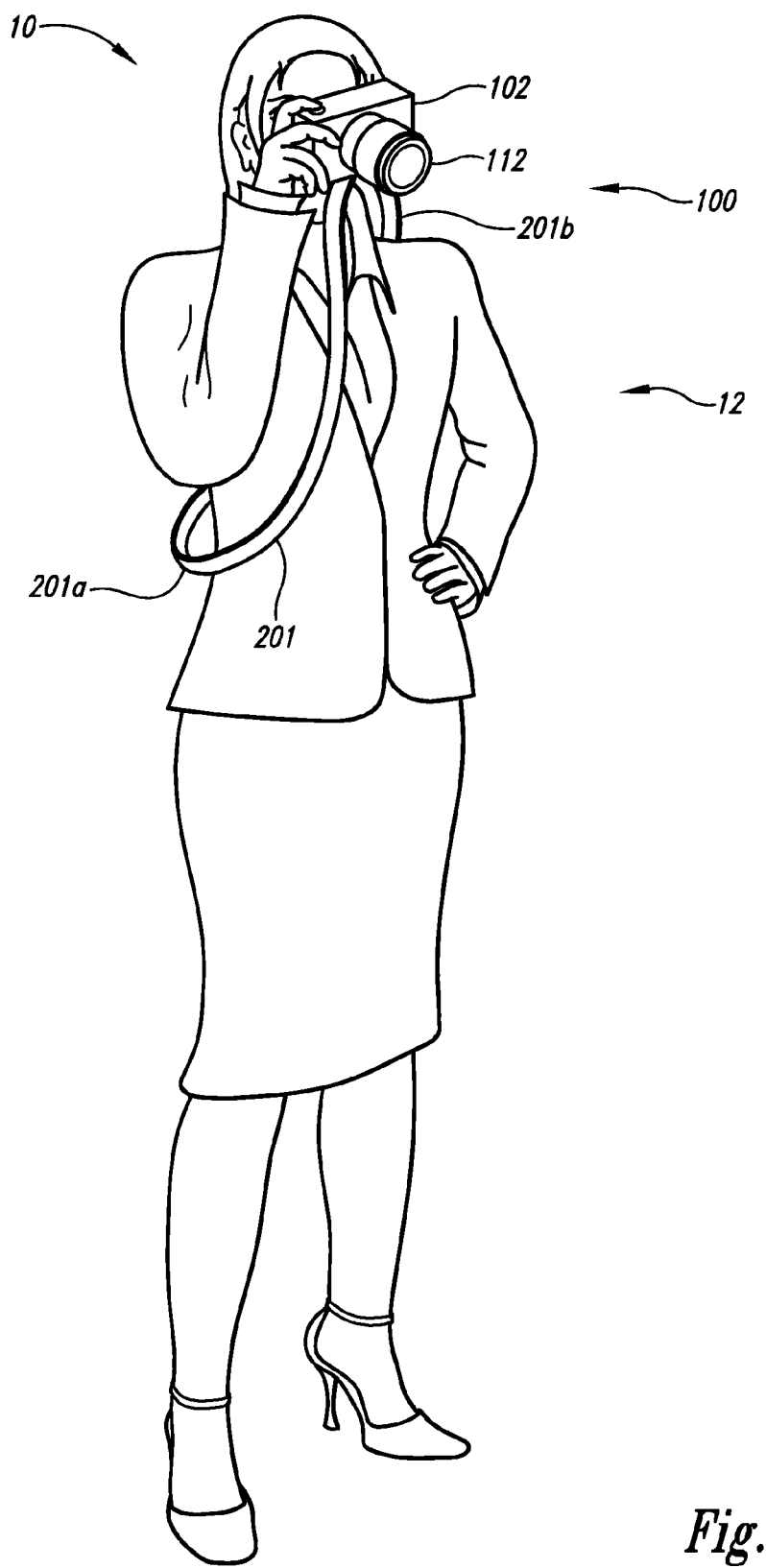
FIG. 4 is a view of the system depicted in FIG. 1, shown with the camera in a shooting position.
Figure 5:
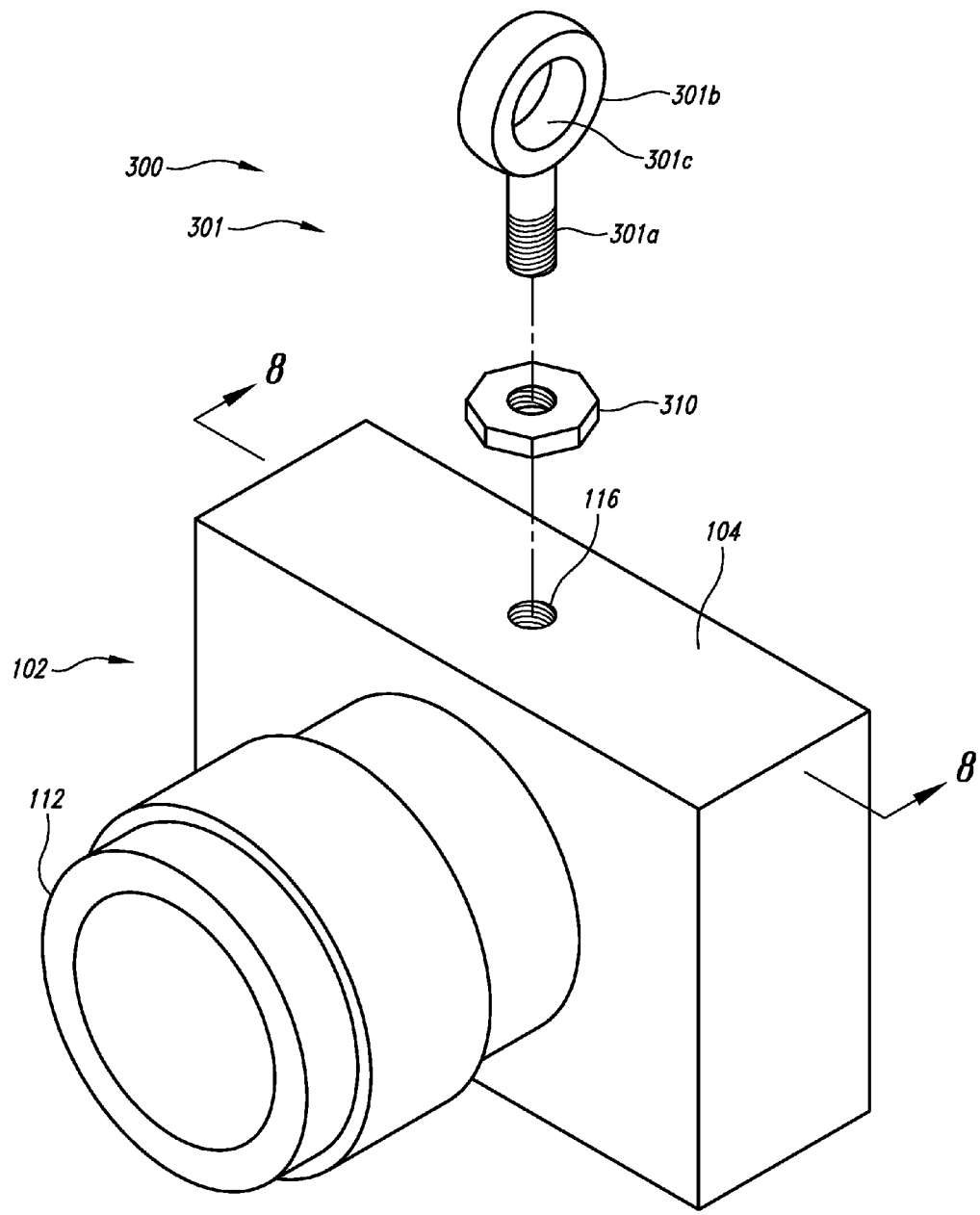
FIG. 5 is a perspective view of an exploded assembly of an implementation of the coupler.
Figure 8:
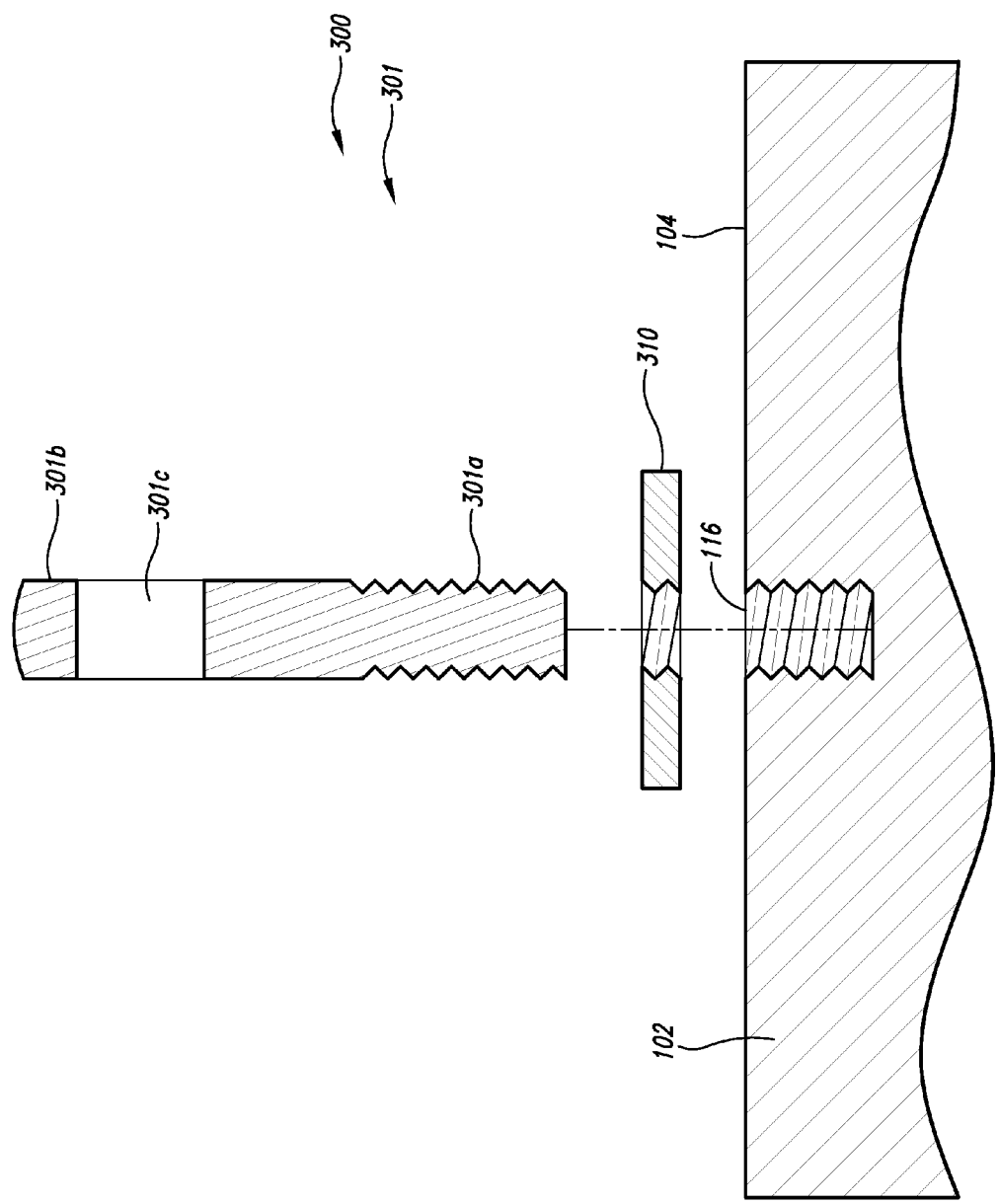
FIG. 8 is a cross sectional view of the implementation depicted in FIG. 5.

The system 100 is depicted in FIG. 4 with the camera 102 topside-up in a shooting position near the second end portion 201b of the strap 201, and being held by the user 10 for facilitating use of the camera to take a picture. A first implementation 301 of the coupler 300 is shown in FIG. 5 and FIG. 8 to be received for engagement by the camera 102. The first implantation 301 has a first portion 301a, a second portion 301b with an aperture 301c. The bottom 104 of the camera 102 having an engagement portion 116, also known as a tripod socket or a stand socket, configured to receive an engagement portion of a tripod, threadably accepts the first portion 301a of the first implementation 301 of the coupler 300. A lock nut 310 is shown to threadably engage with the first portion 301a of the coupler to promote a secure coupling of the first implementation 301 with the stand socket 116 of the camera. The coupler has a second portion 301b shaped to have an aperture 301c to receive a strap 201, not shown, therethrough, and be slideably engagable with the strap.

Figure 6:
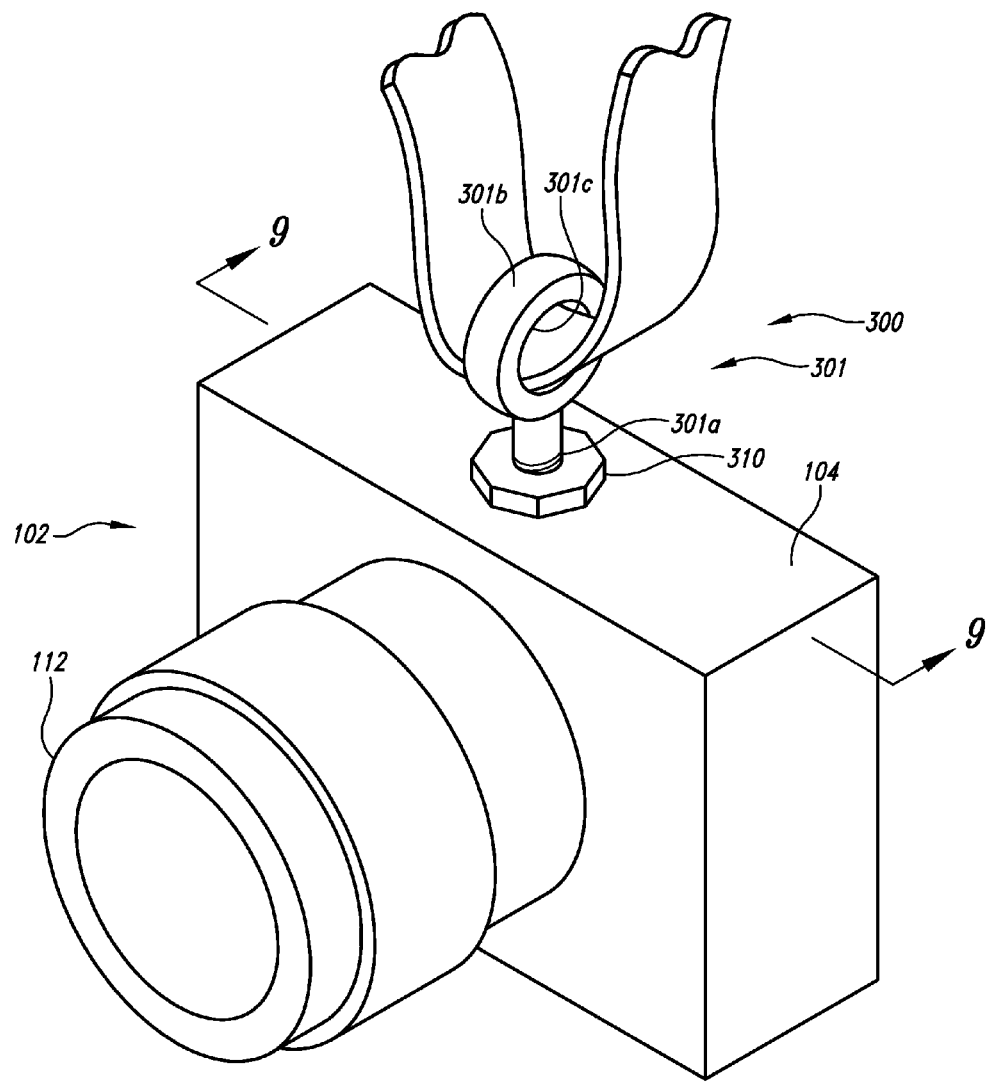
FIG. 6 is a perspective view of the implementation depicted in FIG. 5 secured to a camera, and further showing a strap routed through a coupler.
Figure 9:
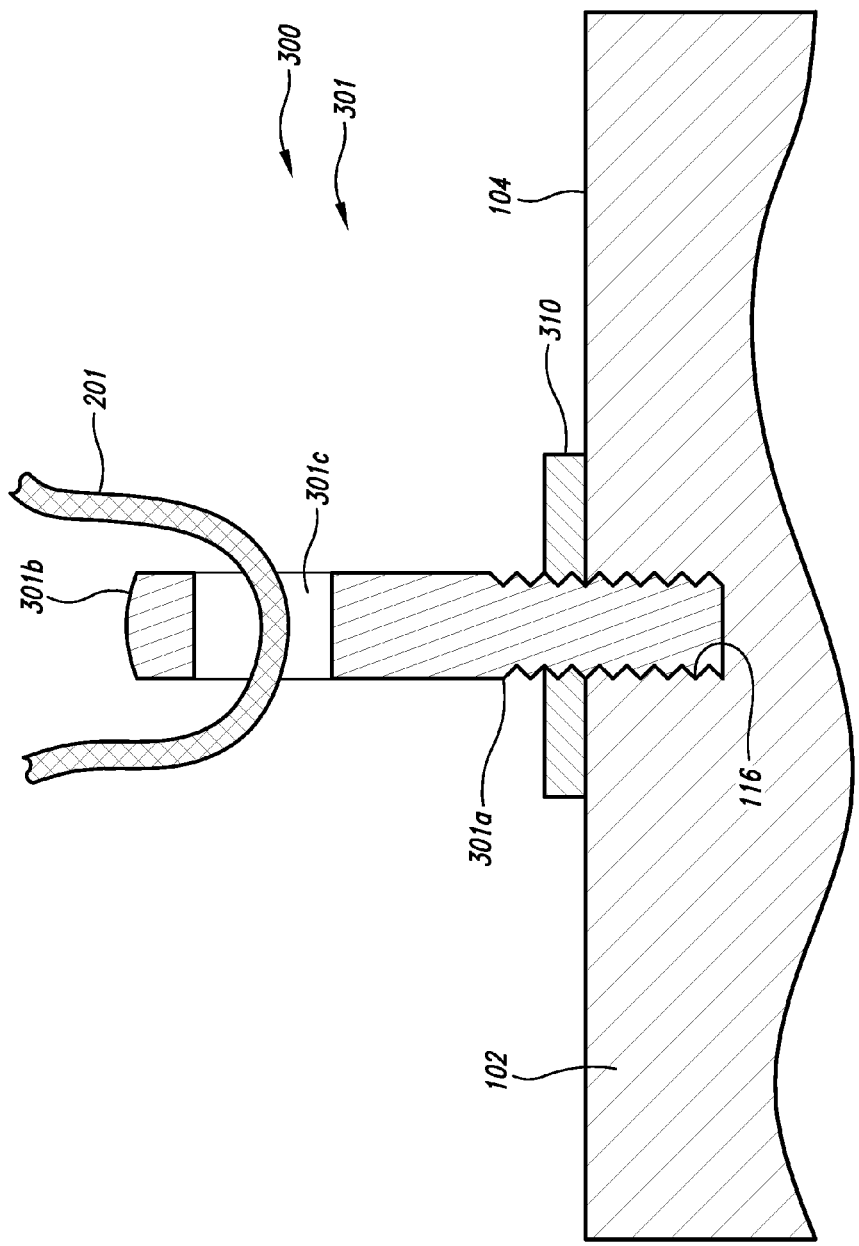
FIG. 9 is a cross sectional view of the implementation depicted in FIG. 6.

Shown in FIG. 6 and FIG. 9 is the assembled first implementation 301 depicted in FIG. 5, coupled to the camera 102, with the lock nut 310 tightened down, and further showing a strap 201 being received by the aperture 301c of the second portion 301b of the first implementation 301 therethrough.

Figure 7:
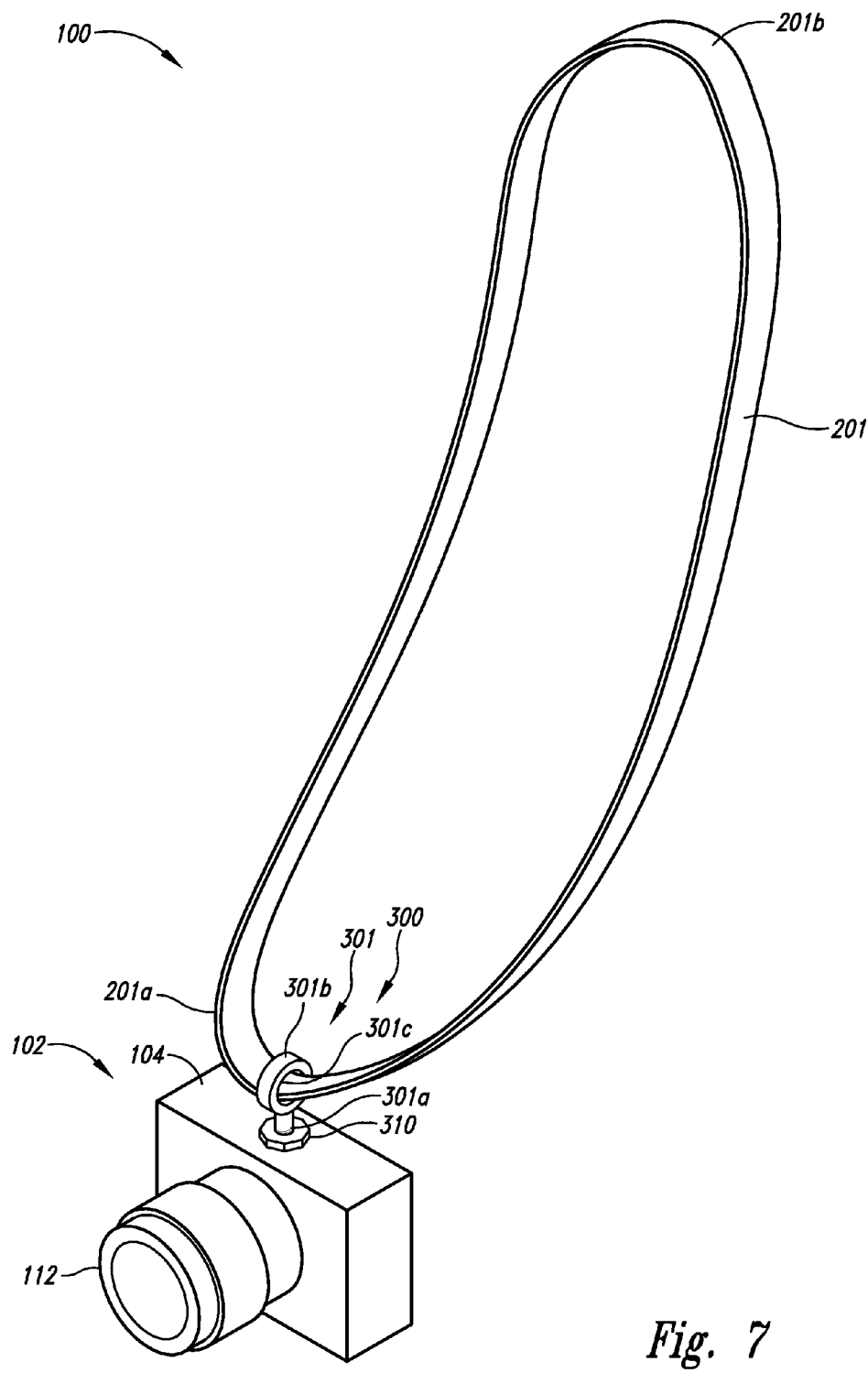
FIG. 7 is a perspective view of the implementation depicted in FIG. 6, showing the system in whole.

FIG. 7 shows the system 100 with the first implementation 301 depicted in FIGS. 5 and 6, having the aperture 301c slideably engaged with a strap 201, and further coupled to a camera 102 via the stand socket 116 of the camera.

Figure 10:
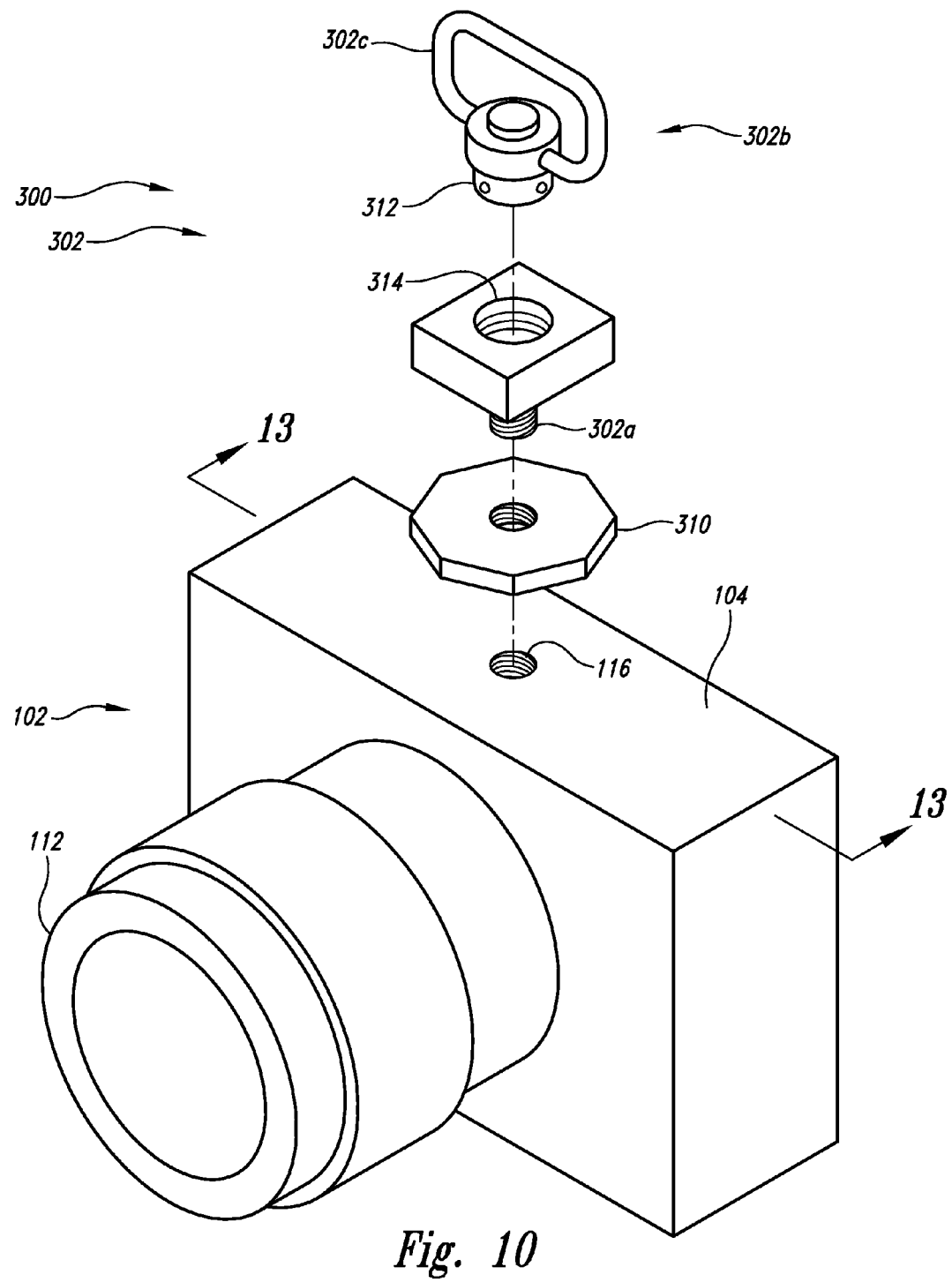
FIG. 10 is a perspective view of an exploded assembly of an alternate implementation of a coupler included in the system.

A second implementation 302 with a first portion 302a and a second portion 302b of the coupler 300 is shown in FIG. 10. The bottom 104 of the camera 102 having the stand socket 116, threadably accepts the first portion 302a of the second implementation 302 of the coupler 300. A lock nut 310 is shown to threadably engage with the first portion 302a to promote a secure coupling of the second implementation 302 with the stand socket 116 of the camera. The second portion 302b includes a ball lock pin 312 and an aperture 302c. The aperture 302c is shaped to receive the strap 201 therethrough (shown in FIG. 11) and be slideably and pivotally engagable with the strap. The first portion 302a has a ball lock socket 314 sized to accept the ball lock pin 312 for a rotatable and releasable engagement between the first portion 302a and the second portion 302b.

Figure 11:
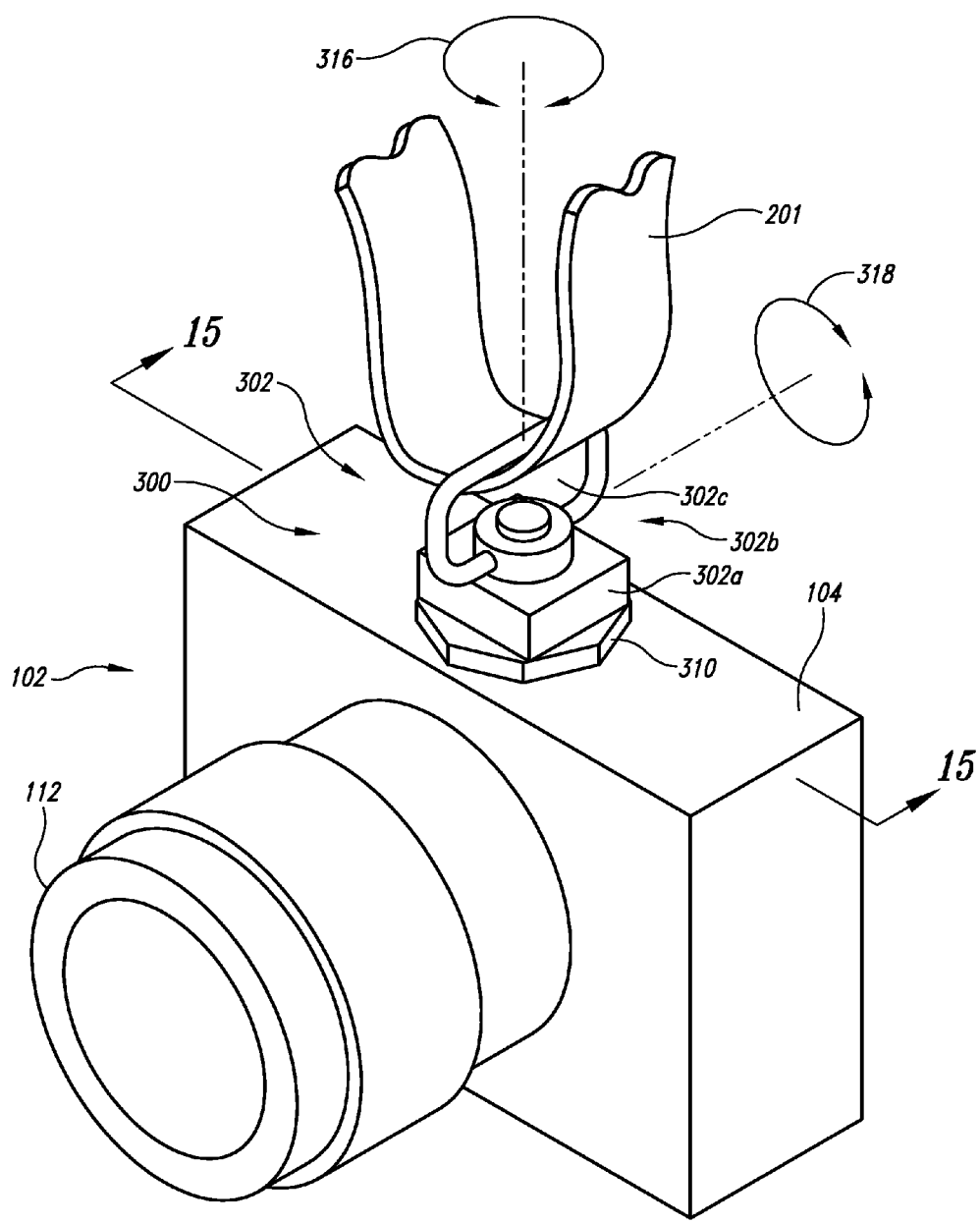
FIG. 11 is a perspective view of the implementation depicted in FIG. 10 secured to a camera, and further showing a strap routed through the coupler.

The second implementation 302 of the coupler 300 is shown in FIG. 11 coupled to the camera 102, with the lock nut 310 tightened down, and further showing the strap 201 being received by the aperture 302c of the second portion 302b of the second implementation 302. To help prevent binding or tangling of the system 100, the second implementation 302 of the coupler 300 allows for rotation between the strap 201 and the camera 102 about the axis 316, while the aperture 302c allows for rotation between the strap and the camera about the axis 318.

Figure 12:
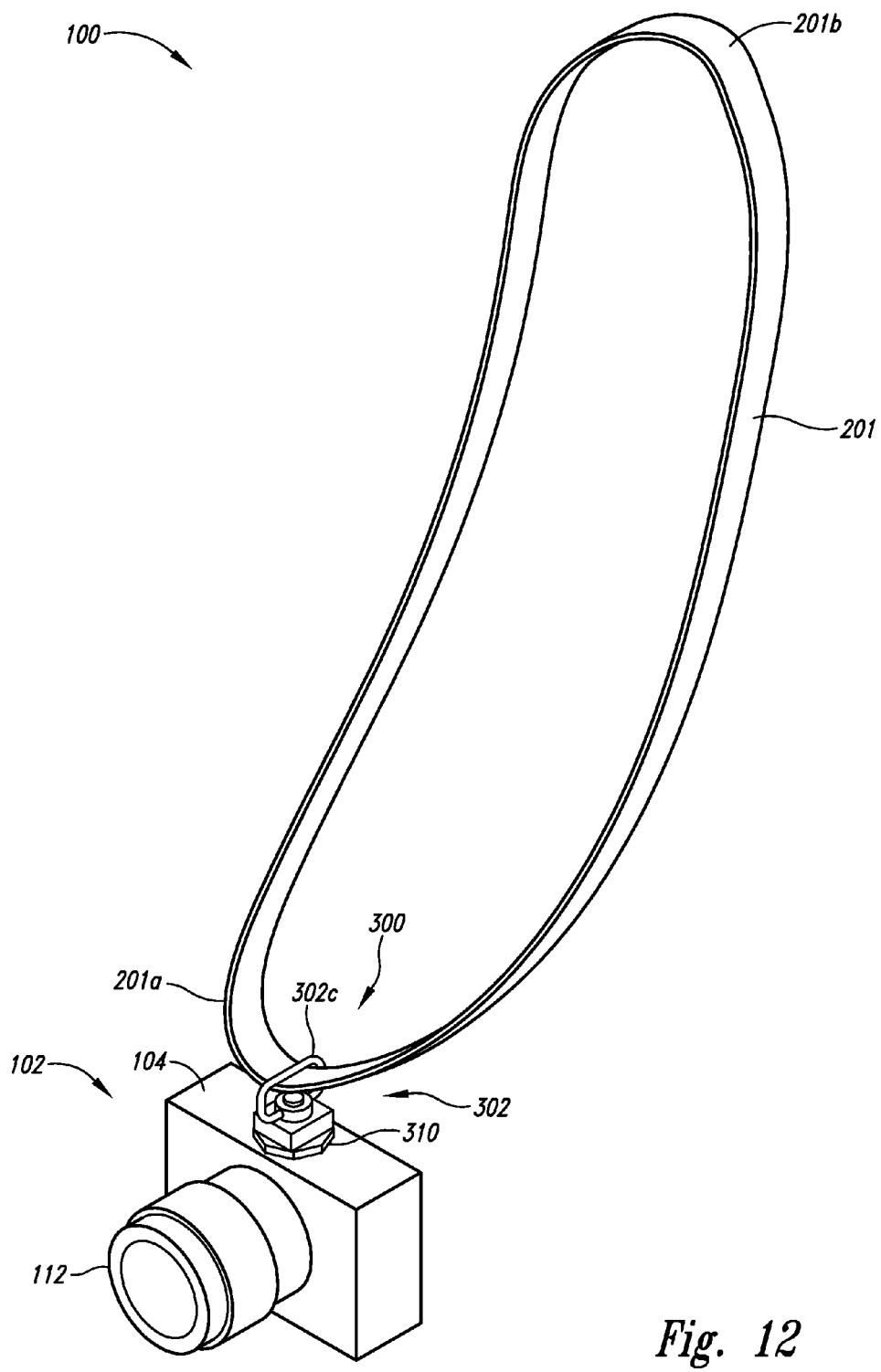
FIG. 12 is a perspective view of the implementation depicted in FIG. 11, showing the system in whole.

FIG. 12 shows the system 100 with the second implementation 302 depicted in FIGS. 10 and 11, having the ball lock pin 312 engaged with the ball lock socket 314, and having the aperture 302c slideably engaged with the strap 201, and further coupled to a camera 102 via the stand socket 116 of the camera.

Figure 13:
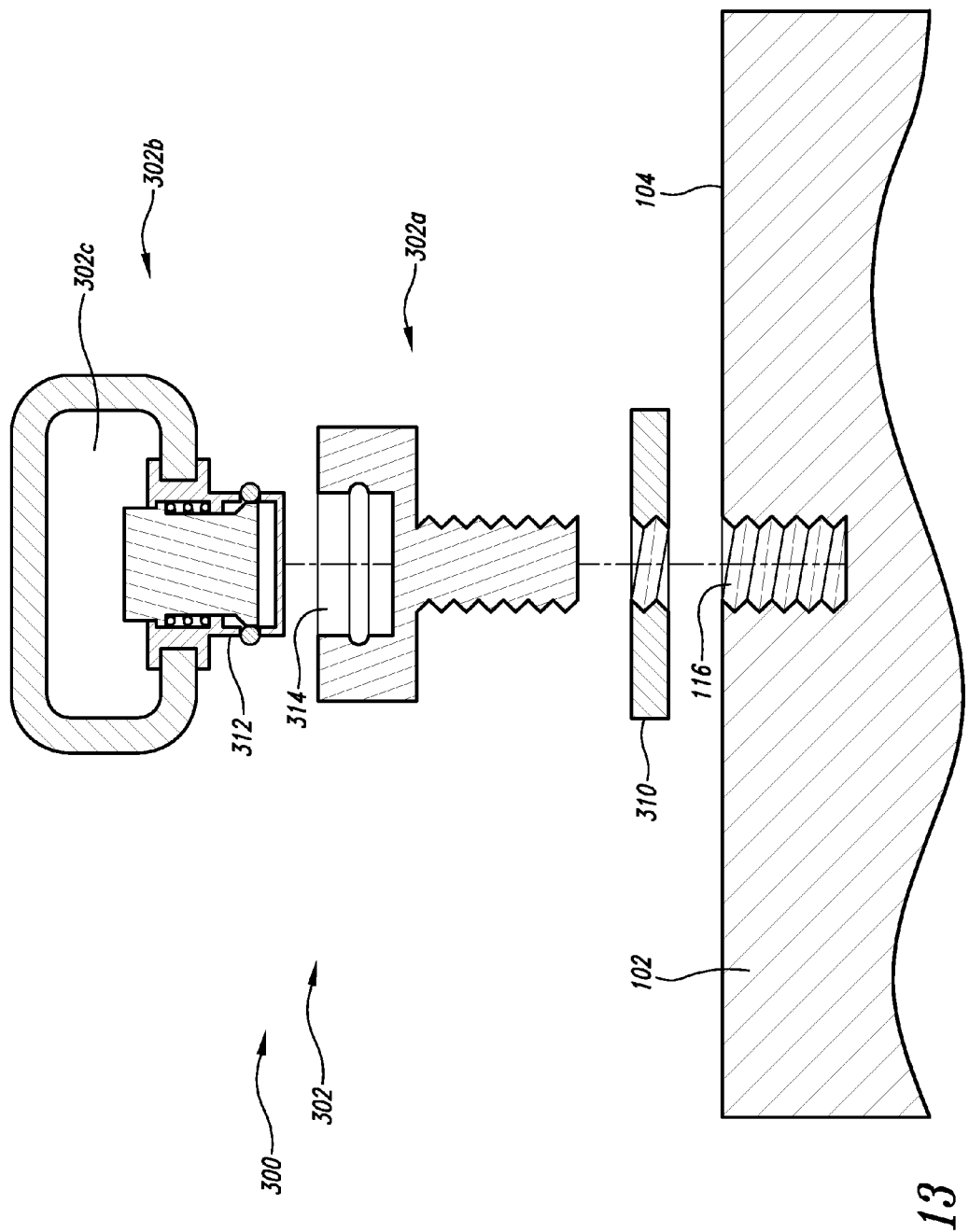
FIG. 13 is a cross sectional view of the implementation depicted in FIG. 10.
Figure 14:
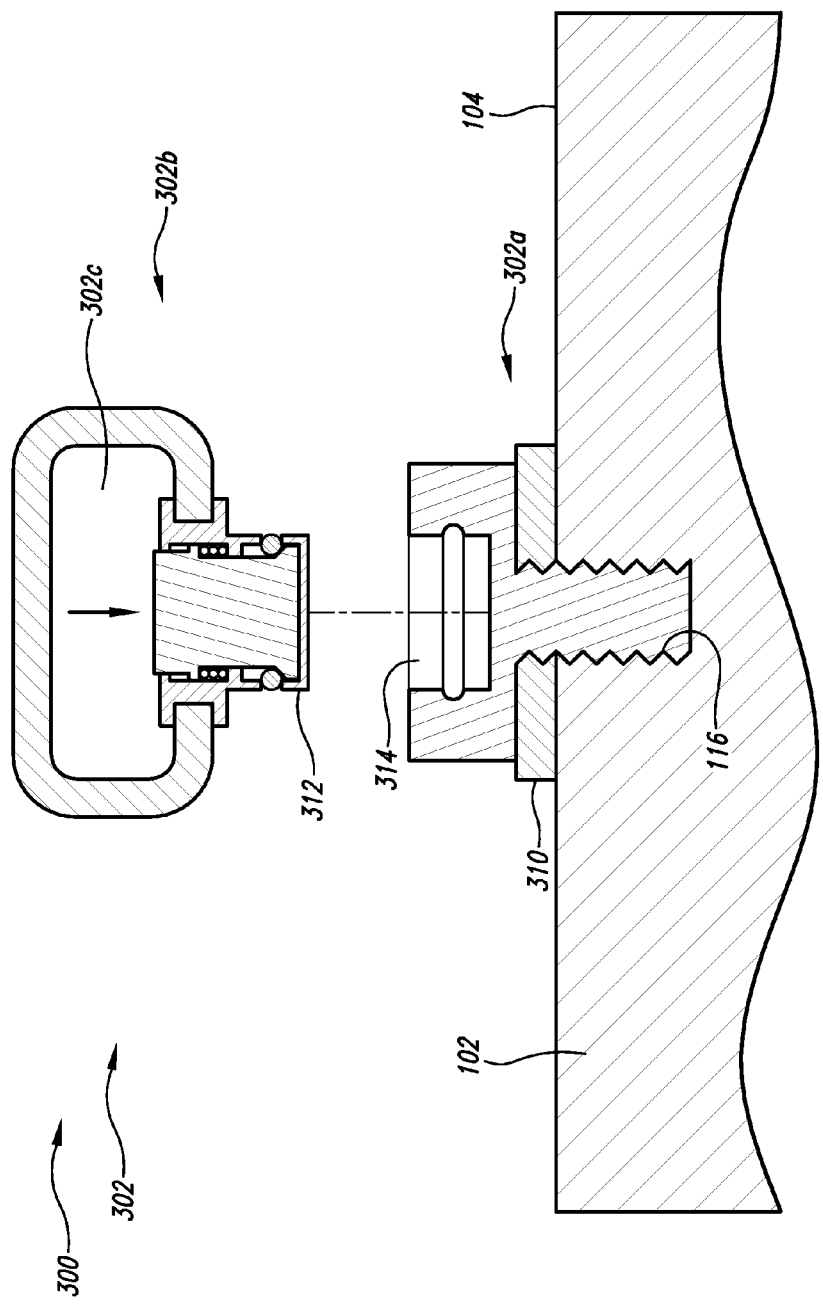
FIG. 14 is a cross sectional view of the implementation depicted in FIG. 10, and further showing engagement of the release mechanism of the connector.
Figure 15:
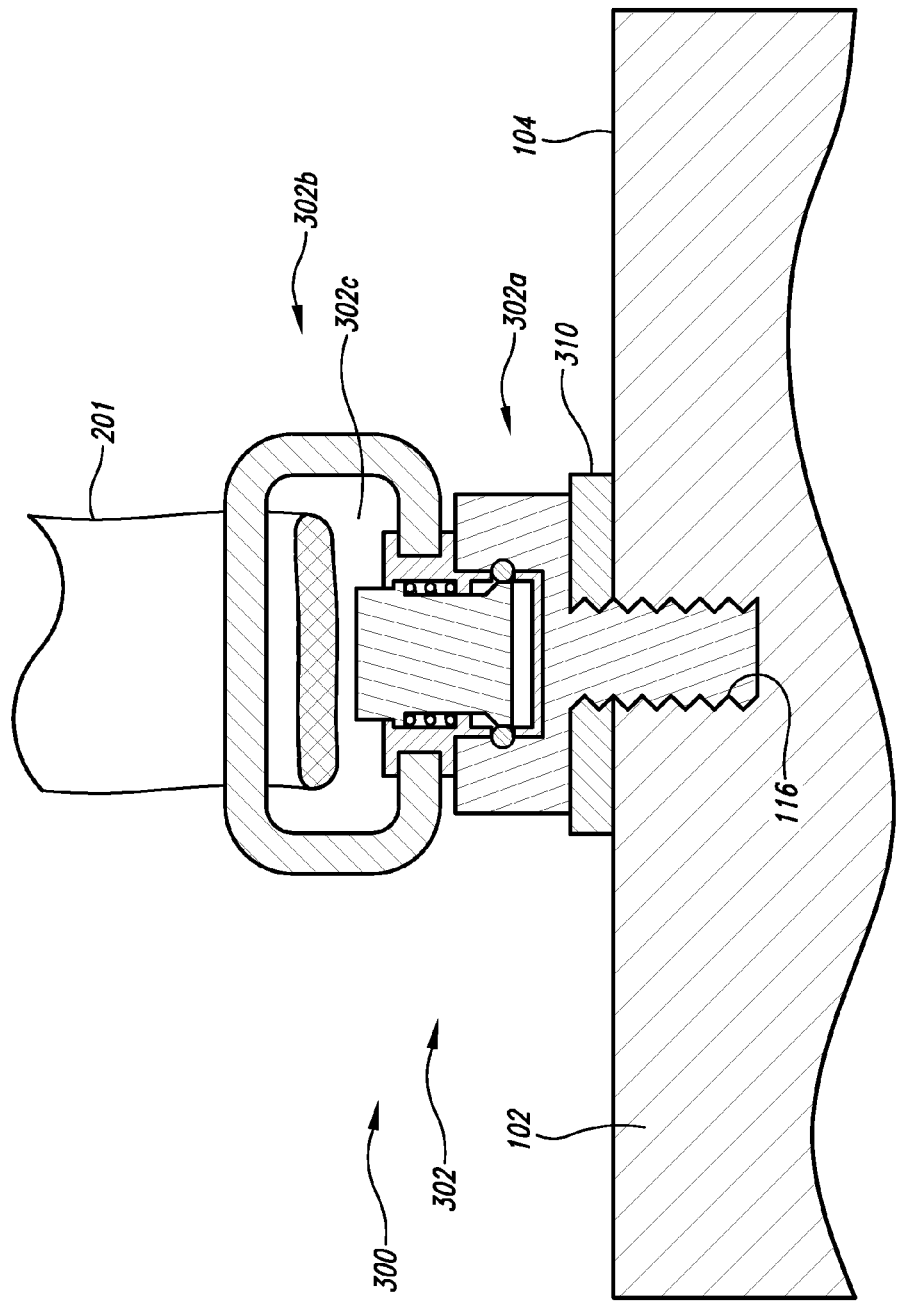
FIG. 15 is a cross sectional view of the implementation depicted in FIG. 11.

A cross sectional view of FIG. 10 is shown in FIG. 13, and a cross sectional view of FIG. 11 is shown in FIG. 14.

Figure 16:
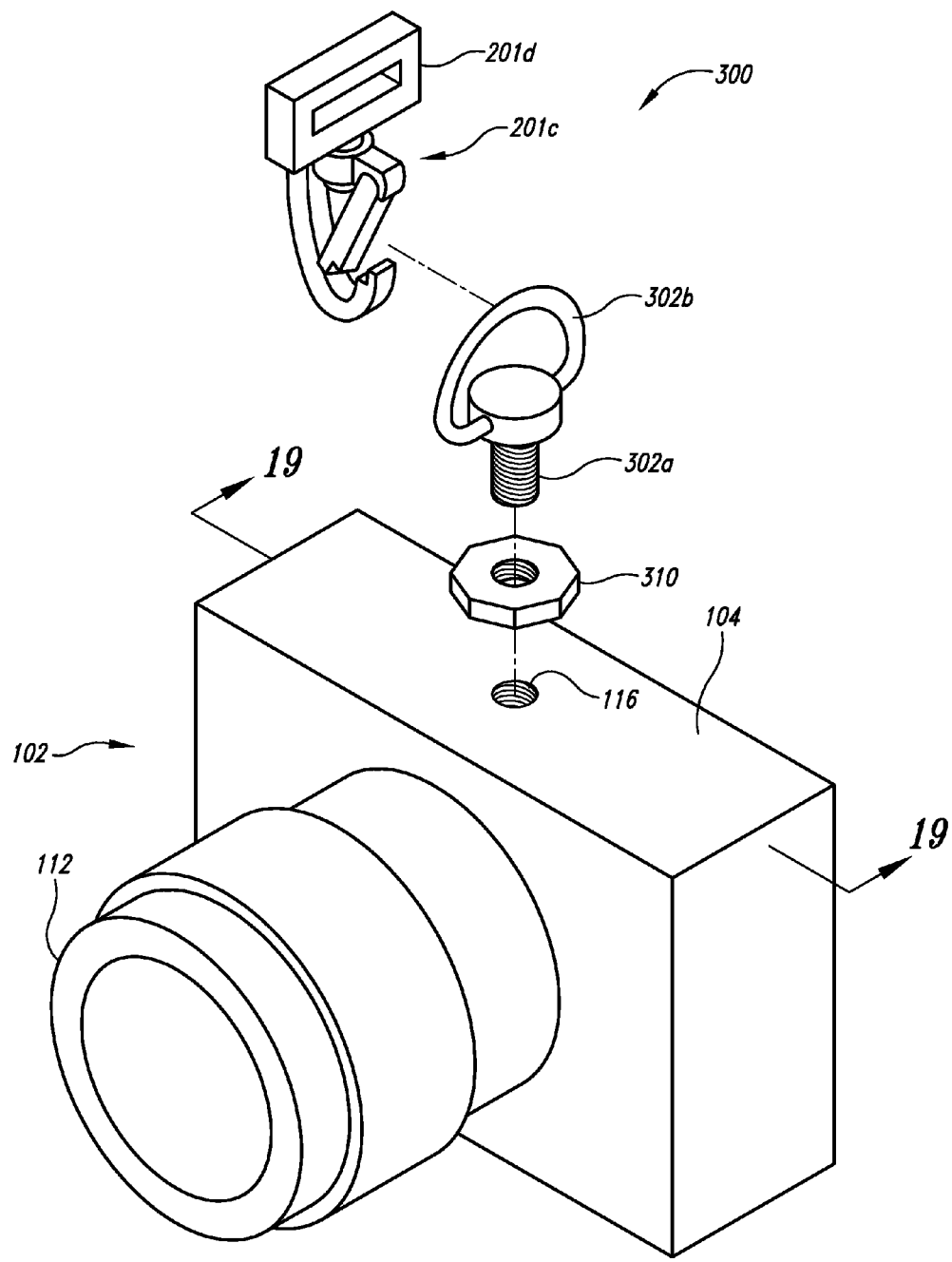
FIG. 16 is a perspective view of an exploded assembly of an alternate implementation of the coupler.
Figure 20:
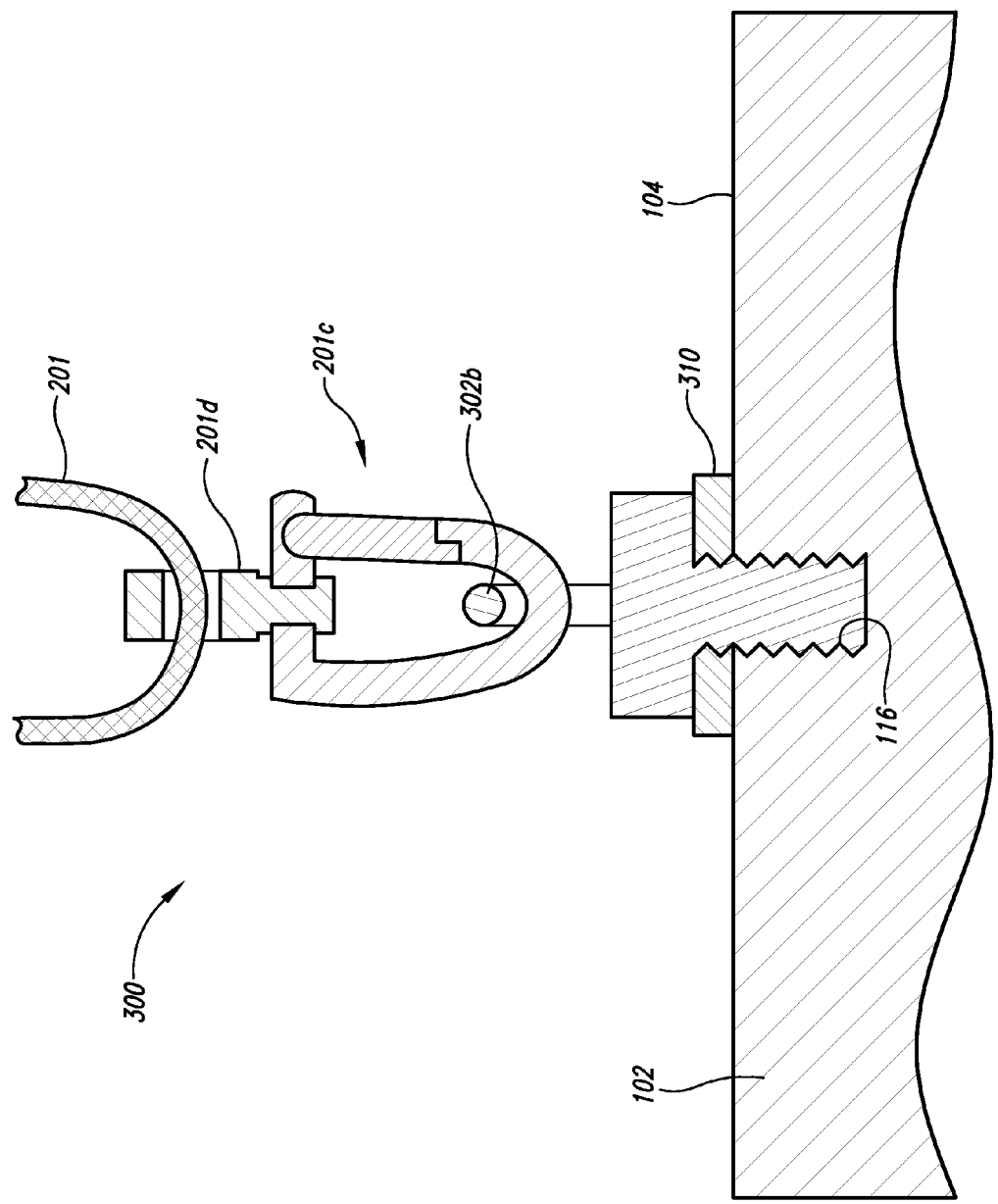
FIG. 20 is a cross sectional view of the implementation depicted in FIG. 17.

A further alternate implementation of the coupler 300 is represented in FIG. 16 and FIG. 20. Within this implementation the coupler includes of a threadable element 302a for coupling with a conventional threadable stand socket of a camera 102 or lens, and a lock nut 310 for securing the coupler to the stand socket. Included in the coupler 300 is a second portion 302b in the form of a loop for accepting a connector 201c having an integrated coupler 201d for engaging the strap. In this example the connector is of the hook type or carabineer type, and has a gate style mechanism to permit connecting and disconnecting of the connector 201c from the second portion 302b of the coupler 300, which further facilitates removal of the camera 102 from the user 10 without removing the strap 201 from the user.

Figure 17:
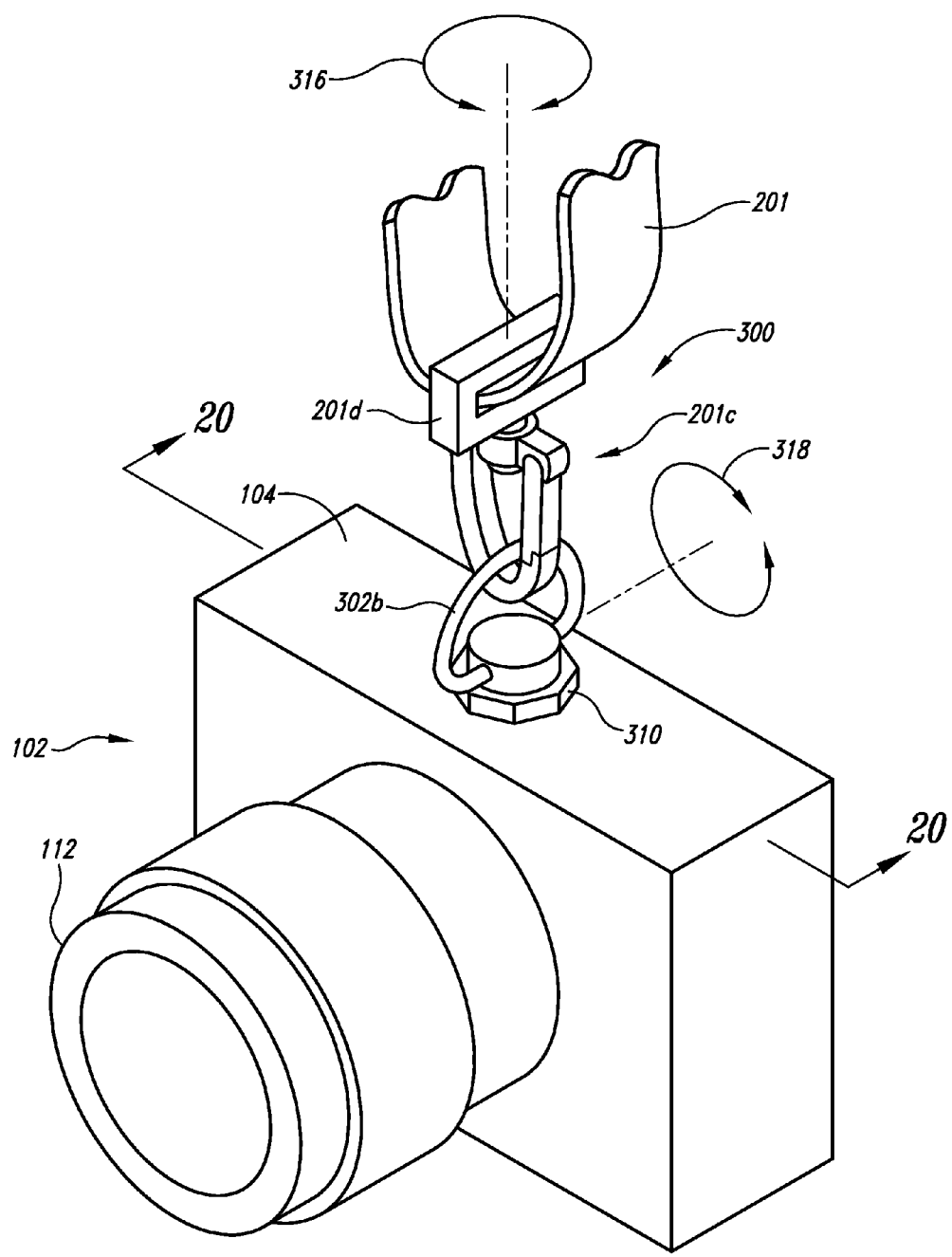
FIG. 17 is a perspective view of the implementation depicted in FIG. 16 secured to a camera, and further showing a strap routed through the coupler.

Shown in FIG. 17 and FIG. 20 is the coupler, coupled to a camera, with the connector coupled to the coupler, and the coupler engaged with the strap. In the assembled state, the connector allows the assembled coupler and camera to rotate relative to the coupler and strap about a first axis. The hook and loop allows the coupler, and camera to rotate relative to the connector portion and strap about a second axis.

Figure 18:
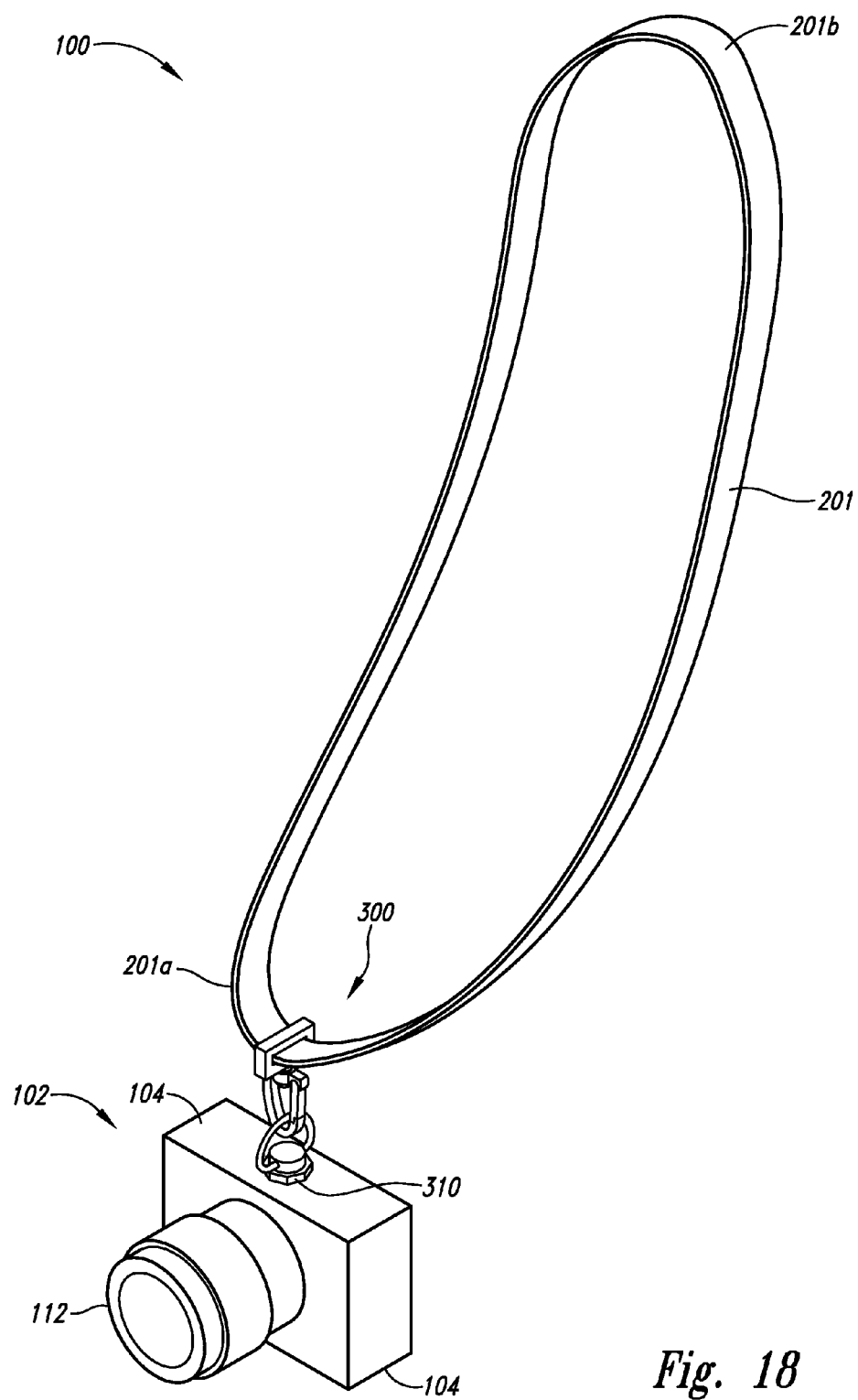
FIG. 18 is a perspective view of the implementation depicted in FIG. 16, showing the system in whole.
Figure 19:
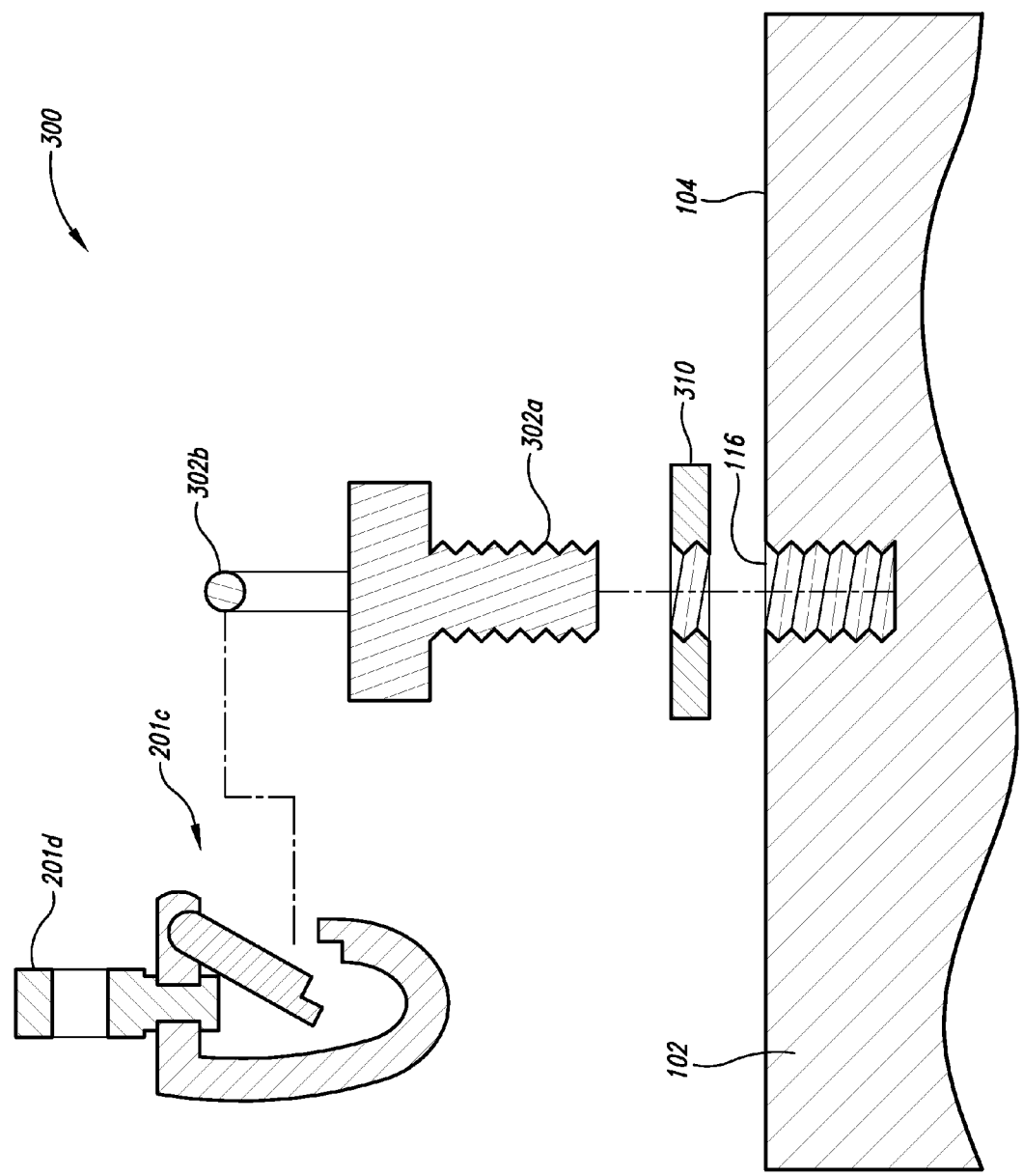
FIG. 19 is a cross sectional view of the implementation depicted in FIG. 16.

FIG. 18 represents an implementation of the system 100 depicted in FIGS. 16 and 17 as a whole, having the camera coupled with the coupler, and the coupler engaged with a strap via the coupler.

Figure 21:
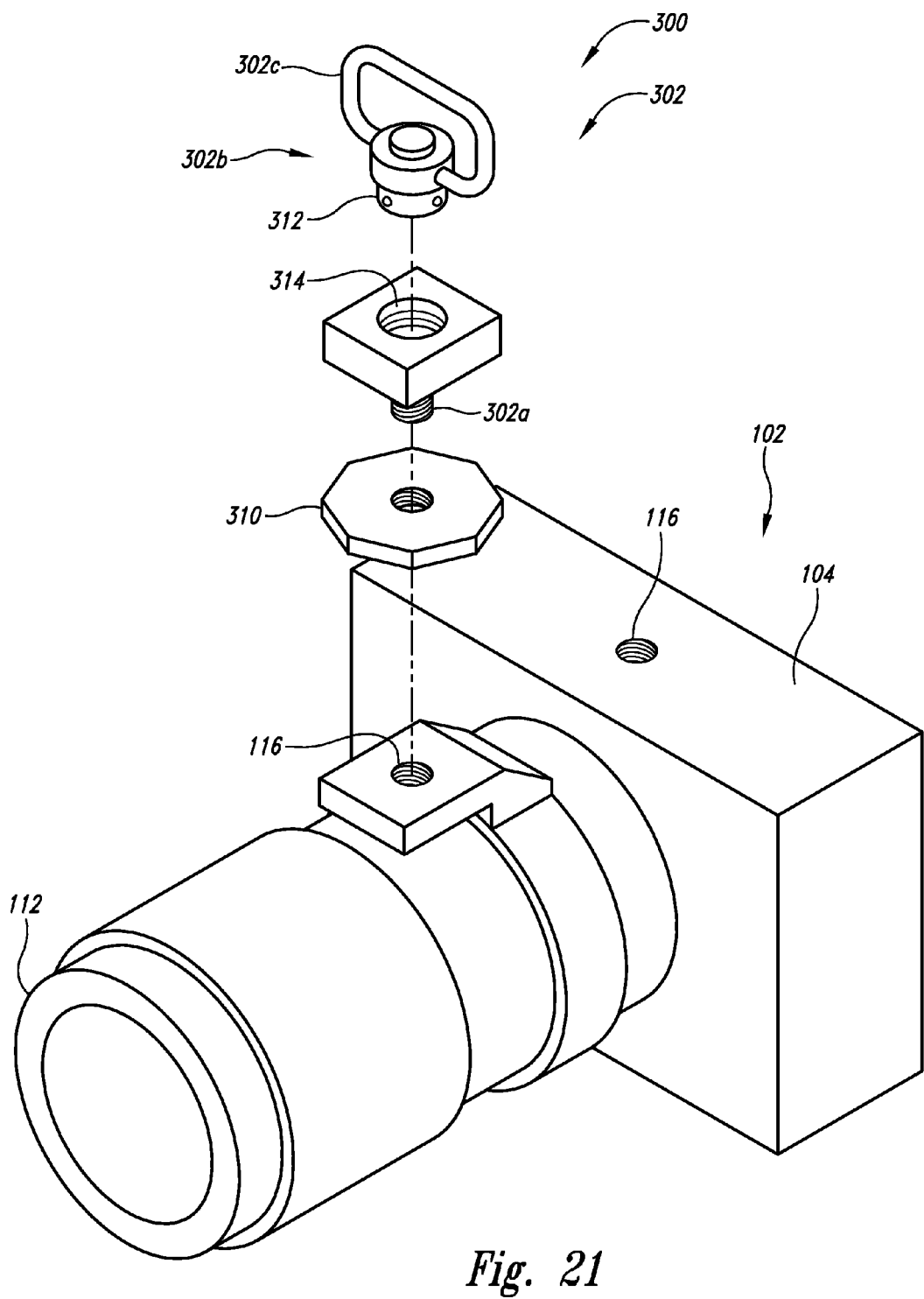
FIG. 21 is a perspective view of an exploded assembly of an alternate implementation of the coupler.

Shown in FIG. 21 is an exploded assembly of an alternate implementation of coupling the coupler to a conventional threadable stand socket. The stand socket is mounted to or integral with the lens. All implementations of the coupler can be coupled to the lens in the same manner as they are coupled to the camera's stand socket.

Figure 22:
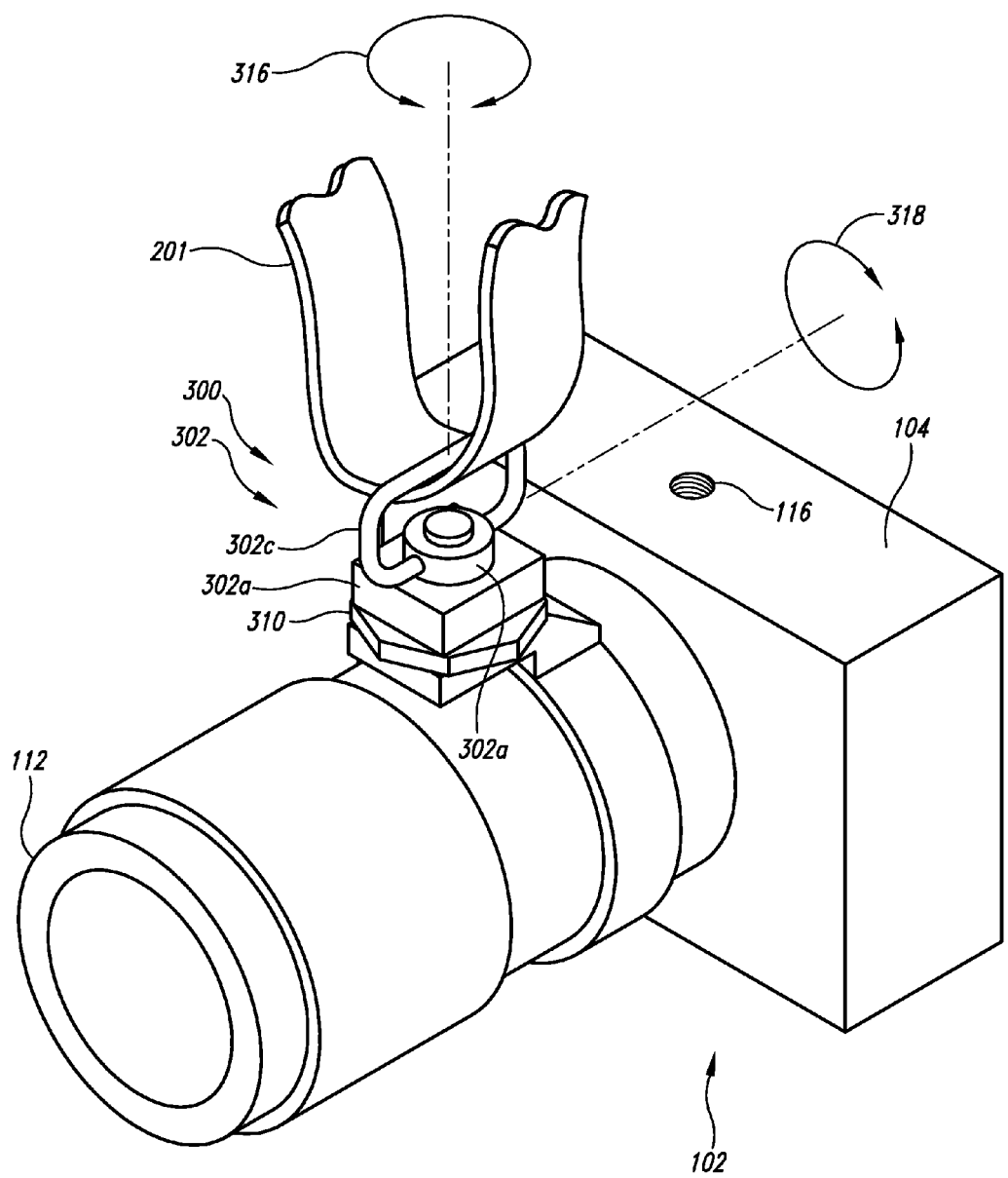
FIG. 22 is a perspective view of the implementation depicted in FIG. 21 secured to a lens, and further showing a strap routed through the coupler.

FIG. 22 is the assembled implementation depicted in FIG. 21, coupled to a lens, with the connector coupled to the coupler, and the coupler engaged with the strap. In the assembled state, the connector allows the assembled coupler and camera to rotate relative to the coupler and strap about a first axis. The coupler allows the assembled connector, coupler, and camera to rotate relative to the strap about a second axis.

Figure 23:
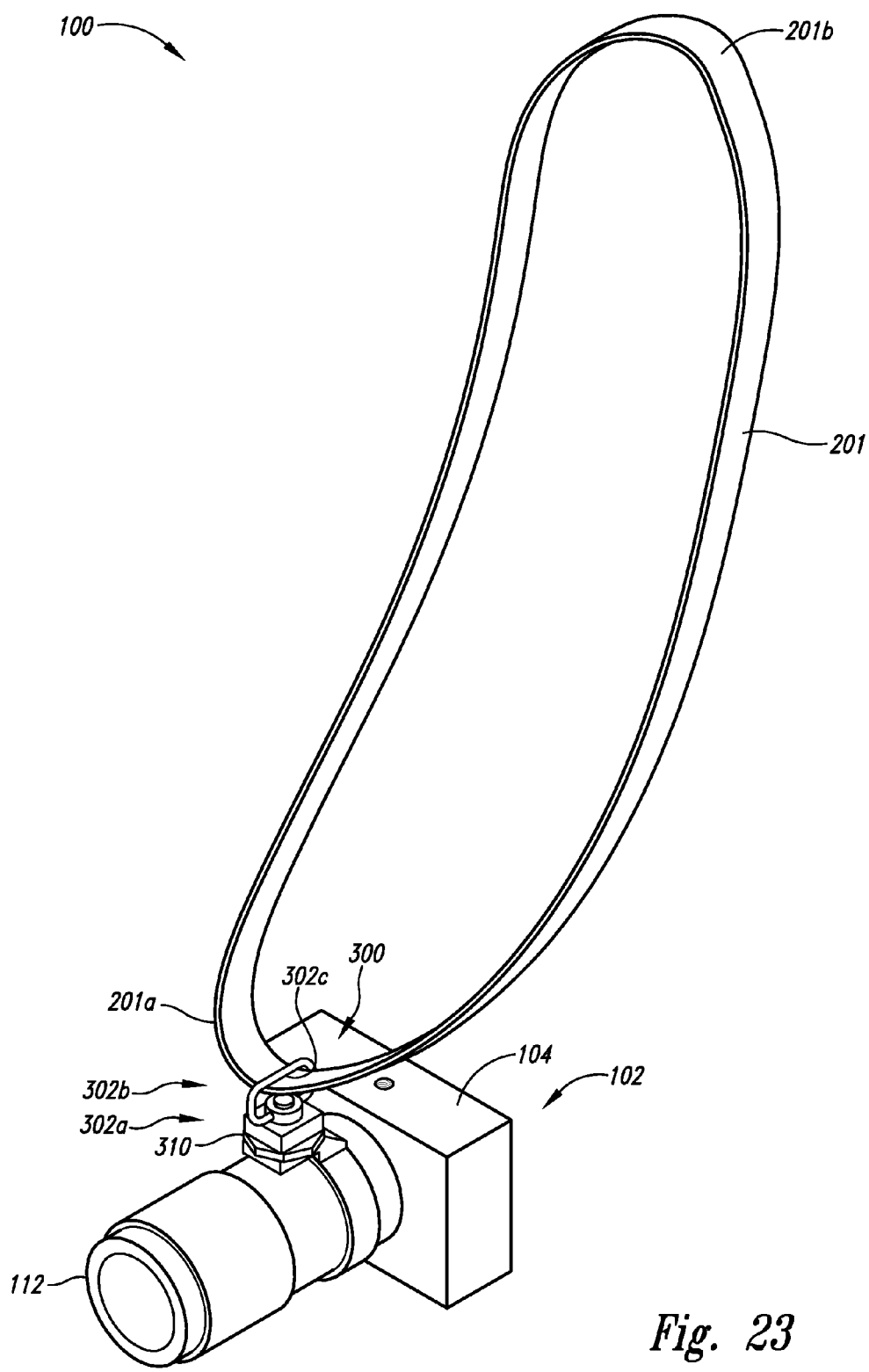
FIG. 23 is a perspective view of the implementation depicted in FIG. 22, showing the system in whole.

FIG. 23 represents an implementation of the system 100 depicted in FIGS. 21 and 22 as a whole, having the camera coupled with the coupler, and the coupler engaged with a strap via the coupler.

Figure 24:
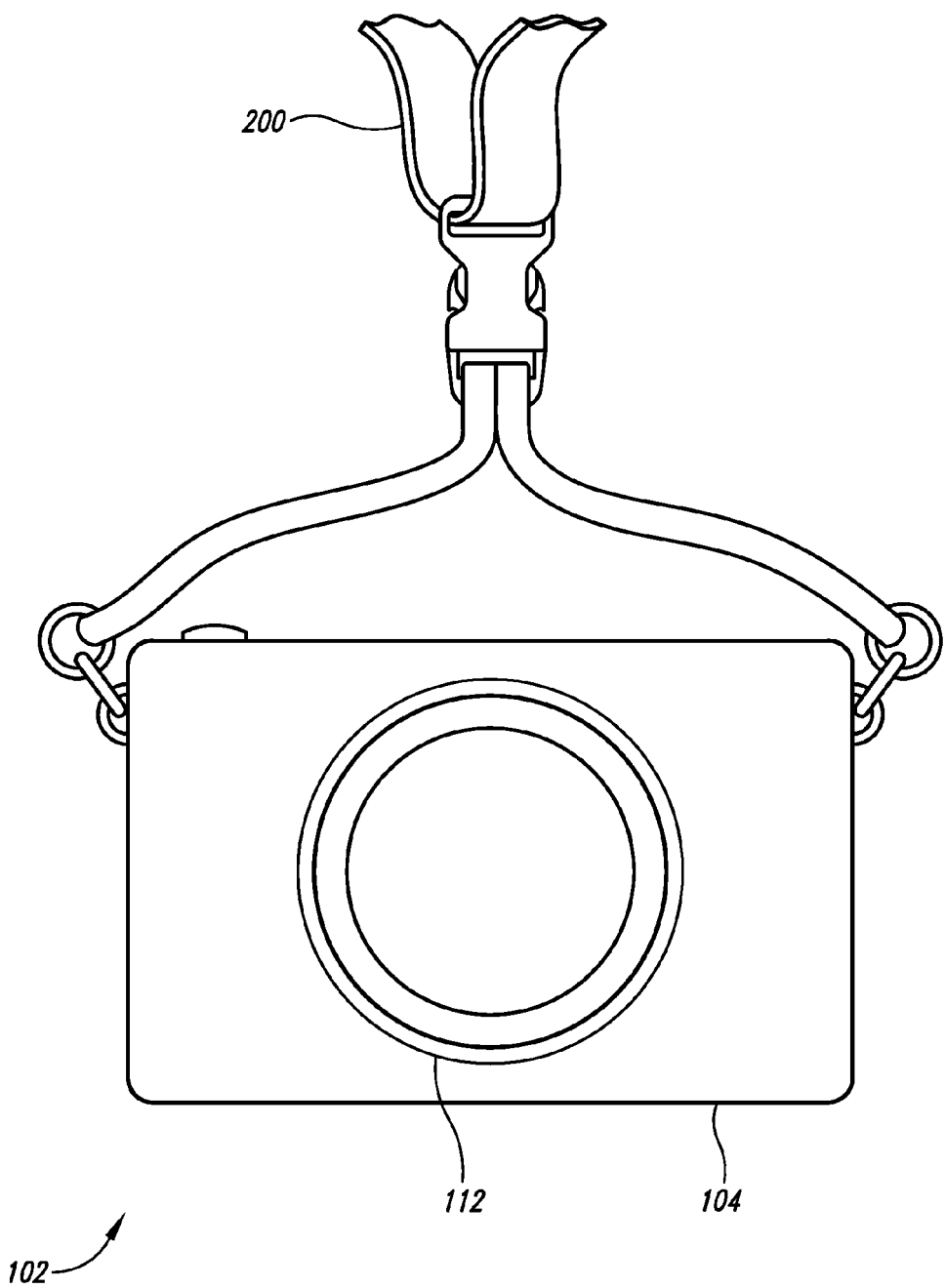
FIG. 24 is an elevational view of an alternate implementation of the coupler secured to a camera via the camera's conventional strap mount loops.

FIG. 24 shows a further alternate implementation of coupling the coupler to a camera. The coupler is coupled to the camera's conventional strap mount loops located opposing each other on the first side and second side of the camera. A number of ties attach the connector to the camera's strap mount loops. A connector is shown in the engaged state, connecting the ties to a strap. In this example the connector is of the side release type, but can be any type of connector, in example: a ball lock pin, carabineer, hook and loop, etc.

Figure 25:
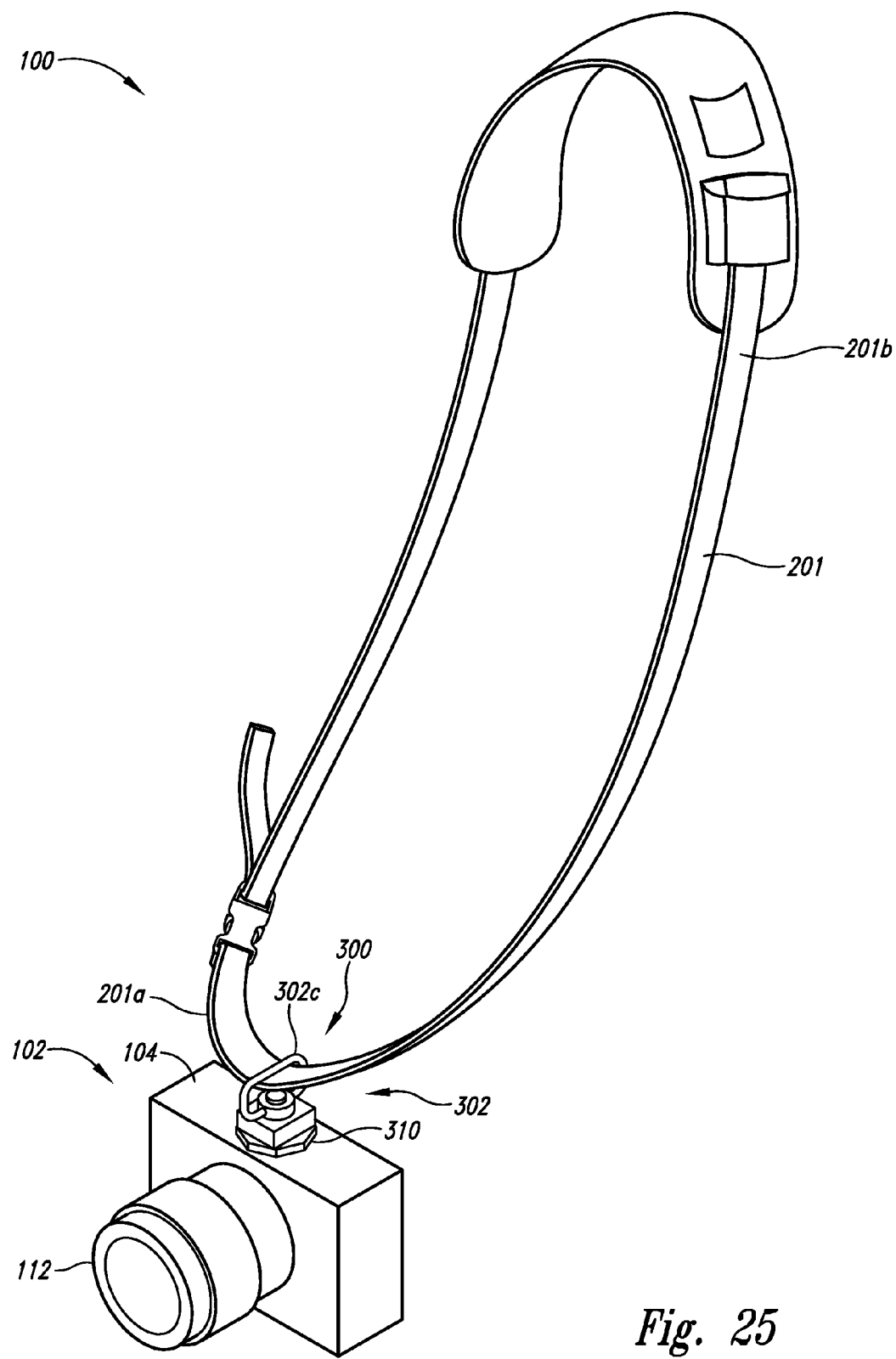
FIG. 25 is a perspective view of an alternate implementation of the system in whole.

FIG. 25 shows an implementation of the system 100 as having a coupler 300 engaged with the strap 201. The strap can have a padded portion to permit comfort for the user, and can further utilize a frictional material to maintain the strap in a proper location for use of the camera. Located on the strap can exist a variety of receptacles for holding and permitting access to various items, such as a phone, flashlight, memory, film, batteries, keys, business cards, or other items. Further included in the strap can be one or more adjusters for adjusting its length, tension and fit. Still further included can be a variety of release mechanisms, in this example a side release is shown.

Figure 26:
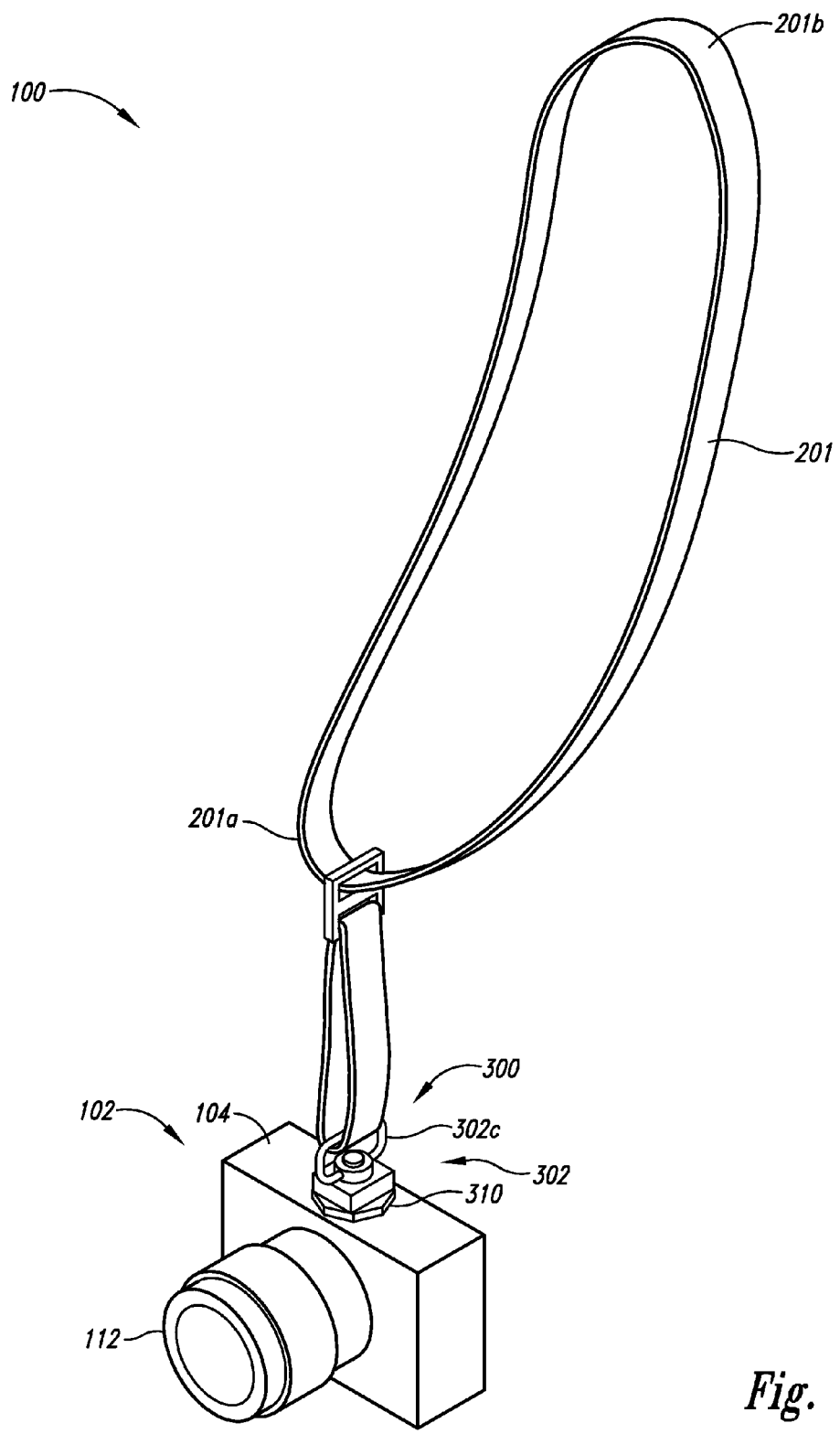
FIG. 26 is a perspective view of an alternate implementation of the system in whole, and further showing the use of a tether.

FIG. 26 shows an alternate implementation of the system 100 as having a tether located between the strap and the coupler, for the purpose of locating the camera a distance from the strap. This can facilitate proper use of the camera by the user. The tether can further include a coupler for engaging the strap.

Figure 27:
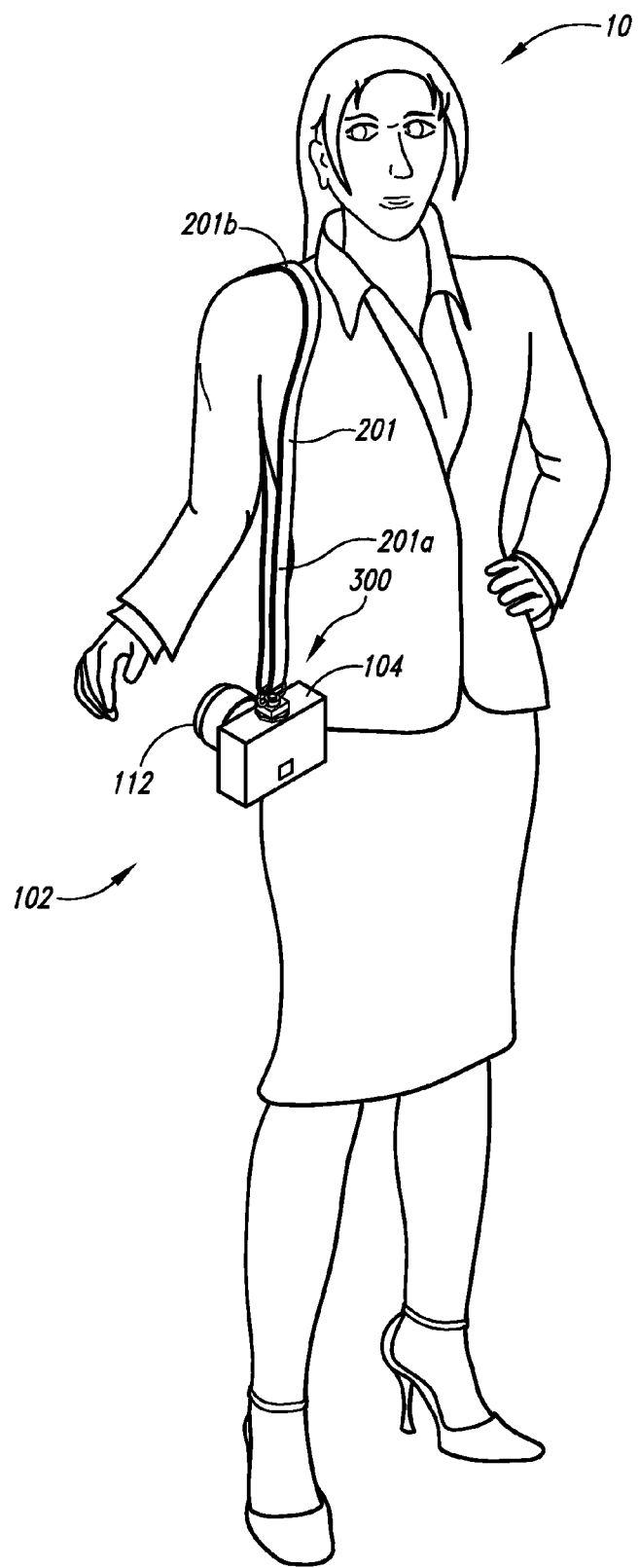
FIG. 27 is a view of an implementation of the camera transport system, shown with the camera in a resting position, and the strap being worn vertically from the shoulder of a user.
Figure 28:
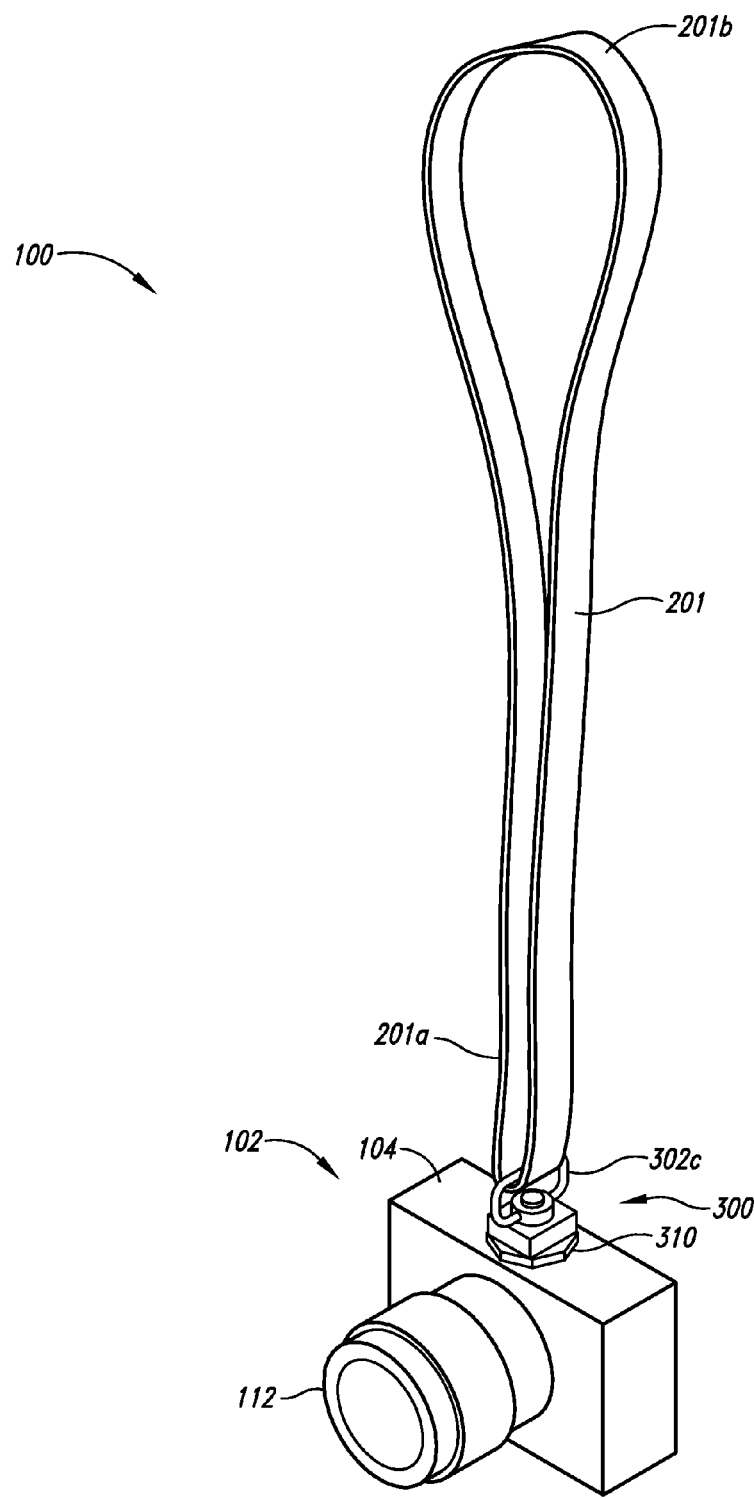
FIG. 28 is a perspective view of the implementation depicted in FIG. 27, shown in whole.

As shown in FIG. 27 and FIG. 28, the system 100 can be worn by the user vertically from the shoulder, and the camera can rest in a desired position allowed by the first axis of rotation and second axis of rotation included within the coupler.

Figure 29:
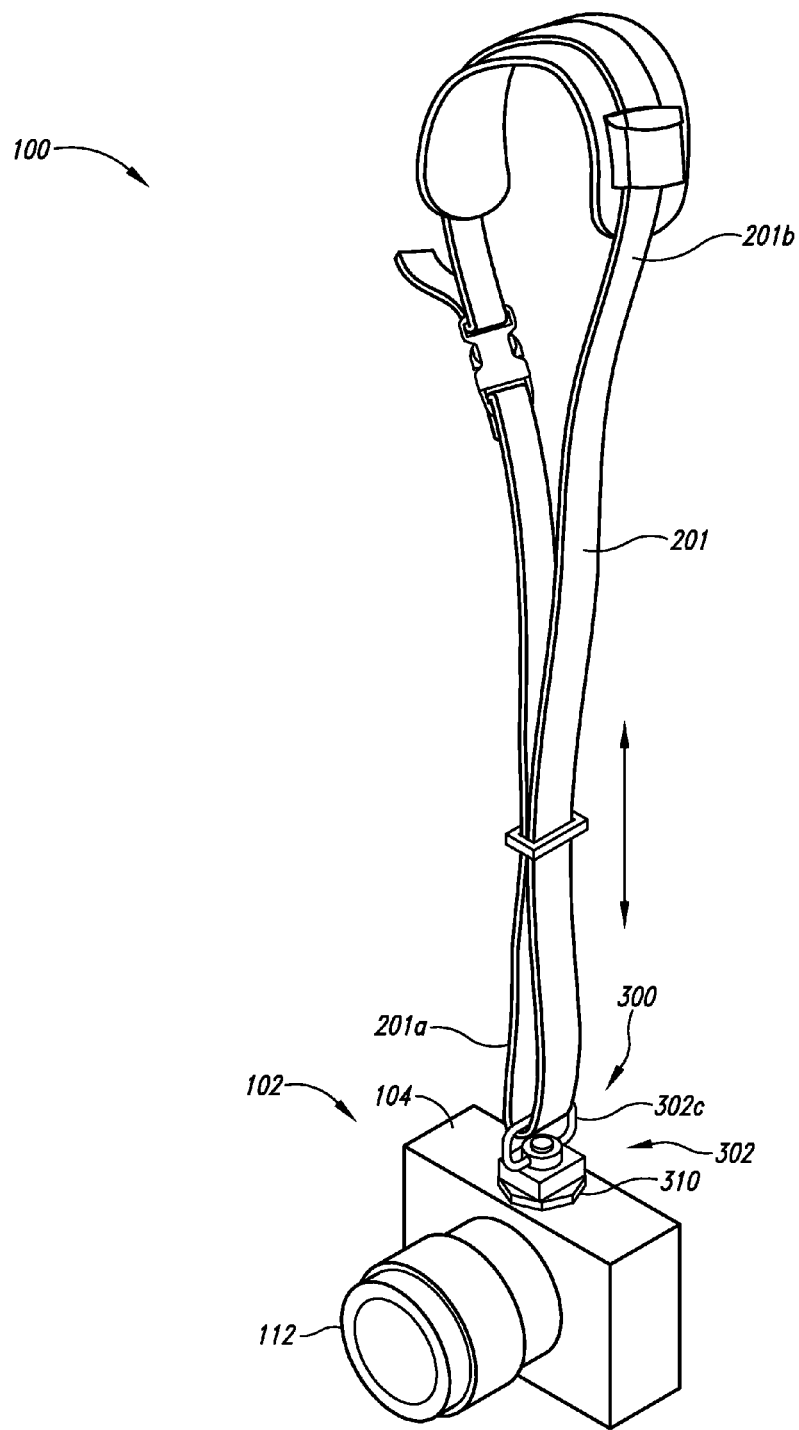
FIG. 29 is perspective view of an alternate implementation of the system depicted in FIG. 27.

FIG. 29 shows an alternate implementation of the system 100 depicted in FIG. 28, with the strap having a padded portion to permit comfort for the user, and can further utilize a frictional material to maintain the strap in a proper location for use. Located on the strap can exist a variety of receptacles for holding and permitting access to various items, such as a phone, flashlight, memory, film, batteries, keys, business cards, or other items. Further included in the strap can be one or more adjusters for adjusting its length, tension and fit. Still further included can be a variety of release mechanisms, in this example a side release is shown. Still further included can be a slide to adjust the fit of the strap, and to further alter the characteristics of the strap from a glide strap to a fixed strap.

FIGS. 30-33 shows an implementation of the system 100, as including an enclosure 400 having a first interior 402, a second interior 404, and a third interior 406 all being covered by closures or covers 410. The enclosure 400 can be used for stowing camera components, such as a camera, lens, flash, or other auxiliary camera components in a protected location when not in use, while leaving the components readily accessible for use. As shown, the first end portion 201a of the strap 201 is positioned in the first interior 402 to allow for the camera 102 to be moved into the first interior (such as by sliding along the strap 201 without detaching the camera from the strap 201. A second strap 416 having a first end portion 416a and a second end portion 416b is used to wear the enclosure 400 over a shoulder. The second end portion 201b of the strap 201 is shown in be fastened near the second end portion 416b of the second strap 416 so that the strap 201 can follow the contour of the second strap while the enclosure 400 is being worn.

The closures can include the use of snaps, zippers, drawcord, hook and loop (Velcro), or other such fasteners deemed necessary to secure the closures in a closed position. To promote a safe environment for the camera components, the storage compartments can be made, in part or in whole, of resilient materials, padded materials, and/or water or chemical resistant materials. Further included in the enclosure can be one or more support straps, such as used on a backpack, handbag, or bandolier style bag. In this example the support strap is of the bandolier type. The support straps can also include a variety of adjusters and/or release mechanisms (not shown). Further included on the support straps can exist receptacles (not shown) for holding and permitting access to various items, such as a phone, flashlight, memory, film, batteries, keys, business cards, or other items. Further included in the enclosure can be auxiliary storage for the stowing of various items.

Figure 30:
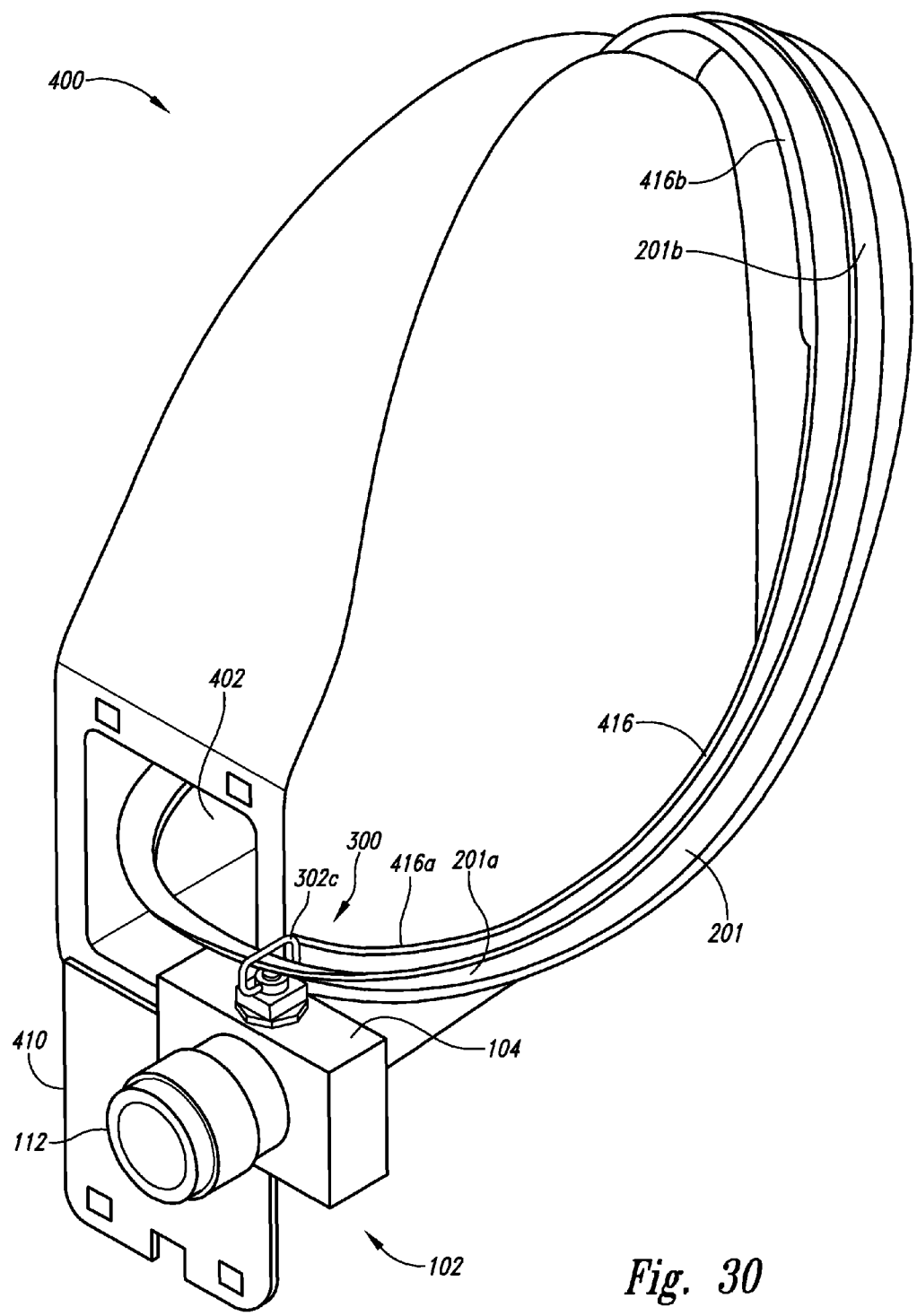
FIG. 30 is a perspective view of an implementation of the system, having an enclosure, and further showing the camera in a resting position.
Figure 31:
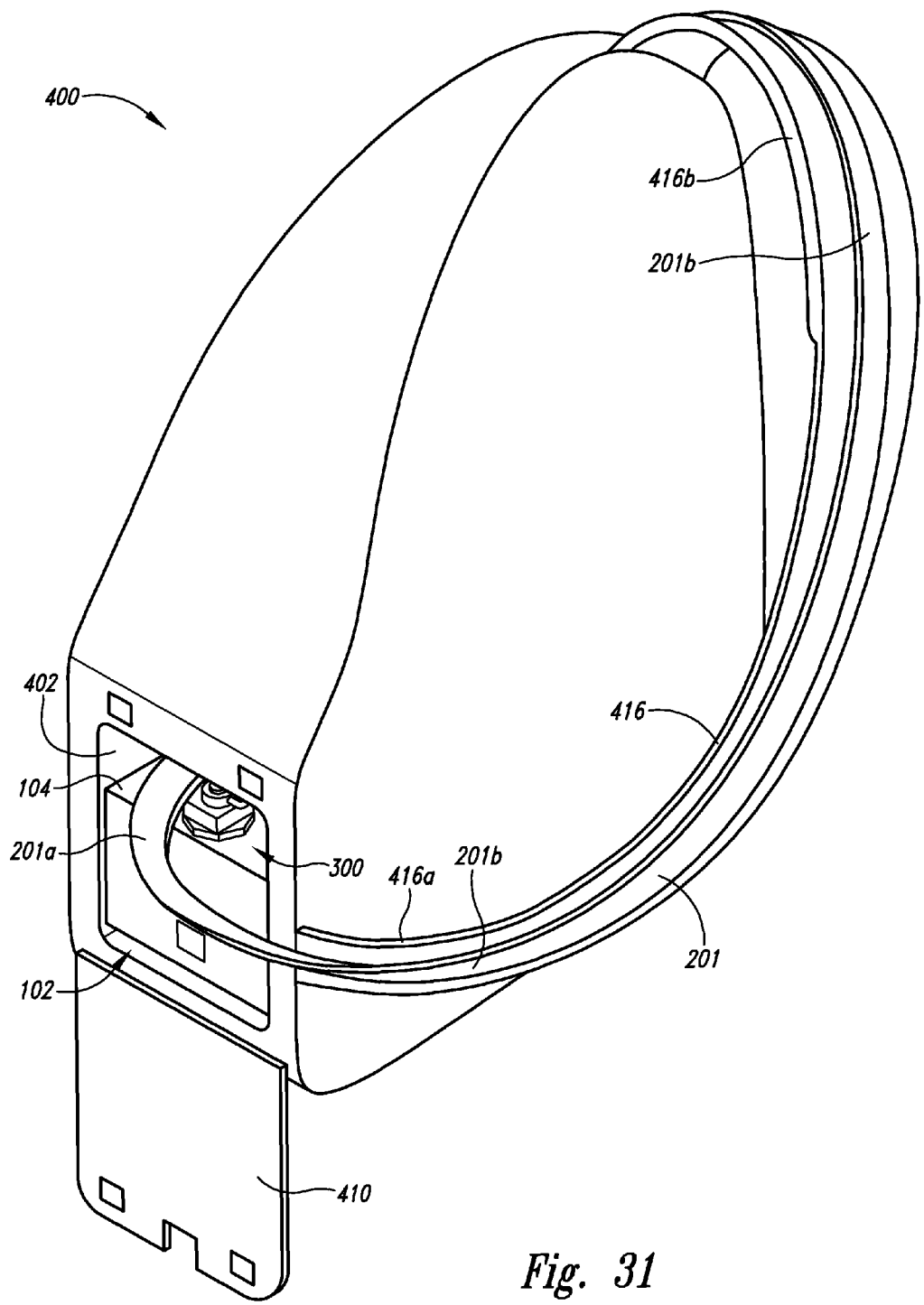
FIG. 31 is a perspective view of the implementation depicted in FIG. 30, showing the camera in a stowed location with an enclosure cover in the open position.

FIG. 31 shows the implementation of the system 100 depicted in FIG. 30, but with the camera in a stowed location within a compartment.

Figure 32:
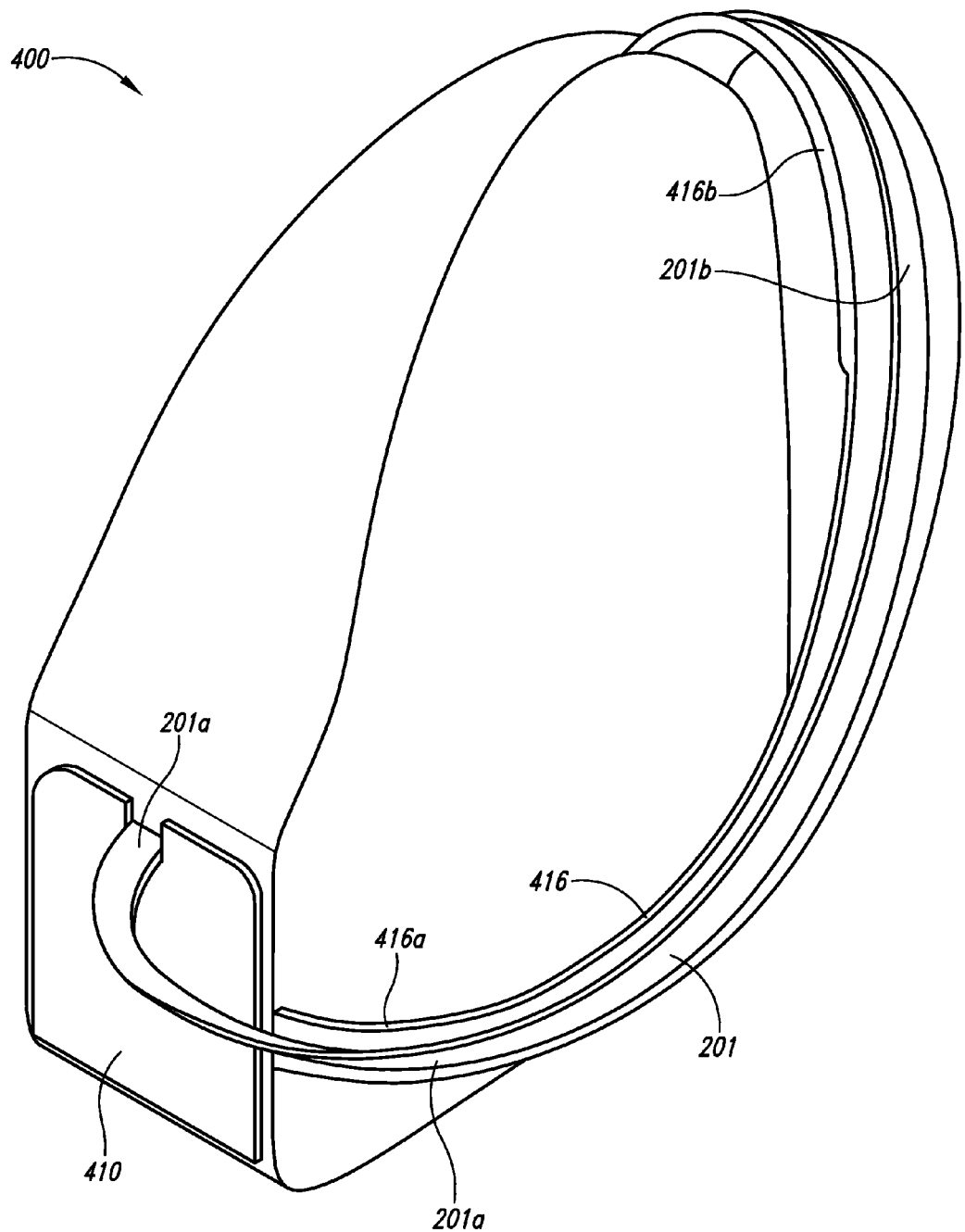
FIG. 32 is a perspective view of the implementation depicted in FIG. 31, showing the enclosure cover in a closed position.

FIG. 32 shows the same implementation of the system 100 depicted in FIG. 31, but with the closure in a closed position.

Figure 33:
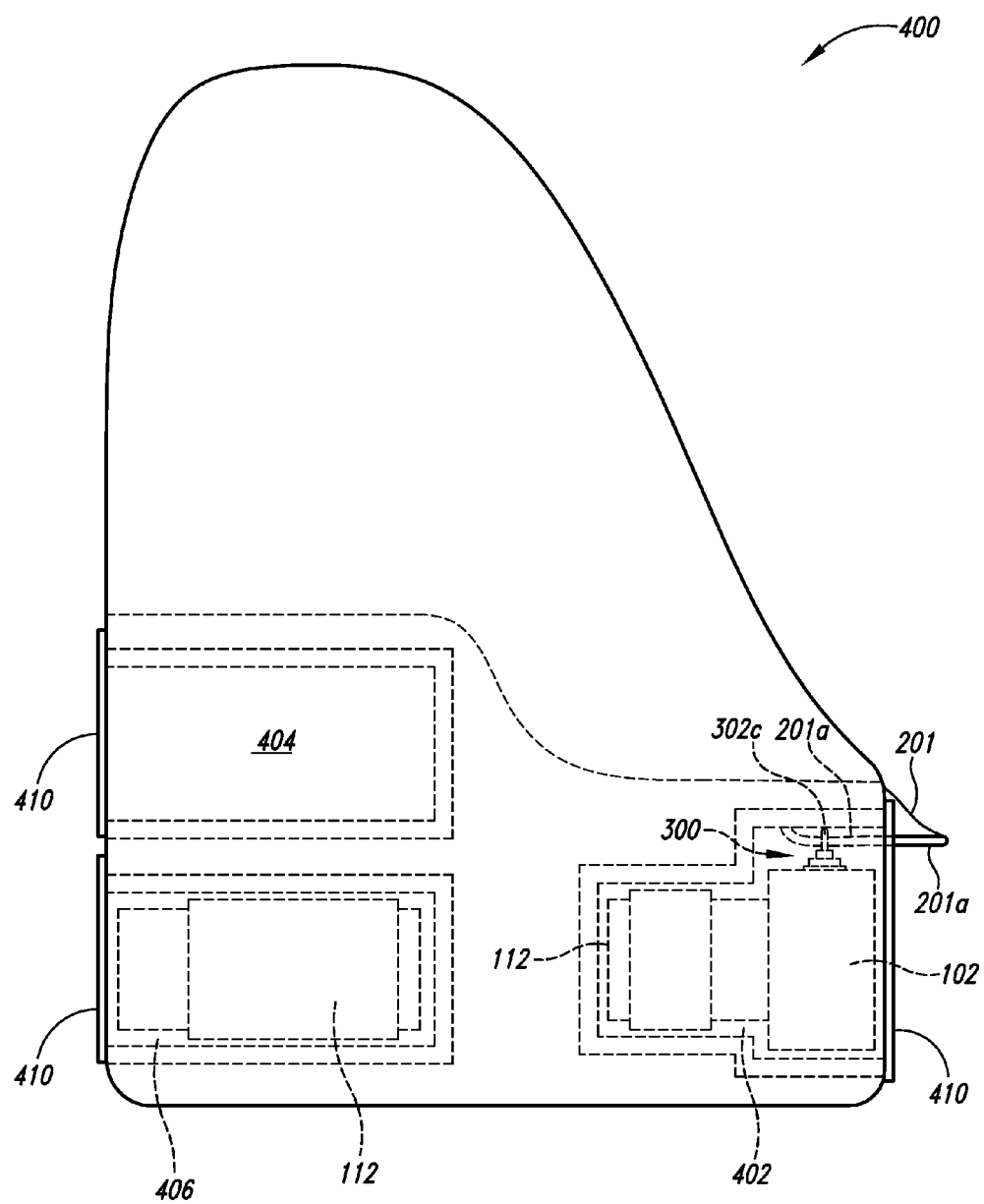
FIG. 33 is an elevational view of the implementation depicted in FIG. 32, further showing a multitude of storage compartments in hidden lines.

FIG. 33 is a rear view of the system 100 depicted in FIG. 32.

Further shown is a number of compartments (shown in hidden lines) stowing various camera components. Auxiliary storage is also shown.

Figure 34:
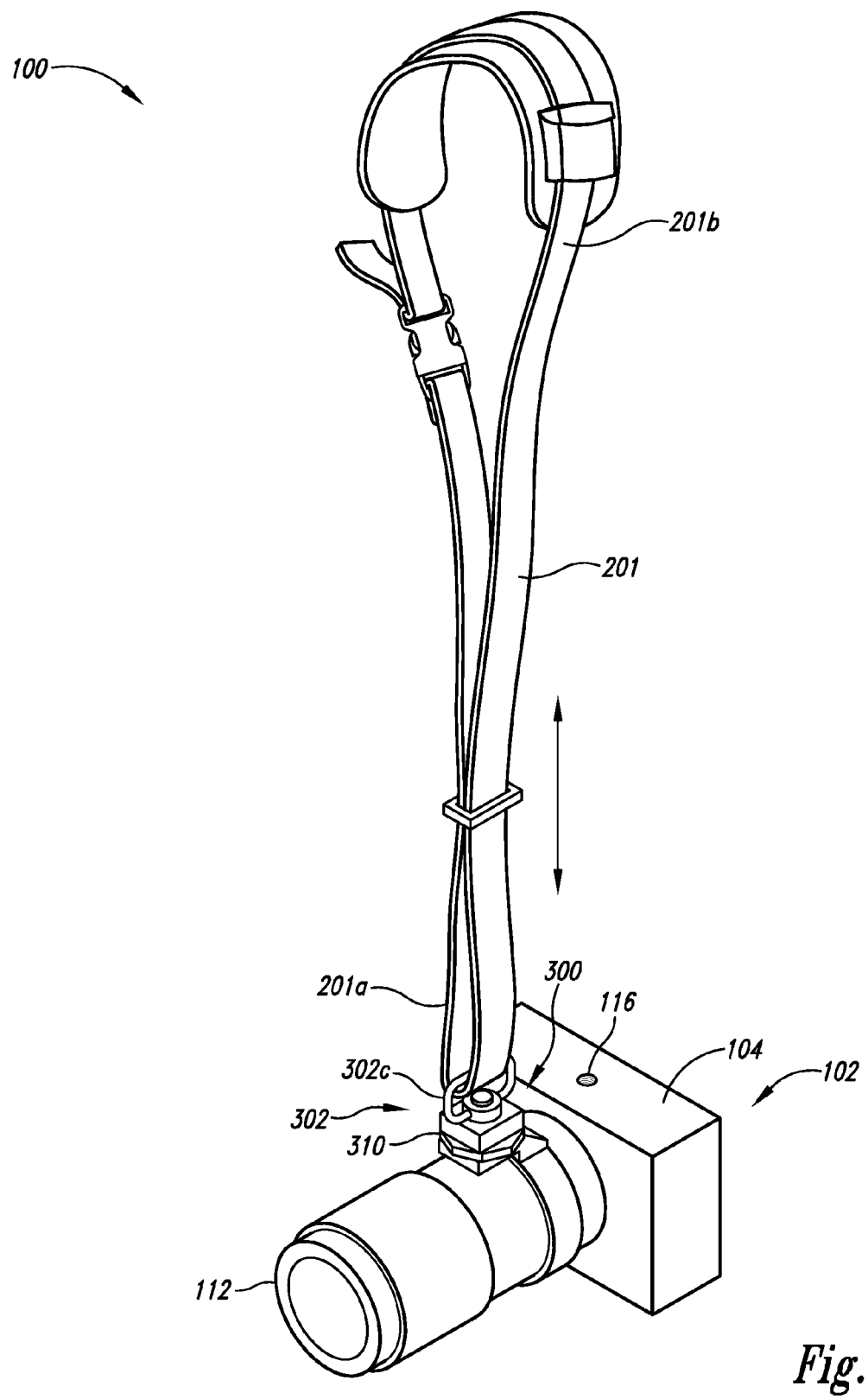
FIG. 34 shows the implementation depicted in FIG. 29, but otherwise having the coupler coupled with the lens based conventional threadable stand socket.

FIG. 34 shows the implementation depicted in FIG. 29, but otherwise having the coupler coupled with the lens based conventional threadable stand socket.

Figure 35:
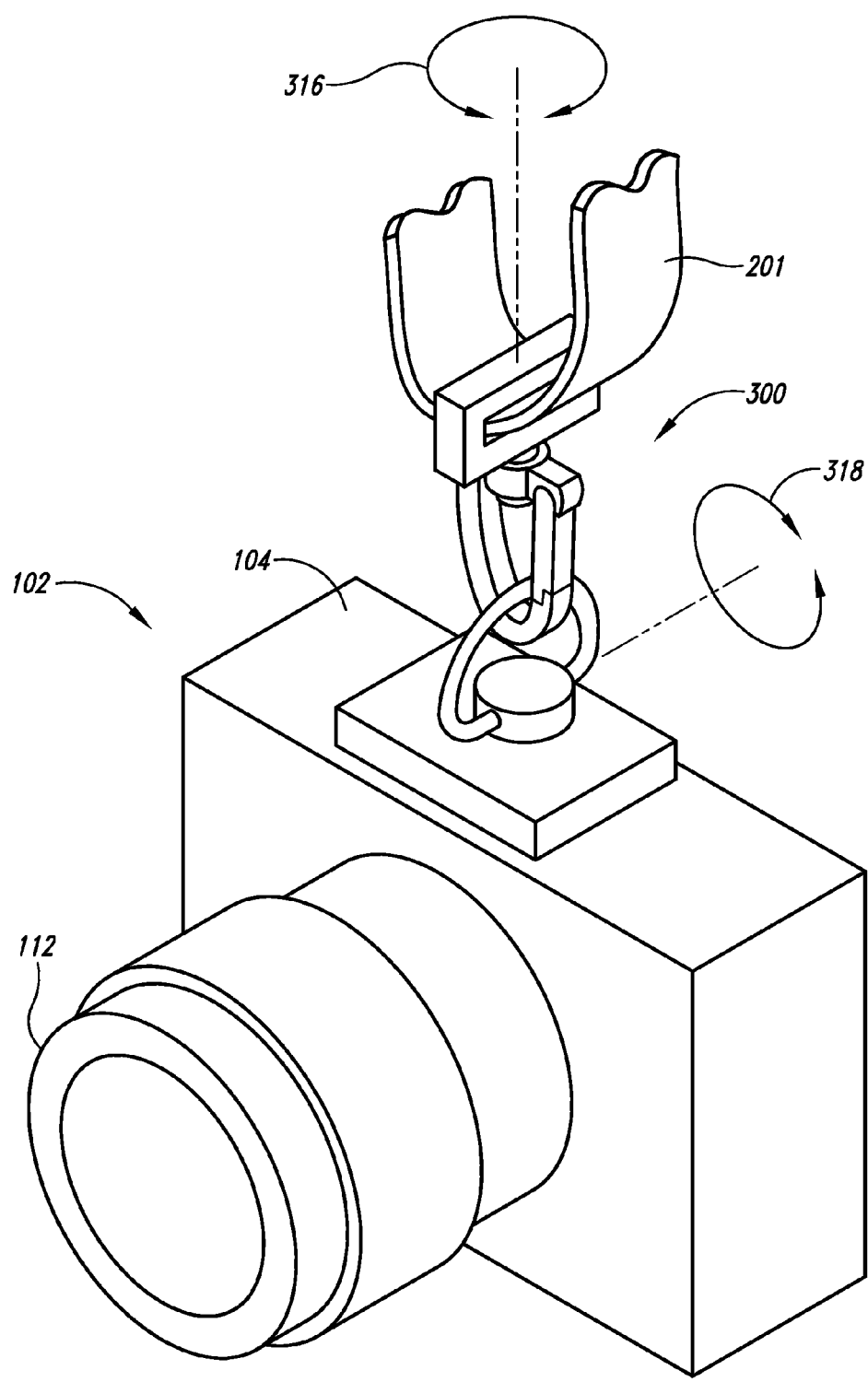
FIG. 35 shows an implementation of the coupler coupled to a camera, and further showing a conventional tripod mounting plate located between the coupler and camera.

FIG. 35 shows an implementation of the coupler coupled to a camera, and further showing a conventional tripod mounting plate located between the coupler and camera. This allows the coupler to remain intact with the camera, while still permitting use of the tripod mounting plate for mounting to a tripod.

Figure 36:
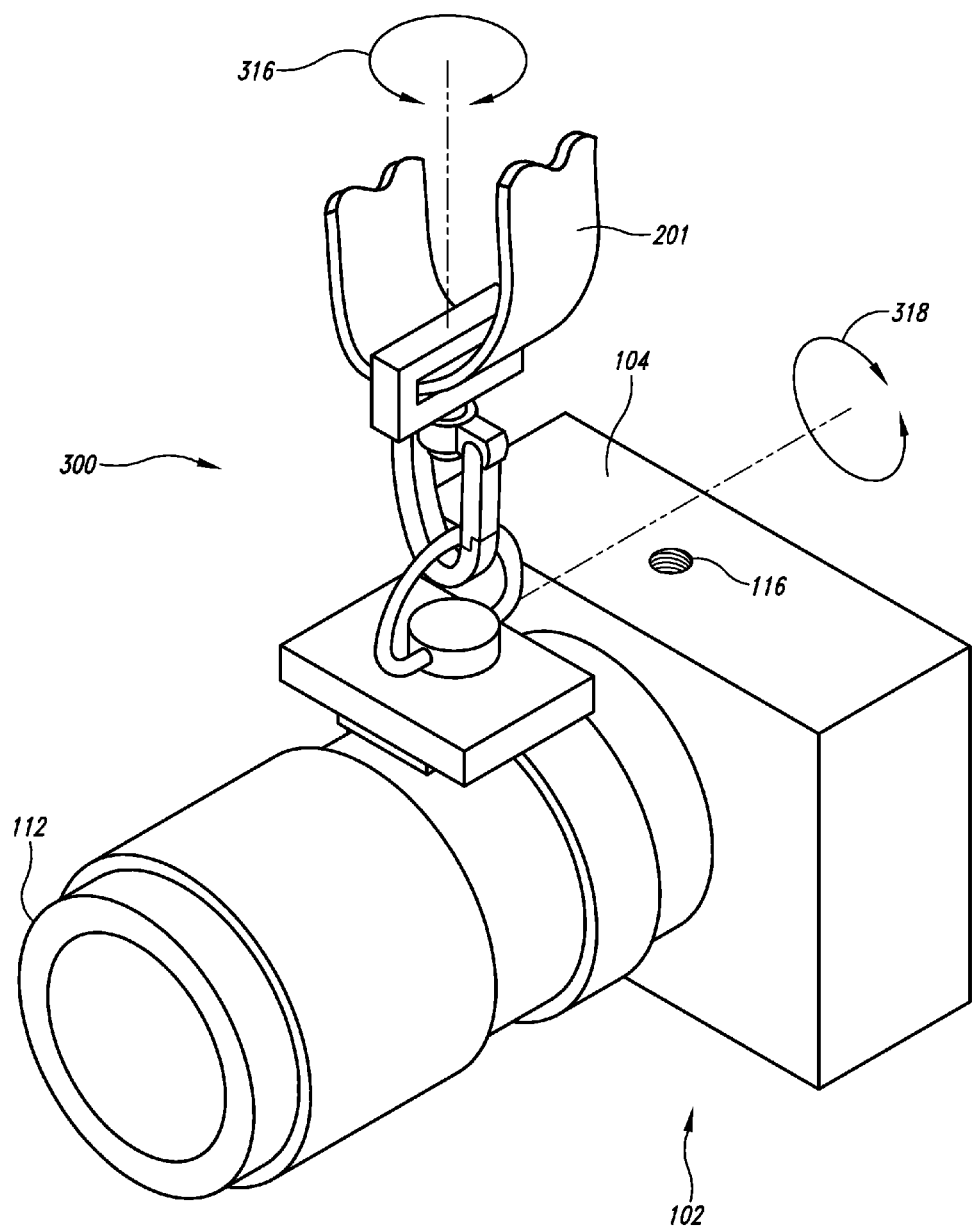
FIG. 36 shows an implementation of the coupler coupled to a camera, and further showing a conventional tripod mounting plate located between the coupler and lens.

FIG. 36 shows an implementation of the coupler coupled to a camera, and further showing a conventional tripod mounting plate located between the coupler and lens. This allows the coupler to remain intact with the lens, while still permitting use of the tripod mounting plate for mounting to a tripod.

Figure 37:
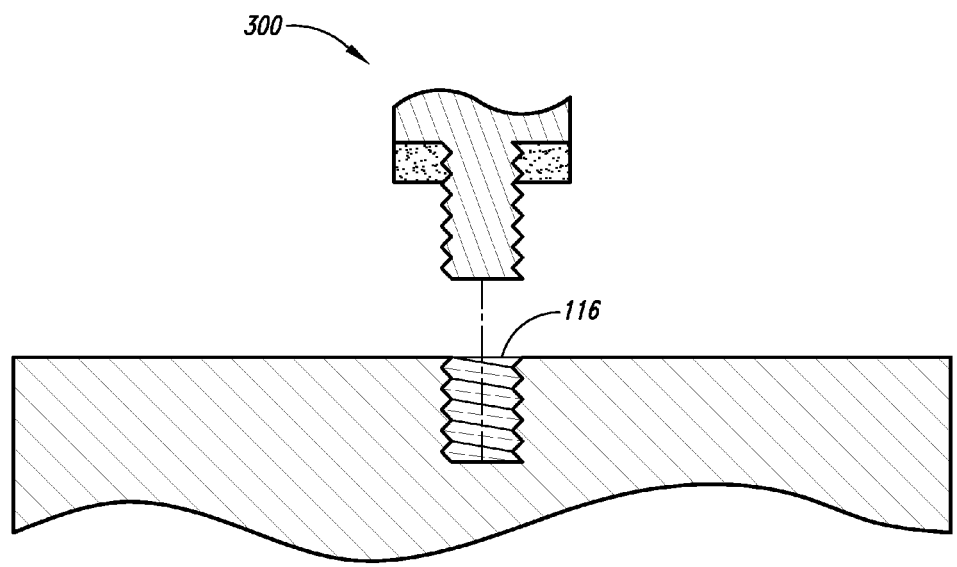
FIG. 37 is a cross sectional view of an exploded assembly of a conventional stand socket and a coupler, showing an alternate locking element located between the coupler and the stand socket.

FIG. 37 is a cross sectional view of an exploded assembly of a conventional stand socket and a coupler, showing an alternate locking element located between the coupler and the stand socket. The locking element can be made of a frictional and/or resilient material, which can further have a compressible or noncompressible nature.

Figure 38:
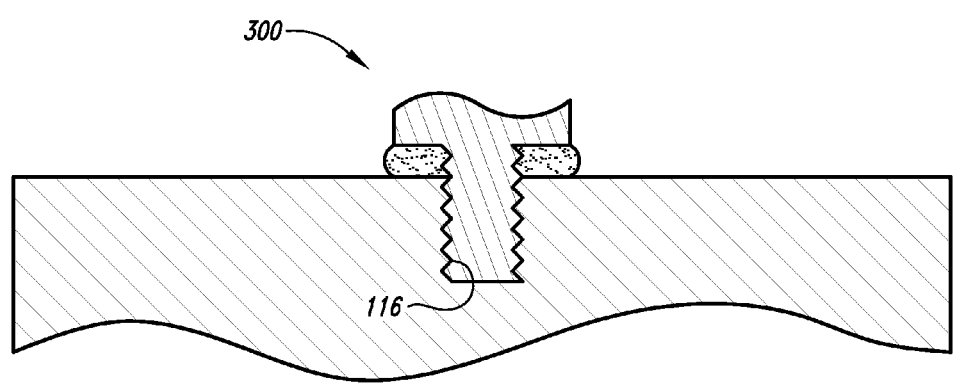
FIG. 38 show the implementation depicted in FIG. 37 in the assembled state, and the locking element promoting a secure engagement between the stand socket and coupler.

FIG. 38 show the implementation depicted in FIG. 37 in the assembled state, and the locking element promoting a secure engagement between the stand socket and coupler.

Figure 39:
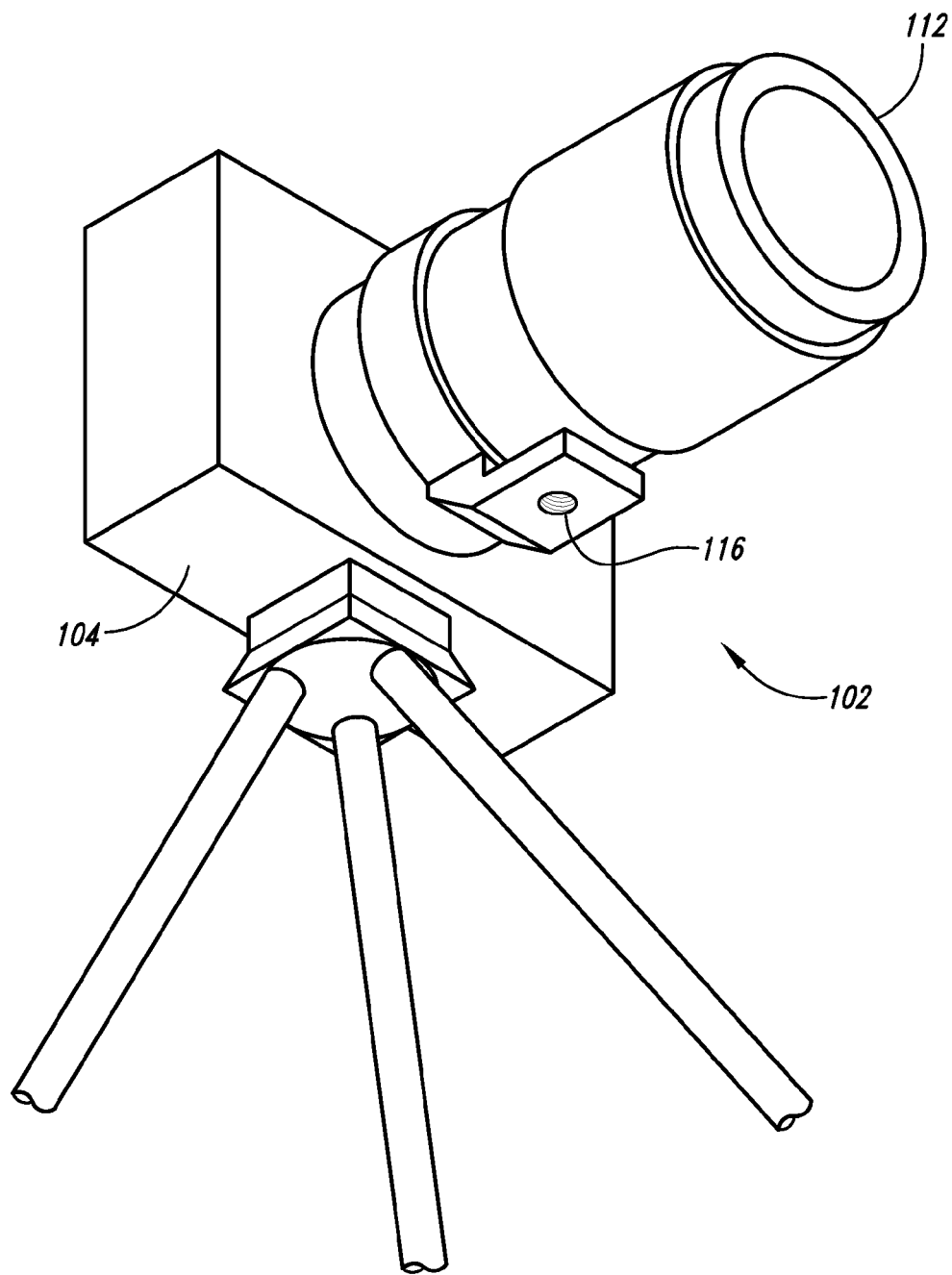
FIG. 39 shows a portion of a tripod coupled with a camera at the stand engagement portion of the bottom of the camera.

FIG. 39 shows a portion of a tripod coupled with a camera at the stand engagement portion of the bottom of the camera.

ASPECTS

1. For a camera having at least one engagement portion each configured to receive an engagement portion of a stand, a system for coupling with the engagement portion of the camera, the system comprising:
   a first strap; and
   a coupler having a first portion and a second portion, the first portion of the coupler sized and shaped to engage with the engagement portion of camera, the second portion of the coupler sized and shaped to engage with the first strap.

2. The system of aspect 1, further including:
   an enclosure having an interior area with an aperture and an exterior; and
   a shoulder strap with a first end portion and a second end portion attached to the exterior of the enclosure, the first end portion of the shoulder strap attached closer to the aperture and the second end of the shoulder strap attached farther from the aperture, the first strap having a first end portion attached to the enclosure inside the interior area.

3. The system of aspect 1, wherein the second portion of the coupler in configured to slideably engage with the first strap.

4. The system of aspect 3, wherein the first strap has a second end portion attached to the shoulder strap adjacent to the second end of the shoulder strap.

5. The system of aspect 4, wherein the enclosure further includes a covering to cover the aperture.

6. The system of aspect 1, wherein the second portion of the coupler is rotatably couplable to the first portion of the coupler.

7. The system of aspect 1, wherein the first strap is sized to fit over a human torso.

8. The system of aspect 1, wherein the first strap is formed into a loop.

9. The system of aspect 1 further includes a second strap and a strap coupler, the first strap being engaged with the second strap via the first strap coupler.

10. The system of aspect 1, wherein the second portion of the coupler includes a loop to receive the first strap inserted therethrough.

11. The system of aspect 10, wherein the first portion of the coupler includes a loop and the second portion of the coupler includes a hook, the hook of the second portion shaped to engage the loop of the first portion.

12. The system of aspect 11, wherein the loop and the hook of the second portion of the coupler are rotatably engaged.

13. The system of aspect 12, wherein the hook of the second portion of the coupler includes a safety clasp.

14. The system of aspect 11, wherein the first strap has a flat shape and the loop has an elongated shape.

15. The system of aspect 11, wherein the second portion of the coupler includes a base rotatably couplable to the first portion of the coupler and the loop is pivotally coupled to the base.

16. The system of aspect 11, wherein the second portion of the coupler includes a ball lock pin and the first portion of the coupler includes a ball lock socket, the ball lock pin being releasably couplable with the ball lock socket.

17. The system of aspect 11, wherein the second portion of the coupler is releasably couplable with the first portion of the coupler.

18. The system of aspect 1, wherein the engagement portion of the camera is a stand socket, the first portion of the coupler sized and shaped to engage with the stand socket of the camera.

19. The system of aspect 18, wherein the stand socket is threaded and the first portion of the coupler is threaded to threadably engage with the stand socket.

20. For a camera having a body with a bottom having an engagement portion, a system comprising:
   a first strap; and
   a coupler having a first portion and a second portion, the first portion of the coupler sized and shaped to engage with the engagement portion of camera, the second portion of the coupler sized and shaped to engage with the first strap.

21. The system of aspect 20, wherein second portion of the coupler is configured to slideably engage with the first strap.

22. A system comprising:
   a camera having an engagement portion configured to receive an engagement portion of a stand:
   a first strap; and
   a coupler having a first portion and a second portion, the first portion of the coupler configured to engage with the engagement portion of camera, the second portion of the coupler configured to engage with the first strap.

23. The system of aspect 22, further including:
   an enclosure having an interior area with an aperture and an exterior; and
   a shoulder strap with a first end portion and a second end portion attached to the exterior of the enclosure, the first end portion of the shoulder strap attached closer to the aperture and the second end of the shoulder strap attached farther from the aperture, the first strap having a first end portion attached to the enclosure inside the interior area.

24. The system of aspect 22, wherein the second portion of the coupler is configured to slideably engage with the first strap.

25. The system of aspect 24, wherein the first strap has a second end portion attached to the shoulder strap adjacent to the second end of the shoulder strap.

26. The system of aspect 24, wherein the enclosure further includes a covering to cover the aperture.

27. The system of aspect 22, wherein the second portion of the coupler is rotatably couplable to the first portion of the coupler.

28. The system of aspect 22, wherein the first strap is sized to fit over a human torso.

29. The system of aspect 22, wherein the first strap is formed into a loop.

30. The system of aspect 22, further includes a second strap and a strap coupler, the first strap being engaged with the second strap via the first strap coupler.

31. The system of aspect 22, wherein the second portion of the coupler includes a loop to receive the first strap inserted therethrough.

32. The system of aspect 30, wherein the first portion of the coupler includes a loop and the second portion of the coupler includes a hook, the hook of the second portion shaped to engage the loop of the first portion.

33. The system of aspect 31, wherein the loop and the hook of the second portion of the coupler are rotatably engaged.

34. The system of aspect 31, wherein the hook of the second portion of the coupler includes a safety clasp.

35. The system of aspect 30, wherein the first strap has a flat shape and the loop has an elongated shape.

36. The system of aspect 30, wherein the second portion of the coupler includes a base rotatably couplable to the first portion of the coupler and the loop is pivotally coupled to the base.

37. The system of aspect 30, wherein the second portion of the coupler includes a ball lock pin and the first portion of the coupler includes a ball lock socket, the ball lock pin being releasably couplable with the ball lock socket.

38. The system of aspect 30, wherein the second portion of the coupler is releasably couplable with the first portion of the coupler.

39. The system of aspect 22, wherein the engagement portion of the camera is a stand socket, the first portion of the coupler sized and shaped to engage with the stand socket of the camera.

40. The system of aspect 30, wherein the stand socket is threaded and the first portion of the coupler is threaded to threadably engage with the stand socket.

41. A system comprising:
a camera having a body with a bottom having an engagement portion;
a first strap; and
a coupler having a first portion and a second portion, the first portion of the coupler configured to engage with the engagement portion of camera, the second portion of the coupler configured to engage with the first strap.

42. The system of aspect 41, wherein the second portion of the coupler is configured to slideably engage with the first strap.

43. A system comprising:
a camera having an attachment point to engage with a stand; and
a strap coupled with the camera at the attachment point.

44. The system of aspect 43, wherein the camera is slideably attached to the strap.

45. A method comprising:
providing a camera with an attachment point for a stand;
attaching a coupler to the attachment point; and
attaching a strap to the coupler.

46. The method of aspect 45, wherein attaching a strap includes slideably attaching the strap to the coupler.

47. A method comprising:
providing a camera having a bottom and a top, the camera having an attachment point at the bottom of the camera;
hanging the camera top-side down from a shoulder of a human body by a strap coupled to the attachment point;
grabbing the camera with at least one hand of the human body; and
positioning the camera right-side up.

48. The method of aspect 47, wherein positioning the camera includes sliding the camera along the strap.

49. A method comprising:
reaching behind a human torso to grab a camera;
pulling the camera out of an enclosure located behind a human torso; and
sliding the camera along a strap attached to the enclosure to aim the camera.

50. For a camera having one engagement portion configured to receive an engagement portion of a stand, a system comprising:
a first strap;
a coupler having a first portion and a second portion, the first portion of the coupler sized and shaped to engage with the engagement portion of camera, the second portion of the coupler sized and shaped to engage with the first strap;
an enclosure having an interior area with an aperture and an exterior; and
a shoulder strap with a first end portion and a second end portion attached to the exterior of the enclosure, the first end portion of the shoulder strap attached closer to the aperture and the second end of the shoulder strap attached farther from the aperture, the first strap having a first end portion attached to the enclosure inside the interior area.

51. The system of aspect 50, wherein the second portion of the coupler is configured to slideably engage with the first strap.

52. The system of aspect 51, wherein the first strap has a second end portion attached to the shoulder strap adjacent to the second end of the shoulder strap.

53. The system of aspect 50, wherein the enclosure further includes a covering to cover the aperture.

From the foregoing it will be appreciated that, although specific implementations of the invention have been described herein for purposes of illustration, various modifications can be made without deviating from the spirit and scope of the invention. Accordingly, the invention is not limited except as by the appended claims.

From the foregoing it will be appreciated that, although specific implementations of the invention have been described herein for purposes of illustration, various modifications can be made without deviating from the spirit and scope of the invention. Accordingly, the invention is not limited except as by the appended claims.

The invention claimed is:

1. For a camera having at least one engagement portion and carried by a user, a system for coupling with the engagement portion of the camera, the system comprising:
an elongated first strap having first and second portions, the first portion of the first strap sized to be positioned over a shoulder of the user and extend downward therefrom toward a hip of the user;
a coupler having a first portion and a second portion, the first portion of the coupler sized and shaped to engage with the engagement portion of the camera, and the second portion of the coupler sized and shaped to slidably engage with the second portion of the first strap and slide along a length of the second portion of the first strap;
an enclosure having an interior area with an aperture and an exterior; and wherein the first portion of the first strap has a first end portion attached to the exterior of the enclosure, and the second portion of the first strap extends toward the aperture of the enclosure for positioning of the camera within the enclosure.

2. The system of claim 1, wherein the second portion of the first strap has a first end portion attached to the enclosure inside the interior area of the enclosure.

3. The system of claims 1, further including a shoulder strap with a first end portion attached to the exterior of the enclosure and a second end portion attached to the exterior of the enclosure, the second end portion of the shoulder strap attached closer to the aperture and the first end portion of the shoulder strap attached farther from the aperture.

4. The system of claim 3, wherein the first portion of the first strap has a first end portion attached to the shoulder strap adjacent to the first end portion of the shoulder strap.

5. The system of claims 1, wherein the enclosure further includes a covering to cover the aperture.

6. The system of claim 1, wherein the second portion of the coupler is rotatably couplable to the first portion of the coupler.

7. The system of claim 1, wherein the first strap is formed into a loop.

8. The system of claim 7, wherein the loop is sized to extend around a human torso of the user, around the shoulder on one side of the user downward to and around the other side of the torso of the user.

9. The system of claims 1, wherein the first portion of the coupler includes a second strap and a camera coupler engageable with the engagement portion of the camera.

10. The system of claim 1, wherein the second portion of the coupler includes a strap loop to slidably receive the second portion of the first strap therethrough.

11. For a camera having at least one engagement portion and carried by a user, a system for coupling with the engagement portion of the camera, the system comprising:
an elongated first strap having first and second portions, the first portion of the first strap sized to be positioned over a shoulder of the user and extend downward therefrom toward a hip of the user; and
a coupler having a first portion and a second portion, the first portion of the coupler sized and shaped to engage with the engagement portion of the camera, and the second portion of the coupler sized and shaped to slidably engage with the second portion of the first strap and slide along a length of the second portion of the first strap, wherein the first portion of the coupler includes an engagement loop and a hook, the hook shaped to engage the engagement loop, and wherein the second portion of the coupler includes a strap loop to slidably receive the second portion of the first strap therethrough.

12. The system of claim 11, wherein the strap loop of the second portion of the coupler and the hook of the first portion of the coupler are rotatably engaged.

13. The system of claim 12, wherein the hook of the first portion of the coupler includes a safety clasp.

14. For a camera having at least one engagement portion and carried by a user, a system for coupling with the engagement portion of the camera, the system comprising:
an elongated first strap having first and second portions, the first portion of the first strap sized to be positioned over a shoulder of the user and extend downward therefrom toward a hip of the user; and
a coupler having a first portion and a second portion, the first portion of the coupler sized and shaped to engage with the engagement portion of the camera, and the second portion of the coupler sized and shaped to slidably engage with the second portion of the first strap and slide along a length of the second portion of the first strap, wherein the second portion of the coupler includes a ball lock pin and the first portion of the coupler includes a ball lock socket, the ball lock pin being releasably couplable with the ball lock socket.

15. For a camera having at least one engagement portion and carried by a user, a system for coupling with the engagement portion of the camera, the system comprising:
an elongated first strap having first and second portions, the first portion of the first strap sized to be positioned over a shoulder of the user and extend downward therefrom toward a hip of the user; and
a coupler having a first portion and a second portion, the first portion of the coupler sized and shaped to engage with the engagement portion of the camera, and the second portion of the coupler sized and shaped to slidably engage with the second portion of the first strap and slide along a length of the second portion of the first strap, wherein the second portion of the coupler is releasably couplable with the first portion of the coupler.

16. For a camera having at least one engagement portion and carried by a user, a system for coupling with the engagement portion of the camera, the system comprising:
an elongated first strap having first and second portions, the first portion of the first strap sized to be positioned over a shoulder of the user and extend downward therefrom toward a hip of the user; and
a coupler having a first portion and a second portion, the first portion of the coupler sized and shaped to engage with the engagement portion of the camera, and the second portion of the coupler sized and shaped to slidably engage with the second portion of the first strap and slide along a length of the second portion of the first strap, wherein the engagement portion of the camera is a stand socket, the first portion of the coupler is sized and shaped to engage with the stand socket of the camera.

17. A camera system comprising:
a camera having at least one engagement portion, wherein the camera has a bottom and the engagement portion is located in the camera bottom and configured to threadably receive a threaded engagement portion of a camera stand;
an elongated first strap having first and second portions, the first portion of the first strap sized to be positioned over a shoulder of the user and extend downward therefrom toward a hip of the user; and
a coupler having a first portion and a second portion, the first portion of the coupler sized and shaped to engage with the engagement portion of the camera, and the second portion of the coupler sized and shaped to slidably engage with the second portion of the first strap and slide along a length of the second portion of the first strap.

18. The camera system of claim 17, wherein the second portion of the coupler is rotatably couplable to the first portion of the coupler.

19. The camera system of claim 17, wherein the first strap is formed into a loop.

20. A camera system comprising:
a camera having at least one engagement portion;
an elongated first strap having first and second portions, the first portion of the first strap sized to be positioned over a shoulder of the user and extend downward therefrom toward a hip of the user;

a coupler having a first portion and a second portion, the first portion of the coupler sized and shaped to engage with the engagement portion of the camera, and the second portion of the coupler sized and shaped to slidably engage with the second portion of the first strap and slide along a length of the second portion of the first strap;

an enclosure having an interior area with an aperture and an exterior; and wherein the first portion of the first strap has a first end portion attached to the exterior of the enclosure, and the second portion of the first strap extends toward the aperture of the enclosure for positioning of the camera within the enclosure.

21. The camera system of claim 20, wherein the second portion of the first strap has a first end portion attached to the enclosure inside the interior area of the enclosure.

22. The camera system of claims 20, further including a shoulder strap with a first end portion attached to the exterior of the enclosure and a second end portion attached to the exterior of the enclosure, the second end portion of the shoulder strap attached closer to the aperture and the first end portion of the shoulder strap attached farther from the aperture.

23. The camera system of claim 22, wherein the first portion of the first strap has a first end portion attached to the shoulder strap adjacent to the first end portion of the shoulder strap.

24. A camera system comprising:
a camera having at least one engagement portion, wherein the engagement portion of the camera is a stand socket;
an elongated first strap having first and second portions, the first portion of the first strap sized to be positioned over a shoulder of the user and extend downward therefrom toward a hip of the user; and
a coupler having a first portion and a second portion, the first portion of the coupler sized and shaped to engage with the engagement portion of the camera, and the second portion of the coupler sized and shaped to slidably engage with the second portion of the first strap and slide along a length of the second portion of the first strap.

25. The system of claim 24, wherein the stand socket is threaded and the first portion of the coupler is threaded to threadably engage with the stand socket.

26. A method comprising:
providing an elongated first strap having first and second portions, the first portion of the first strap sized to be positioned over a shoulder of a user and extend downward therefrom toward a hip of the user;
positioning the first portion of the first strap over the shoulder of the user;
providing a coupler having a first portion and a second portion, the first portion of the coupler sized and shaped to engage with an engagement portion of a camera, and the second portion of the coupler sized and shaped to slidably engage with the second portion of the first strap and slide along the length of the second portion of the first strap:
providing a camera having an engagement portion;
attaching the first portion of the coupler to the engagement portion of the camera;
sliding the second portion of the coupler along the second portion of the first strap, with the first portion of the coupler engaging the engagement portion of the camera and the second portion of the coupler slidably engaging the second portion of the first strap, to move the camera alone the second portion of the first strap to a lowered transport position for the camera;
grabbing the camera with at least one hand of the user and sliding the second portion of the coupler along the second portion of the first strap, with the first portion of the coupler engaging the engagement portion of the camera and the second portion of the coupler slidably engaging the second portion of the first strap, to move the camera along the second portion of the first strap to a raised picture taking position for the camera;
providing an enclosure sized to receive the camera therein;
positioning the camera within the enclosure;
reaching into the enclosure and grabbing the camera when within the enclosure with the at least one hand of the user;
pulling the camera out of the enclosure; and then
sliding the second portion of the coupler along the second portion of the first strap, with the first portion of the coupler engaging the engagement portion of the camera and the second portion of the coupler slidably engaging the second portion of the first strap, to move the camera along the second portion of the first strap to the raised picture taking position for the camera.

27. The method of claim 26, further including:
positioning the enclosure behind a human torso of the user;
reaching behind the human torso of the user and then reaching into the enclosure and grabbing the camera when within the enclosure; and
pulling the camera out of the enclosure while the enclosure remains located behind the human torso of the user.

28. A method comprising:
providing an elongated first strap having first and second portions, the first portion of the first strap sized to be positioned over a shoulder of a user and extend downward therefrom toward a hip of the user;
positioning the first portion of the first strap over the shoulder of the user;
providing a coupler having a first portion and a second portion, the first portion of the coupler sized and shaped to engage with an engagement portion of a camera, and the second portion of the coupler sized and shaped to slidably engage with the second portion of the first strap and slide along the length of the second portion of the first strap;
providing a camera having an engagement portion;
attaching the first portion of the coupler to the engagement portion of the camera;
sliding the second portion of the coupler along the second portion of the first strap, with the first portion of the coupler engaging the engagement portion of the camera and the second portion of the coupler slidably engaging the second portion of the first strap, to move the camera along the second portion of the first strap to a lowered transport position for the camera;
sliding the second portion of the coupler along the second portion of the first strap, with the first portion of the coupler engaging the engagement portion of the camera and the second portion of the coupler slidably engaging the second portion of the first strap, to move the camera along the second portion of the first strap to a raised picture taking position for the camera;
providing an enclosure sized to receive the camera therein;
positioning the camera within the enclosure;
reaching into the enclosure and grabbing the camera when within the enclosure with the at least one hand of the user;

pulling the camera out of the enclosure; and then sliding the second portion of the coupler along the second portion of the first strap, with the first portion of the coupler engaging the engagement portion of the camera and the second portion of the coupler slidably engaging the second portion of the first strap, to move the camera along the second portion of the first strap to the raised picture taking position for the camera.

29. The method of claim 28, further including:

positioning the enclosure behind a human torso of the user;

reaching behind the human torso of the user and then reaching into the enclosure and grabbing the camera when within the enclosure; and pulling the camera out of the enclosure while the enclosure remains located behind the human torso of the user.

30. The method of claim 28, wherein providing a camera having an engagement portion comprises providing the camera with the attachment point at a bottom of the camera, and wherein the camera is moved along the second portion of the first strap to the lowered transport position for the camera with the camera hanging from the shoulder of the user for transport in a top-side down orientation, and wherein the camera is subsequently moved along the second portion of the first strap to the raised picture taking position for the camera with the camera held by the user for picture taking in a top-side up orientation.

* * * * *

(12) EX PARTE REEXAMINATION CERTIFICATE (9544th)
United States Patent
Kope et al.

(10) Number: US 8,047,729 C1
(45) Certificate Issued: *Mar. 5, 2013

(54) ENHANCED CAMERA TRANSPORT SYSTEM AND METHOD

(75) Inventors: Tyler R. M. Kope, Seattle, WA (US); Ronald D. Henry, Seattle, WA (US)

(73) Assignee: Black Rapid, Inc., Seattle, WA (US)

Reexamination Request:
No. 90/011,993, Nov. 1, 2011

Reexamination Certificate for:
Patent No.: 8,047,729
Issued: Nov. 1, 2011
Appl. No.: 12/964,047
Filed: Dec. 9, 2010

( * ) Notice: This patent is subject to a terminal disclaimer.

Related U.S. Application Data

(63) Continuation of application No. 12/105,222, filed on Apr. 17, 2008, now Pat. No. 7,866,899.

(60) Provisional application No. 60/912,382, filed on Apr. 17, 2007.

(51) Int. Cl.
*G03B 17/00* (2006.01)
*B65D 85/38* (2006.01)

(52) U.S. Cl. .................................... 396/423; 206/316.2
(58) Field of Classification Search ........................ None
See application file for complete search history.

(56) References Cited

To view the complete listing of prior art documents cited during the proceeding for Reexamination Control Number 90/011,993, please refer to the USPTO's public Patent Application Information Retrieval (PAIR) system under the Display References tab.

*Primary Examiner* — Robert Nasser

(57) ABSTRACT

An enhanced camera transport system and method includes a strap and coupler. The coupler is configured to engage with an attachment point on a camera otherwise reserved by engagement with a camera stand such as a tripod, monopod, or the like. Following general camera construction, the attachment point is found on the bottom of the camera. In some implementations, the coupler is slideably attached to the strap to assist with repositioning of the camera from a transport position to a picture taking position. Other implementations include an enclosure for storage of the camera while not being used.

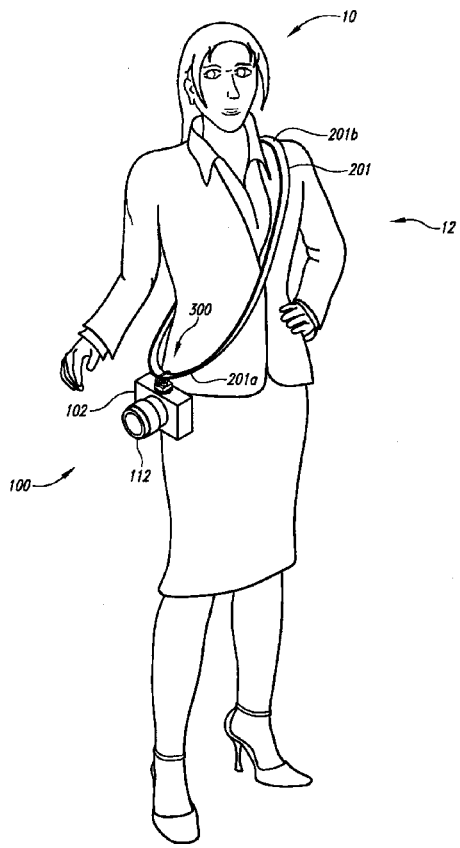

US 8,047,729 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 14 is confirmed.
Claims 16-20, 24 and 25 are cancelled.
Claims 1-3, 5-13, 15, 21-22 and 26-29 are determined to be patentable as amended.
Claim 30, dependent on an amended claim, is determined to be patentable.
New claims 31-56 are added and determined to be patentable.
Claims 4 and 23 were not reexamined.

1. For a camera having at least one engagement portion and carried by a user, a system for coupling with the engagement portion of the camera, the system comprising:
   an elongated first strap having first and second portions, the first portion of the first strap sized to be positioned over a shoulder of the user and extend downward therefrom toward a hip of the user *and the second portion of the first strap sized to extend downwardly from the first portion of the first strap to the hip of the user*;
   a coupler having a first *coupler* portion and a second *coupler* portion, the first *coupler* portion [of the coupler] sized and shaped to engage with the engagement portion of the camera, and the second *coupler* portion [of the coupler] sized and shaped to slidably engage with the second portion of the first strap and slide along a length of the second portion of the first strap, *the first coupler portion having a first attachment portion removably attachable to the engagement portion of the camera and a second attachment portion, and the second coupler portion having a first attachment portion slidably engaging the second portion of the first strap and a second attachment portion removably connected to the second attachment portion of the first coupler portion, the second portion of the first strap being sufficiently long to allow the user to move the coupler along the second portion of the first strap as the camera is moved between a raised picture taking position and a lowered transport position at the hip of the user*;
   an enclosure having an interior area with an aperture and an exterior, *the aperture being sized to permit the passage of the camera through the aperture when the first coupler portion is attached to the engagement portion of the camera, the enclosure having a strap attachment portion spaced away from the aperture at a first distance from the aperture, the enclosure being suspended by the first strap and free to move relative to the hip of the user when the first portion of the first strap is positioned over the shoulder of the user*; and
   wherein the first portion of the first strap has a first end portion attached to the exterior of the enclosure *at the strap attachment portion to prevent movement of the enclosure along the first strap*, and the second portion of the first strap extends toward the aperture of the enclosure for positioning of the camera within the *interior area of the* enclosure *and has a first end portion positioned adjacent to the aperture at a second distance from the aperture, the first distance being greater than the second distance, and when the first portion of the first strap is positioned over the shoulder of the user, the first distance being sufficiently large to not permit positioning of the camera within the interior area of the enclosure when the coupler is moved along the first strap to a first position toward the strap attachment first portion and the second distance being sufficiently small to permit passage of the camera through the aperture and the positioning of the camera within the interior area of the enclosure when the coupler is moved along the first strap to a second position toward the first end portion of the second portion of the first strap*.

2. The system of claim 1, wherein *the first end portion of* the second portion of the first strap [has a first end portion attached to] *extends through the aperture to inside the interior area of the enclosure so as to permit the coupler to move along the first strap to the second position of the coupler* whereat the [enclosure] *camera* is permitted to be positioned inside the interior area of the enclosure *with the second portion of the first strap extending through the aperture and into the interior area of the enclosure while the first coupler portion remains engaged with the engagement portion of the camera*.

3. [The system of claims 1] *For a camera having at least one engagement portion and carried by a user, a system for coupling with the engagement portion of the camera, the system comprising:*
   *an elongated first strap having first and second portions, the first portion of the first strap sized to be positioned over a shoulder of the user and extend downward therefrom toward a hip of the user;*
   *a coupler having a first portion and a second portion, the first coupler portion sized and shaped to engage with the engagement portion of the camera, and the second coupler portion sized and shaped to slidably engage with the second portion of the first strap and slide along a length of the second portion of the first strap;*
   *an enclosure having an interior area with an aperture and an exterior; and*
   *wherein the first portion of the first strap has a first end portion attached to the exterior of the enclosure, and the second portion of the first strap extends toward the aperture of the enclosure for positioning of the camera within the enclosure,*
   further including a shoulder strap with a first end portion attached to the exterior of the enclosure and a second end portion attached to the exterior of the enclosure, the second end portion of the shoulder strap attached closer to the aperture and the first end portion of the shoulder strap attached farther from the aperture.

5. The system of claims 1, wherein the enclosure further includes a covering to cover the aperture, *the covering having an upper end portion and a lower end portion, the lower end portion being hingedly attached to the enclosure at a position below the aperture for pivotal movement between a close position covering the aperture and an open position uncovering the aperture for passage of the camera through the aperture when moving into and out of the interior area of the enclosure, when the covering is moved from the closed position to the open position, the upper end portion of the cover-*

*ing being rotatable downward about the lower end portion of the covering to a position with the upper end portion of the covering below the aperture.*

6. The system of claim 1, wherein [the second portion of the coupler is] *the first attachment portion of the second coupler portion includes a rigid member and the second attachment portion of the second coupler portion includes a rigid member, the rigid member of the first attachment portion of the second coupler portion is in direct contact with and rotatably couplable to the rigid member of the second attachment portion of* the [first] *second coupler* portion [of the coupler].

7. The system of claim 1, wherein the first strap [is formed into a] *forms at least a partial* loop.

8. The system of claim 7, wherein the *at least partial* loop is sized to extend *partially* around a human torso of the user, [around] *from a rear side of the user, over* the shoulder [on one] *of the user to a front* side of the user *whereat the second portion of the first strap is located and* downward to [and around the other side of the torso of the user] *at least a position adjacent to the aperture whereat the first end portion of the second portion of the first strap is located.*

9. The system of claims 1, wherein *the first and second attachment portions of* the [first] *second coupler* portion [of the coupler includes] *are flexibly connected together by* a second strap and *the first attachment portion of the first coupler portion is* a camera coupler *directly threadably* engageable with the engagement portion of the camera.

10. The system of claim 1, wherein *the first attachment portion of* the second *coupler* portion [of the coupler] includes a strap loop to slidably receive the second portion of the first strap therethrough.

11. For a camera having at least one engagement portion and carried by a user, a system for coupling with the engagement portion of the camera, the system comprising:

an elongated [first] strap having first and second portions *together forming a loop sized to extend around a human torso of the user*, the first portion of the [first] strap sized to be positioned over a shoulder of the user and extend downward therefrom toward a hip of the user *on a front side of the user and on the rear side of the user, the second portion of the strap sized to extend downwardly from the first portion of the strap on the front side of the user and on the rear side of the user toward the hip of the user and define a bottom loop portion at the hip of the user, the loop being suspended from the shoulder of the user with the bottom loop portion free to move relative to the hip of the user when the first portion of the strap is positioned over the shoulder of the user*; and a coupler having a first *coupler* portion and a second *coupler* portion, the first *coupler* portion [of the coupler] sized and shaped to engage with the engagement portion of the camera, and the second *coupler* portion [of the coupler] sized and shaped to slidably engage with the second portion of the [first] strap and slide along a length of the second portion of the [first] strap, *the first coupler portion having a first attachment portion removably attachable to the engagement portion of the camera and a second attachment portion, and the second coupler portion having a first attachment portion slidably engaging the second portion of the strap and a second attachment portion removably connected to the second attachment portion of the first coupler portion, the second portion of the strap on the front side of the user being sufficiently long to allow the user to move the coupler along the second portion of the strap on the front side of the user as the camera is moved between a raised picture taking position and a lowered transport position at the hip of the user whereat the camera is fully supported by the strap*, wherein *the second attachment portion of* the first *coupler* portion [of the coupler] includes [an] *a rigid engagement loop and the second attachment portion of the second coupler portion includes* a hook, the hook shaped to [engage] *removably hook onto* the *rigid engagement loop, wherein the first attachment portion of the first coupler portion is a rigid member removably and rigidly attachable to the engagement portion of the camera and when attached to the camera held stationary relative to the camera as the camera is moved between the raised picture taking position and the lowered transport position suspended from the strap*, and wherein *the first attachment portion of* the second *coupler* portion [of the coupler] includes a strap loop to slidably receive the second portion of the [first] strap therethrough.

12. The system of claim 11, wherein the strap loop of the second *coupler* portion [of the coupler] and the hook of the [first] *second coupler* portion [of the coupler] are rotatably engaged.

13. The system of claim 12, wherein the hook of the [first] *second coupler* portion [of the coupler] includes a safety clasp.

15. For a camera having at least one engagement portion and carried by a user, a system for coupling with the engagement portion of the camera, the system comprising:

an elongated [first] strap having first and second portions *together forming a loop sized to extend around a human torso of the user*, the first portion of the [first] strap sized to be positioned over a shoulder of the user and extend downward therefrom toward a hip of the user *on a front side of the user and on the rear side of the user, the second portion of the strap sized to extend downwardly from the first portion of the strap on the front side of the user and on the rear side of the user toward the hip of the user and define a bottom loop portion at the hip of the user, the loop being suspended from the shoulder of the user with the bottom loop portion free to move relative to the hip of the user when the first portion of the strap is positioned over the shoulder of the user*; and a coupler having a first *coupler* portion and a second *coupler* portion, the first *coupler* portion [of the coupler] sized and shaped to engage with the engagement portion of the camera, and the second *coupler* portion [of the coupler] sized and shaped to slidably engage with the second portion of the [first] strap and slide along a length of the second portion of the [first] strap, *the first coupler portion being a rigid member and having a first attachment portion removably attachable to the engagement portion of the camera and a second attachment portion, and the second coupler portion being a rigid member and having a first attachment portion slidably engaging the second portion of the strap and a second attachment portion, the first attachment portion of the first coupler portion being removably and rigidly attachable to the engagement portion of the camera and when attached to the camera held stationary relative to the camera as the camera is moved between a raised picture taking position and a lowered transport position*, wherein *the second attachment portion of* the second *coupler* portion [of the coupler] is releasably couplable with *the second attachment portion of* the first *coupler* portion [of the coupler], *the second portion of the strap on the front side of the user being sufficiently long to allow the user to move the coupler along the second portion of the strap on the front side of the user as the camera is moved* between the raised picture taking position and the lowered transport position at the hip of the user whereat the camera is fully supported by the strap and free to move relative to the hip of the user when the first portion of the strap is positioned over the shoulder of the user.

21. [The camera system of claim 20] *A camera system comprising:*
*a camera having at least one engagement portion;*
*an elongated strap having first and second portions, the first portion of the strap sized to be positioned over a shoulder of the user and extend downward therefrom toward a hip of the user and the second portion of the strap sized to extend downwardly from the first portion of the strap toward the hip of the user on a front side of the user;*
*a coupler having a first coupler portion and a second coupler portion, the first coupler portion sized and shaped to engage with the engagement portion of the camera, and the second coupler portion sized and shaped to slidably engage with the second portion of the strap and slide along a length of the second portion of the strap, the first coupler portion having a first rigid attachment portion removably attachable to the engagement portion of the camera and a second rigid attachment portion, the first rigid attachment portion of the first coupler portion being removably and rigidly attachable to the engagement portion of the camera to prevent rotation of the first rigid attachment portion of the first coupler portion relative to the camera as the camera is moved between a raised picture taking position and a lowered transport position, and the second coupler portion having a first rigid attachment portion slidably engaging the second portion of the strap and a second rigid attachment portion, the second rigid attachment portion of the second coupler portion extends between the first rigid attachment portion of the second coupler portion and the second rigid attachment portion of the first coupler portion and the second rigid attachment portion of the first coupler portion extends between the first rigid attachment portion of the first coupler portion and the second rigid attachment portion of the second coupler portion, the second rigid attachment portion of the second coupler portion being removably connected to the second rigid attachment portion of the first coupler portion, the second rigid attachment portion of the second coupler portion being in direct contact with the second rigid attachment portion of the first coupler portion, the second portion of the strap being sufficiently long to allow the user to move the first rigid attachment portion of the second coupler portion along the second portion of the strap as the camera is moved between the raised picture taking position and the lowered transport position;*
*an enclosure having an interior area with an aperture and an exterior, the aperture being sized to permit the passage of the camera through the aperture when the first coupler portion is attached to the engagement portion of the camera, the enclosure having a strap attachment first portion spaced away from the aperture at a first distance from the aperture and a strap attachment second portion adjacent to the aperture at a second distance from the aperture, the enclosure being suspended by the strap and free to move relative to the hip of the user when the first portion of the strap is positioned over the shoulder of the user; and*
*wherein the first portion of the strap has a first end portion attached to the exterior of the enclosure at the strap attachment first portion, and the second portion of the strap extends toward the aperture of the enclosure for positioning of the camera within the interior area of the enclosure and has a first end portion attached to the enclosure at the strap attachment second portion, the first distance being greater than the second distance and when the first portion of the strap is positioned over the shoulder of the user, the first distance being sufficiently large to not permit positioning of the camera within the interior area of the enclosure when the coupler is moved along the strap to a first position toward the strap attachment first portion and the second distance being sufficiently small to permit passage of the camera through the aperture and the positioning of the camera within the interior area of the enclosure when the coupler is moved along the strap to a second position toward the strap attachment second portion,* wherein the second portion of the [first] strap has a first end portion attached to the enclosure inside the interior area of the enclosure.

22. [The camera system of claims 20] *A camera system comprising:*
*a camera having at least one engagement portion;*
*an elongated first strap having first and second portions, the first portion of the first strap sized to be positioned over a shoulder of the user and extend downward therefrom toward a hip of the user;*
*a coupler having a first portion and a second portion, the first coupler portion sized and shaped to engage with the engagement portion of the camera, and the second coupler portion sized and shaped to slidably engage with the second portion of the first strap and slide along a length of the second portion of the first strap;*
*an enclosure having an interior area with an aperture and an exterior; and*
*wherein the first portion of the first strap has a first end portion attached to the exterior of the enclosure, and the second portion of the first strap extends toward the aperture of the enclosure for positioning of the camera within the enclosure,*
further including a shoulder strap with a first end portion attached to the exterior of the enclosure and a second end portion attached to the exterior of the enclosure, the second end portion of the shoulder strap attached closer to the aperture and the first end portion of the shoulder strap attached farther from the aperture.

26. A method comprising:
providing an elongated [first] strap having first and second portions, the first portion of the [first] strap sized to be positioned over a shoulder of a user and extend downward therefrom toward a hip of the user *and the second portion of the strap sized to extend downwardly from the first portion of the strap toward the hip of the user*;
positioning the first portion of the [first] strap over the shoulder of the user;
providing a coupler having a first portion and a second portion, the first *coupler* portion [of the coupler] sized and shaped to engage with an engagement portion of a camera, and the second *coupler* portion [of the coupler] sized and shaped to slidably engage with the second portion of the [first] strap and slide along the length of the second portion of the [first] strap, *the first coupler portion having a first attachment portion removably attachable to the engagement portion of the camera and a second attachment portion, the first attachment portion of the first coupler portion including a rigid member removably and rigidly attachable to the engagement portion of the camera to prevent rotation of the rigid* member of the first attachment portion of the first coupler portion relative to the camera as the camera is moved between a raised picture taking position and a lowered transport position, the second attachment portion of the first coupler portion including a rigid member, and the second coupler portion having a first attachment portion slidably engaging the second portion of the strap and a second attachment portion removably connected to the second attachment portion of the first coupler portion, the second attachment portion of the second coupler portion including a rigid member in direct contact with the rigid member of the second attachment portion of the first coupler portion, the second portion of the strap being sufficiently long to allow the user to move the coupler along the second portion of the strap as the camera is moved between the raised picture taking position and the lowered transport position;

providing a camera having an engagement portion;

attaching *the rigid member of the first attachment portion of* the first *coupler* portion [of the coupler] to the engagement portion of the camera *so as to prevent rotation of the rigid member of the first attachment portion of the first coupler portion relative to the camera as the camera is moved between the raised picture taking position and the lowered transport position*;

sliding the second *coupler* portion [of the coupler] along the second portion of the [first] strap, with *the rigid member of the first attachment portion of* the first *coupler* portion [of the coupler] engaging the engagement portion of the camera and *the first attachment portion of* the second *coupler* portion [of the coupler] slidably engaging the second portion of the [first] strap, to move the camera [alone] *along* the second portion of the [first] strap to [a] *the* lowered transport position for the camera;

grabbing the camera with at least one hand of the user and sliding *the first attachment portion of* the second *coupler* portion [of the coupler] along the second portion of the [first] strap, with *the rigid member of the first attachment portion of* the first *coupler* portion [of the coupler] engaging the engagement portion of the camera and *the first attachment portion of* the second *coupler* portion [of the coupler] slidably engaging the second portion of the [first] strap, to move the camera along the second portion of the [first] strap to [a] *the* raised picture taking position for the camera;

providing an enclosure sized to receive the camera therein, the enclosure having an interior area with an aperture and an exterior, the aperture being sized to permit the passage of the camera through the aperture when the rigid member of the first attachment portion of the first coupler portion is attached to the engagement portion of the camera, the enclosure having a strap attachment first portion spaced away from the aperture at a first distance from the aperture and a strap attachment second portion adjacent to the aperture at a second distance from the aperture, the first portion of the strap having a first end portion attached to the exterior of the enclosure at the strap attachment first portion, the second portion of the strap extends toward the aperture of the enclosure for positioning of the camera within the interior area of the enclosure and has a first end portion attached to the enclosure at the strap attachment second portion, the first distance being greater that the second distance, and when the first portion of the strap is positioned over the shoulder of the user, the first distance being sufficiently large to not permit positioning of the camera within the interior area of the enclosure when the coupler is moved along the strap to a first position toward the strap attachment first portion and the second distance being sufficiently small to permit passage of the camera through the aperture and the positioning of the camera within the interior area of the enclosure when the coupler is moved along the strap to a second positioning toward the strap attachment second portion, the enclosure being suspended by the strap and free to move relative to the hip of the user when the first portion of the strap is positioned over the shoulder of the user;

positioning the camera within the enclosure *by passing the camera through the aperture into the interior area*;

reaching into the enclosure *through the aperture into the interior area* and grabbing the camera when within the enclosure with the at least one hand of the user;

pulling the camera out of the enclosure *through the aperture*; and then sliding *the first attachment portion of* the second *coupler* portion [of the coupler] along the second portion of the [first] strap, with *the rigid member of the first attachment portion of* the first *coupler* portion [of the coupler] engaging the engagement portion of the camera and *the first attachment portion of* the second *coupler* portion [of the coupler] slidably engaging the second portion of the [first] strap, to move the camera along the second portion of the [first] strap to the raised picture taking position for the camera.

27. [The method of claim 26 further including:]

*A method comprising:*

*providing an elongated first strap having first and second portions, the first portion of the first strap sized to be positioned over a shoulder of a user and extend downward therefrom toward a hip of the user;*

*positioning the first portion of the first strap over the shoulder of the user;*

*providing a coupler having a first coupler portion and a second coupler portion, the first coupler portion sized and shaped to engage with an engagement portion of a camera, and the second coupler portion sized and shaped to slidably engage with the second portion of the first strap and slide along the length of the second portion of the first strap;*

*providing a camera having an engagement portion;*

*attaching the first coupler portion to the engagement portion of the camera;*

*sliding the second coupler portion along the second portion of the first strap, with the first coupler portion engaging the engagement portion of the camera and the second coupler portion slidably engaging the second portion of the first strap, to move the camera along the second portion of the first strap to a lowered transport position for the camera;*

*grabbing the camera with at least one hand of the user and sliding the second coupler portion along the second portion of the first strap, with the first coupler portion engaging the engagement portion of the camera and the second coupler portion slidably engaging the second portion of the first strap, to move the camera along the second portion of the first strap to a raised picture taking position for the camera;*

*providing an enclosure sized to receive the camera therein;*

*positioning the camera within the enclosure;* positioning the enclosure behind a human torso of the user;

reaching behind the human torso of the user and then reaching into the enclosure and grabbing the camera when within the enclosure *with the at least one hand of the user*; [and]

pulling the camera out of the enclosure while the enclosure remains located behind the human torso of the user; *and then*
sliding the second coupler portion along the second portion of the first strap, with the first coupler portion engaging the engagement portion of the camera and the second coupler portion slidably engaging the second portion of the first strap, to move the camera along the second portion of the first strap to the raised picture taking position for the camera.

28. A method comprising:
providing an elongated [first] strap having first and second portions, the first portion of the [first] strap sized to be positioned over a shoulder of a user and extend downward therefrom toward a hip of the user *and the second portion of the strap sized to extend downwardly from the first portion of the strap toward the hip of the user*;
positioning the first portion of the [first] strap over the shoulder of the user;
providing a coupler having a first portion and a second portion, the first *coupler* portion [of the coupler] sized and shaped to engage with an engagement portion of a camera, and the second *coupler* portion [of the coupler] sized and shaped to slidably engage with the second portion of the [first] strap and slide along the length of the second portion of the [first] strap, *the first coupler portion having a first attachment portion removably attachable to the engagement portion of the camera and a second attachment portion, the first attachment portion of the first coupler portion including a rigid member removably and rigidly attachable to the engagement portion of the camera to prevent rotation of the rigid member of the first attachment portion of the first coupler portion relative to the camera as the camera is moved between a raised picture taking position and a lowered transport position, the second attachment portion of the first coupler portion including a rigid member, and the second coupler portion having a first attachment portion slidably engaging the second portion of the first strap and a second attachment portion removably connected to the second attachment portion of the first coupler portion, the second attachment portion of the second coupler portion including a rigid member in direct contact with the rigid member of the second attachment portion of the first coupler portion, the second portion of the strap being sufficiently long to allow the user to move the coupler along the second portion of the strap as the camera is moved between the raised picture taking position and the lowered transport position*;
providing a camera having an engagement portion;
attaching *the rigid member of the first attachment portion of* the first *coupler* portion [of the coupler] to the engagement portion of the camera *so as to prevent rotation of the rigid member of the first attachment portion of the first coupler portion relative to the camera as the camera is moved between the raised picture taking position and the lowered transport position*;
sliding the second *coupler* portion [of the coupler] along the second portion of the [first] strap, with *the rigid member of the first attachment portion of* the first *coupler* portion [of the coupler] engaging the engagement portion of the camera and *the first attachment portion of* the second *coupler* portion [of the coupler] slidably engaging the second portion of the [first] strap, to move the camera along the second portion of the [first] strap to [a] *the* lowered transport position for the camera;
sliding the second *coupler* portion [of the coupler] along the second portion of the [first] strap, with *the rigid member of the first attachment portion of* the first *coupler* portion [of the coupler] engaging the engagement portion of the camera and *the first attachment portion of* the second *coupler* portion [of the coupler] slidably engaging the second portion of the [first] strap, to move the camera along the second portion of the [first] strap to [a] *the* raised picture taking position for the camera;
providing an enclosure sized to receive the camera therein, *the enclosure having an interior area with an aperture and an exterior, the aperture being sized to permit the passage of the camera through the aperture when the rigid member of the first attachment portion of the first coupler portion is attached to the engagement portion of the camera, the enclosure having a strap attachment first portion spaced away from the aperture at a first distance from the aperture and a strap attachment second portion adjacent to the aperture at a second distance from the aperture, the first portion of the strap having a first end portion attached to the exterior of the enclosure at the strap attachment first portion, the second portion of the strap extends toward the aperture of the enclosure for positioning of the camera within the interior area of the enclosure and has a first end portion attached to the enclosure at the strap attachment second portion, the first distance being greater than the second distance, and when the first portion of the strap is positioned over the shoulder of the user, the first distance being sufficiently large to not permit positioning of the camera within the interior area of the enclosure when the coupler is moved along the strap to a first position toward the strap attachment first portion and the second distance being sufficiently small to permit passage of the camera through the aperture and the positioning of the camera within the interior area of the enclosure when the coupler is moved along the strap to a second position toward the strap attachment second portion, the enclosure being suspended by the strap and free to move relative to the hip of the user when the first portion of the strap is positioned over the shoulder of the user*;
positioning the camera within the enclosure *by passing the camera through the aperture into the interior area*;
reaching into the enclosure *through the aperture into the interior area* and grabbing the camera when within the enclosure with the at least one hand of the user;
pulling the camera out of the enclosure *through the aperture*; and then
sliding *the first attachment portion of* the second *coupler* portion [of the coupler] along the second portion of the [first] strap, with *the rigid member of the first attachment portion of* the first *coupler* portion [of the coupler] engaging the engagement portion of the camera and *the first attachment portion of* the second *coupler* portion [of the coupler] slidably engaging the second portion of the [first] strap, to move the camera along the second portion of the [first] strap to the raised picture taking position for the camera.

29. [The method of claim 28, further including:]
*A method comprising:*
*providing an elongated first strap having first and second portions, the first portion of the first strap sized to be positioned over a shoulder of a user and extend downward therefrom toward a hip of the user;*
*positioning the first portion of the first strap over the shoulder of the user;* providing a coupler having a first portion and a second portion, the first coupler portion sized and shaped to engage with an engagement portion of a camera, and the second coupler portion sized and shaped to slidably engage with the second portion of the first strap and slide along the length of the second portion of the first strap;

providing a camera having an engagement portion;

attaching the first coupler portion to the engagement portion of the camera;

sliding the second coupler portion along the second portion of the first strap, with the first coupler portion engaging the engagement portion of the camera and the second coupler portion slidably engaging the second portion of the first strap, to move the camera along the second portion of the first strap to a lowered transport position for the camera;

sliding the second coupler portion along the second portion of the first strap, with the first coupler portion engaging the engagement portion of the camera and the second coupler portion slidably engaging the second portion of the first strap, to move the camera along the second portion of the first strap to a raised picture taking position for the camera;

providing an enclosure sized to receive the camera therein;

positioning the camera within the enclosure;

positioning the enclosure behind a human torso of the user;

reaching behind the human torso of the user and then reaching into the enclosure and grabbing the camera when within the enclosure *with the at least one hand of the user*; [and]

pulling the camera out of the enclosure while the enclosure remains located behind the human torso of the user *; and then*

*sliding the second coupler portion along the second portion of the first strap, with the first coupler portion engaging the engagement portion of the camera and the second coupler portion slidably engaging the second portion of the first strap, to move the camera along the second portion of the first strap to the raised picture taking position for the camera.*

31. The system of claim 1, wherein the first attachment portion of the first coupler portion is a rigid member removably and rigidly attachable to the engagement portion of the camera such that when attached to the camera the rigid member of the first attachment portion of the first coupler portion is held stationary relative to the camera as the camera is moved between the raised picture taking position and the lowered transport position.

32. The system of claim 31 for use where the engagement portion of the camera has an axis, wherein the second attachment portion of the first coupler portion includes a rigid member and the second attachment portion of the second coupler portion includes a rigid member, the rigid member of the first attachment portion of the first coupler portion being positionable in the engagement portion of the camera in alignment with the axis, and the rigid member of the second attachment portion of the first coupler portion and the rigid member of the second attachment portion of the second coupler portion being rotatably connected together for relative rotation therebetween limited to rotation about the axis.

33. The system of claim 31, wherein the second attachment portion of the first coupler portion includes a rigid member, and the rigid member of the second attachment portion of the first coupler portion and the rigid member of the first attachment portion of the first coupler portion are in direct contact with each other.

34. The system of claim 33, wherein the second attachment portion of the second coupler portion includes a rigid member, and the rigid member of the second attachment portion of the second coupler portion and the rigid member of the second attachment portion of the first coupler portion are in direct contact with each other.

35. The system of claim 34, wherein the first attachment portion of the second coupler portion includes a rigid member, the rigid member of the first attachment portion of the second coupler portion and the rigid member of the second attachment portion of the second coupler portion are in direct contact with each other.

36. The system of claim 34, wherein the rigid member of the second attachment portion of the second coupler portion and the rigid member of the second attachment portion of the first coupler portion are removably connected together.

37. The system of claim 36, wherein the rigid member of the second attachment portion of the second coupler portion and the rigid member of the second attachment portion of the first coupler portion are rotatably coupled together.

38. The system of claim 36, wherein the rigid member of the first attachment portion of the second coupler portion and the rigid member of the second attachment portion of the second coupler portion are rotatably coupled together.

39. For a camera having at least one engagement portion and carried by a user, the engagement portion being a stand socket, a system for coupling with the stand socket of the camera for use where the stand socket of the camera has a first axis, the system comprising:

an elongated strap having first and second portions together forming a loop sized to extend around a human torso of the user, the first portion of the strap sized to be positioned over a shoulder of the user and extend downward therefrom toward a hip of the user on a front side of the user and on the rear side of the user, the second portion of the strap sized to extend downwardly from the first portion of the strap on the front side of the user and on the rear side of the user toward the hip of the user and define a bottom loop portion, the loop being suspended from the shoulder of the user with the bottom loop portion free to move relative to the hip of the user when the first portion of the strap is positioned over the shoulder of the user; and a coupler having a first coupler portion and a second coupler portion, the first coupler portion sized and shaped to engage with the stand socket of the camera, and the second coupler portion sized and shaped to slidably engage with the second portion of the strap and slide along a length of the second portion of the strap, the first coupler portion having a first attachment portion and a second attachment portion, the first attachment portion of the first coupler portion is a rigid member sized and shaped to releasably and rigidly engage with the stand socket of the camera such that when attached to the camera the rigid member of the first attachment portion of the first coupler portion is held stationary relative to the camera as the camera is moved between a raised picture taking position and a lowered transport position, and the second attachment portion of the first coupler portion is a rigid member, and the second coupler portion having a first attachment portion and a second attachment portion, the first attachment portion of the second coupler portion is a rigid member slidably engaging the second portion of the strap, and the second attachment portion of the second coupler portion is a rigid member connected to the rigid member of the second attachment portion of the first coupler portion, the rigid member of the second attachment portion of the second coupler portion is freely rotatable relative to the rigid member of the second attachment portion of the first coupler portion, the rigid member of the first attachment portion of the first coupler portion is positionable in the stand socket of the camera in alignment with the first axis, and the rigid member of the first attachment portion of the second coupler portion and the rigid member of the second attachment portion of the second coupler portion are rotatably connected together for relative rotation therebetween limited to rotation about a second axis transverse to the first axis, the second portion of the strap on the front side of the user being a sufficiently long unblocked strap portion to allow the user to freely move the first attachment portion of the second coupler portion along the second portion of the strap on the front side of the user as the camera is moved between the raised picture taking position reachable when the first attachment portion of the second coupler portion is moved upward away from the bottom loop portion and the lowered transport position reachable when the first attachment portion of the second coupler portion is moved downward to the bottom loop portion and whereat the camera is fully supported by the strap and free to move relative to the hip of the user when the first portion of the strap is positioned over the shoulder of the user.

40. For a camera having at least one engagement portion and carried by a user, the engagement portion being a stand socket, a system for coupling with the stand socket of the camera, the system comprising:

an elongated strap having first and second portions together forming a loop sized to extend around a human torso of the user, the first portion of the strap sized to be positioned over a shoulder of the user and extend downward therefrom toward a hip of the user on a front side of the user and on the rear side of the user, the second portion of the strap sized to extend downwardly from the first portion of the strap on the front side of the user and on the rear side of the user toward the hip of the user and define a bottom loop portion, the loop being suspended from the shoulder of the user with the bottom loop portion free to move relative to the hip of the user when the first portion of the strap is positioned over the shoulder of the user; and a coupler having a first coupler portion and a second coupler portion, the first coupler portion sized and shaped to engage with the stand socket of the camera, and the second coupler portion sized and shaped to slidably engage with the second portion of the strap and slide along a length of the second portion of the strap, the first coupler portion having a first attachment portion and a second attachment portion, the first attachment portion of the first coupler portion is a rigid member sized and shaped to releasably and rigidly engage with the stand socket of the camera such that when attached to the camera the rigid member of the first attachment portion of the first coupler portion is held stationary relative to the camera as the camera is moved between a raised picture taking position and a lowered transport position, and the second attachment portion of the first coupler portion is a rigid member, and the second coupler portion having a first attachment portion and a second attachment portion, the first attachment portion of the second coupler portion is a rigid member slidably engaging the second portion of the strap, and the second attachment portion of the second coupler portion is a rigid member connected to the rigid member of the second attachment portion of the first coupler portion, the rigid member of the second attachment portion of the first coupler portion is one of a rigid hook and a rigid engagement loop, and the rigid member of the second attachment portion of the second coupler portion is the other of the rigid hook and the rigid engagement loop, the rigid hook being shaped to removably hook onto the rigid engagement loop, the second portion of the strap on the front side of the user being a sufficiently long unblocked strap portion to allow the user to freely move the first attachment portion of the second coupler portion along the second portion of the strap on the front side of the user as the camera is moved between the raised picture taking position reachable when the first attachment portion of the second coupler portion is moved upward away from the bottom loop portion and the lowered transport position reachable when the first attachment portion of the second coupler portion is moved downward to the bottom loop portion and whereat the camera is fully supported by the strap and free to move relative to the hip of the user when the first portion of the strap is positioned over the shoulder of the user.

41. The system of claim 40, wherein the rigid member of the first attachment portion of the second coupler portion is rotatably coupled to the rigid member of the second attachment portion of the second coupler portion.

42. The system of claim 41 for use where the stand socket of the camera has a first axis, wherein the rigid member of the first attachment portion of the first coupler portion is positionable in the stand socket of the camera in alignment with the first axis, and the rigid member of the second attachment portion of the first coupler portion and the rigid member of the first attachment portion of the first coupler portion are rotatably connected together for relative rotation therebetween limited to rotation about a second axis transverse to the first axis.

43. The system of claim 40 for use where the stand socket of the camera has a first axis, wherein the rigid member of the first attachment portion of the first coupler portion is positionable in the stand socket of the camera in alignment with the first axis, and the rigid member of the second attachment portion of the first coupler portion and the rigid member of the first attachment portion of the first coupler portion are rotatably connected together for relative rotation therebetween limited to rotation about a second axis transverse to the first axis.

44. For a camera having at least one engagement portion and carried by a user, the engagement portion being a stand socket, a system for coupling with the stand socket of the camera for use where the stand socket of the camera has a first axis, the system comprising:

an elongated strap having first and second portions together forming a loop sized to extend around a human torso of the user, the first portion of the strap sized to be positioned over a shoulder of the user and extend downward therefrom toward a hip of the user on a front side of the user and on the rear side of the user, the second portion of the strap sized to extend downwardly from the first portion of the strap on the front side of the user and on the rear side of the user toward the hip of the user and define a bottom loop portion, the loop being suspended from the shoulder of the user with the bottom loop portion free to move relative to the hip of the user when the first portion of the strap is positioned over the shoulder of the user; and a coupler having a first coupler portion and a second coupler portion, the first coupler portion sized and shaped to engage with the stand socket of the camera, and the second coupler portion sized and shaped to slidably engage with the second portion of the strap and slide along a length of the second portion of the strap, the first coupler portion having a first attachment portion and a second attachment portion, the first attachment portion of the first coupler portion is a rigid member sized and shaped to releasably and rigidly engage with the stand socket of the camera such that when attached to the camera the rigid member of the first attachment portion of the first coupler portion is held stationary relative to the camera as the camera is moved between a raised picture taking position and a lowered transport position, and the second attachment portion of the first coupler portion is a rigid member, and the second coupler portion having a first attachment portion and a second attachment portion, the first attachment portion of the second coupler portion is a rigid member slidably engaging the second portion of the strap, and the second attachment portion of the second coupler portion is a rigid member connected to the rigid member of the second attachment portion of the first coupler portion, the rigid member of the first attachment portion of the first coupler portion is positionable in the stand socket of the camera in alignment with the first axis, and the rigid member of the second attachment portion of the second coupler portion and the rigid member of the second attachment portion of the first coupler portion are rotatably connected together for relative rotation therebetween limited to rotation about the first axis, the rigid member of the second attachment portion of the second coupler portion and the rigid member of the first attachment portion of the second coupler portion are rotatably connected together for relative rotation therebetween limited to rotation about a second axis transverse to the first axis, the second portion of the strap on the front side of the user being a sufficiently long unblocked strap portion to allow the user to freely move the first attachment portion of the second coupler portion along the second portion of the strap on the front side of the user as the camera is moved between the raised picture taking position reachable when the first attachment portion of the second coupler portion is moved upward away from the bottom loop portion and the lowered transport position reachable when the first attachment portion of the second coupler portion is moved downward to the bottom loop portion and whereat the camera is fully supported by the strap and free to move relative to the hip of the user when the first portion of the strap is positioned over the shoulder of the user.

45. For a camera having at least one engagement portion and carried by a user, the engagement portion being a stand socket, a system for coupling with the stand socket of the camera, the system comprising:

an elongated strap having first and second portions together forming a loop sized to extend around a human torso of the user, the first portion of the strap sized to be positioned over a shoulder of the user and extend downward therefrom toward a hip of the user on a front side of the user and on the rear side of the user, the second portion of the strap sized to extend downwardly from the first portion of the strap on the front side of the user and on the rear side of the user toward the hip of the user and define a bottom loop portion, the loop being suspended from the shoulder of the user with the bottom loop portion free to move relative to the hip of the user when the first portion of the strap is positioned over the shoulder of the user; and a coupler having a first coupler portion and a second coupler portion, the first coupler portion sized and shaped to engage with the stand socket of the camera, and the second coupler portion sized and shaped to slidably engage with the second portion of the strap and slide along a length of the second portion of the strap, the first coupler portion having a first attachment portion and a second attachment portion, the first attachment portion of the first coupler portion is a rigid member sized and shaped to releasably and rigidly engage with the stand socket of the camera such that when attached to the camera the rigid member of the first attachment portion of the first coupler portion is held stationary relative to the camera as the camera is moved between a raised picture taking position and a lowered transport position, and the second attachment portion of the first coupler portion is a rigid member, and the second coupler portion having a first attachment portion and a second attachment portion, the first attachment portion of the second coupler portion is a rigid member slidably engaging the second portion of the strap, and the second attachment portion of the second coupler portion is a rigid member connected to the rigid member of the second attachment portion of the first coupler portion, the rigid member of the first attachment portion of the second coupler portion and the rigid member of the second attachment portion of the second coupler portion are flexibly connected together by an other strap, the second portion of the strap on the front side of the user being a sufficiently long unblocked strap portion to allow the user to freely move the first attachment portion of the second coupler portion along the second portion of the strap on the front side of the user as the camera is moved between the raised picture taking position reachable when the first attachment portion of the second coupler portion is moved upward away from the bottom loop portion and the lowered transport position reachable when the first attachment portion of the second coupler portion is moved downward to the bottom loop portion and whereat the camera is fully supported by the strap and free to move relative to the hip of the user when the first portion of the strap is positioned over the shoulder of the user.

46. A camera system comprising:

a camera having at least one threaded engagement portion, wherein the camera has a bottom and the engagement portion is located in the camera bottom and configured to threadably receive a threaded engagement portion of a camera stand;

an elongated strap having first and second portions, the first portion of the strap sized to be positioned over a shoulder of the user and extend downward therefrom toward a hip of the user on a front side of the user, the second portion of the strap sized to extend downwardly from the first portion of the strap on the front side of the user toward the hip of the user to a lowest position at the hip of the user, the strap being suspended from the shoulder of the user with the second portion of the strap at its lowest position free to move relative to the hip of the user when the first portion of the strap is positioned over the shoulder of the user; and a coupler having a first coupler portion and a second coupler portion, the first coupler portion sized and shaped to threadably engage with the threaded engagement portion of the camera, and the second coupler portion sized and shaped to slidably engage with the second portion of the strap and slide along a length of the second portion of the strap, the first coupler portion having a first rigid attachment portion and a second rigid attachment portion, the first rigid attachment portion of the first coupler portion is sized and shaped to releasably and threadably engage with the threaded engagement portion of the camera such that when attached to the camera the first rigid attachment portion of the first coupler portion is held stationary relative to the camera as the camera is moved between a raised picture taking position and a lowered transport position, and the second coupler portion having a first rigid attachment portion and a second rigid attachment portion, the first rigid attachment portion of the second coupler portion slidably engages the second portion of the strap, the second rigid attachment portion of the second coupler portion extends between the first rigid attachment portion of the second coupler portion and the second rigid attachment portion of the first coupler portion, and the second rigid attachment portion of the first coupler portion extends between the first rigid attachment portion of the first coupler portion and the second rigid attachment portion of the second coupler portion, the second rigid attachment portion of the second coupler being connectable to the second rigid attachment portion of the first coupler portion, the second rigid attachment portion of the first coupler portion is one of a rigid hook and a rigid engagement loop, and the second rigid attachment portion of the second coupler portion is the other of the rigid hook and the rigid engagement loop, the rigid hook being shaped to removably hook onto the rigid engagement loop, the second portion of the strap on the front side of the user being a sufficiently long unblocked strap portion to allow the user to freely move the first attachment portion of the second coupler portion along the second portion of the strap on the front side of the user as the camera is moved between the raised picture taking position reachable when the first rigid attachment portion of the second coupler portion is moved upward away from the lowest position of the second portion of the strap and the lowered transport position reachable when the first rigid attachment portion of the second coupler portion is moved downward to the lowest position of the second portion of the strap and whereat the camera is fully supported by the strap and free to move relative to the hip of the user when the first portion of the strap is positioned over the shoulder of the user.

47. The system of claim 46, wherein the first rigid attachment portion of the second coupler portion is rotatably coupled to the second rigid attachment portion of the second coupler portion.

48. The system of claim 47 for use where the threaded engagement portion of the camera has a first axis, wherein the first rigid attachment portion of the first coupler portion is threadably positionable in the threaded engagement portion of the camera in alignment with the first axis, and the first rigid attachment portion of the first coupler portion and the second rigid attachment portion of the first coupler portion are rotatably connected together for relative rotation therebetween limited to rotation about a second axis transverse to the first axis.

49. The system of claim 46 for use where the threaded engagement portion of the camera has a first axis, wherein the first rigid attachment portion of the first coupler portion is threadably positionable in the threaded engagement portion of the camera in alignment with the first axis, and the first rigid attachment portion of the first coupler portion and the second rigid attachment portion of the first coupler portion are rotatably connected together for relative rotation therebetween limited to rotation about a second axis transverse to the first axis.

50. A camera system for use where the threaded engagement portion of the camera has a first axis, comprising:
    a camera having at least one threaded engagement portion, wherein the camera has a bottom and the engagement portion is located in the camera bottom and configured to threadably receive a threaded engagement portion of a camera stand;
    an elongated strap having first and second portions, the first portion of the strap sized to be positioned over a shoulder of the user and extend downward therefrom toward a hip of the user on a front side of the user, the second portion of the strap sized to extend downwardly from the first portion of the strap on the front side of the user toward the hip of the user to a lowest position at the hip of the user, the strap being suspended from the shoulder of the user with the second portion of the strap at its lowest position free to move relative to the hip of the user when the first portion of the strap is positioned over the shoulder of the user; and
    a coupler having a first coupler portion and a second coupler portion, the first coupler portion sized and shaped to threadably engage with the threaded engagement portion of the camera, and the second coupler portion sized and shaped to slidably engage with the second portion of the strap and slide along a length of the second portion of the strap, the first coupler portion having a first rigid attachment portion and a second rigid attachment portion, the first rigid attachment portion of the first coupler portion is sized and shaped to releasably and threadably engage with the threaded engagement portion of the camera such that when attached to the camera the first rigid attachment portion of the first coupler portion is held stationary relative to the camera as the camera is moved between a raised picture taking position and a lowered transport position, and the second coupler portion having a first rigid attachment portion and a second rigid attachment portion, the first rigid attachment portion of the second coupler portion slidably engages the second portion of the strap, the second rigid attachment portion of the second coupler portion extends between the first rigid attachment portion of the second coupler portion and the second rigid attachment portion of the first coupler portion, and the second rigid attachment portion of the first coupler portion extends between the first rigid attachment portion of the first coupler portion and the second rigid attachment portion of the second coupler portion, the second rigid attachment portion of the second coupler being connectable to the second rigid attachment portion of the first coupler portion, the first rigid attachment portion of the first coupler portion is threadably positionable in the threaded engagement portion of the camera in alignment with the first axis, and the second rigid attachment portion of the first coupler portion and the second rigid attachment portion of the second coupler portion are rotatably connected together for relative rotation therebetween limited to rotation about the first axis, the second rigid attachment portion of the second coupler portion and the first rigid attachment portion of the second coupler portion are rotatably connected together for relative rotation therebetween limited to rotation about a second axis transverse to the first axis, the second portion of the strap on the front side of the user being a sufficiently long unblocked strap portion to allow the user to freely move the first attachment portion of the second coupler portion along the second portion of the strap on the front side of the user as the camera is moved between the raised picture taking position reachable when the first rigid attachment portion of the second coupler portion is moved upward away from the lowest position of the second portion of the strap and the lowered transport position reachable when the first rigid attachment portion of the second coupler portion is moved downward to the lowest position of the second portion of the strap and whereat the camera is fully supported by the strap and free to move relative to the hip of the user when the first portion of the strap is positioned over the shoulder of the user.

51. For a camera having at least one engagement portion and carried by a user, the engagement portion being a stand socket, a system for coupling with the stand socket of the camera, the system comprising:

an elongated strap having first and second portions, the first portion of the strap sized to be positioned over a shoulder of the user and extend downward therefrom toward a hip of the user on a front side of the user, the second portion of the strap sized to extend downwardly from the first portion of the strap on the front side of the user toward the hip of the user; and a coupler having a first coupler portion and a second coupler portion, the first coupler portion sized and shaped to engage with the stand socket of the camera, and the second coupler portion sized and shaped to slidably engage with the second portion of the strap and slide along a length of the second portion of the strap, the first coupler portion having a first attachment portion and a second attachment portion, the first attachment portion of the first coupler portion is a rigid member sized and shaped to releasably and rigidly engage directly with the stand socket of the camera such that when attached to the camera the rigid member of the first attachment portion of the first coupler portion is held stationary relative to the camera as the camera is moved between a raised picture taking position and a lowered transport position, and the second attachment portion of the first coupler portion is a rigid member, the rigid member of the first attachment portion of the first coupler portion and the rigid member of the second attachment portion of the first coupler portion are in direct contact with each other, the second coupler portion having a first attachment portion and a second attachment portion, the first attachment portion of the second coupler portion slidably engages the second portion of the strap and is a rigid member, and the second attachment portion of the second coupler portion is a rigid member, the rigid member of the first attachment portion of the second coupler portion and the rigid member of the second attachment portion of the second coupler portion are in direct contact with each other, the rigid member of the second attachment portion of the first coupler portion and the rigid member of the second attachment portion of the second coupler portion are removably connected together and when connected together in direct contact with each other, the rigid member of the second attachment portion of the first coupler portion is one of a rigid hook and a rigid engagement loop, and the rigid member of the second attachment portion of the second coupler portion is the other of the rigid hook and the rigid engagement loop, the rigid hook being shaped to removably hook onto the rigid engagement loop.

52. The system of claim 51 for use where the stand socket of the camera has an axis, wherein the rigid member of the first attachment portion of the first coupler portion is positionable in the stand socket of the camera in alignment with the axis, and the rigid member of the second attachment portion of the first coupler portion and the rigid member of the first attachment portion of the first coupler portion are rotatably connected together for relative rotation therebetween limited to rotation about an other axis transverse to the axis.

53. The system of claim 51, wherein the rigid member of the first attachment portion of the second coupler portion and the rigid member of the second attachment portion of the second coupler portion are rotatably coupled together.

54. For a camera having at least one engagement portion and carried by a user, the engagement portion being a stand socket, a system for coupling with the stand socket of the camera, for use where the stand socket of the camera has an axis, the system comprising:

an elongated strap having first and second portions, the first portion of the strap sized to be positioned over a shoulder of the user and extend downward therefrom toward a hip of the user on a front side of the user, the second portion of the strap sized to extend downwardly from the first portion of the strap on the front side of the user toward the hip of the user; and a coupler having a first coupler portion and a second coupler portion, the first coupler portion sized and shaped to engage with the stand socket of the camera, and the second coupler portion sized and shaped to slidably engage with the second portion of the strap and slide along a length of the second portion of the strap, the first coupler portion having a first attachment portion and a second attachment portion, the first attachment portion of the first coupler portion is a rigid member sized and shaped to releasably and rigidly engage directly with the stand socket of the camera such that when attached to the camera the rigid member of the first attachment portion of the first coupler portion is held stationary relative to the camera as the camera is moved between a raised picture taking position and a lowered transport position, and the second attachment portion of the first coupler portion is a rigid member, the rigid member of the first attachment portion of the first coupler portion and the rigid member of the second attachment portion of the first coupler portion are in direct contact with each other, the second coupler portion having a first attachment portion and a second attachment portion, the first attachment portion of the second coupler portion slidably engages the second portion of the strap and is a rigid member, and the second attachment portion of the second coupler portion is a rigid member, the rigid member of the first attachment portion of the second coupler portion and the rigid member of the second attachment portion of the second coupler portion are in direct contact with each other, the rigid member of the second attachment portion of the first coupler portion and the rigid member of the second attachment portion of the second coupler portion are removably and rotatably connected together and when connected together are in direct contact with each other, the rigid member of the first attachment portion of the first coupler portion being positionable in the stand socket of the camera in alignment with the axis, and the rigid member of the second attachment portion of the first coupler portion and the rigid member of the second attachment portion of the second coupler portion are rotatably connected together for relative rotation therebetween limited to rotation about the axis, the rigid member of the first attachment portion of the second coupler portion and the rigid member of the second attachment portion of the second coupler portion are rotatably connected together for relative rotation therebetween limited to rotation about an other axis transverse to the axis.

55. For a camera having at least one engagement portion and carried by a user, a system for coupling with the engagement portion of the camera, for use where the engagement portion of the camera has an attachment axis, the system comprising:

an elongated strap having first and second portions, the first portion of the strap sized to be positioned over a shoulder of the user and extend downward therefrom toward a hip of the user on a front side of the user, the second portion of the strap sized to extend downwardly from the first portion of the strap on the front side of the user toward the hip of the user; and a coupler having a first coupler portion and a second coupler portion, the first coupler portion sized and shaped to engage with the engagement portion of the camera, and the second coupler portion sized and shaped to slidably engage with the second portion of the strap and slide along a length of the second portion of the strap, the first coupler portion having a first rigid attachment portion and a second rigid attachment portion, the first rigid attachment portion of the first coupler portion is sized and shaped to releasably engage directly with the engagement portion of the camera, and the first rigid attachment portion of the first coupler portion and the second rigid attachment portion of the first coupler portion are in direct contact with each other, the second coupler portion having a first rigid attachment portion and a second rigid attachment portion, the first rigid attachment portion of the second coupler portion slidably engages the second portion of the strap, the first rigid attachment portion of the second coupler portion and the second rigid attachment portion of the second coupler portion are in direct contact with each other, the second rigid attachment portion of the second coupler portion extends between the first rigid attachment portion of the second coupler portion and the second rigid attachment portion of the first coupler portion, and the second rigid attachment portion of the first coupler portion extends between the first rigid attachment portion of the first coupler portion and the second rigid attachment portion of the second coupler portion, the second rigid attachment portion of the first coupler portion and the second rigid attachment portion of the second coupler portion are removably connected together and when connected together are in direct contact with each other, the second rigid attachment portion of the first coupler portion and the second rigid attachment portion of the second coupler portion are rotatably connected together, the first rigid attachment portion of the first coupler portion when engaged with the engagement portion of the camera is in alignment with the axis, and the second rigid attachment portion of the first coupler portion and the second rigid attachment portion of the second coupler portion are rotatably connected together for relative rotation therebetween limited to rotation about the axis, the second rigid attachment portion of the first coupler portion and the first attachment rigid portion of the first coupler portion are rotatably connected together for relative rotation therebetween limited to rotation about an other axis transverse to the axis.

56. For a camera having at least one engagement portion and carried by a user, the engagement portion, a system for coupling with the engagement portion of the camera, the system comprising:

an elongated strap having first and second portions, the first portion of the strap sized to be positioned over a shoulder of the user and extend downward therefrom toward a hip of the user on a front side of the user, the second portion of the strap sized to extend downwardly from the first portion of the strap on the front side of the user toward the hip of the user; and a coupler having a first coupler portion and a second coupler portion, the first coupler portion sized and shaped to engage with the engagement portion of the camera, and the second coupler portion sized and shaped to slidably engage with the second portion of the strap and slide along a length of the second portion of the strap, the first coupler portion having a first rigid attachment portion and a second rigid attachment portion, the first rigid attachment portion of the first coupler portion is sized and shaped to releasably engage directly with the engagement portion of the camera, and the first rigid attachment portion of the first coupler portion and the second rigid attachment portion of the first coupler portion are in direct contact with each other, the second coupler portion having a first rigid attachment portion and a second rigid attachment portion, the first rigid attachment portion of the second coupler portion slidably engages the second portion of the strap, the first rigid attachment portion of the second coupler portion and the second rigid attachment portion of the second coupler portion are in direct contact with each other, the second rigid attachment portion of the second coupler portion extends between the first rigid attachment portion of the second coupler portion and the second rigid attachment portion of the first coupler portion, and the second rigid attachment portion of the first coupler portion extends between the first rigid attachment portion of the first coupler portion and the second rigid attachment portion of the second coupler portion, the second rigid attachment portion of the first coupler portion and the second rigid attachment portion of the second coupler portion are removably connected together and when connected together are in direct contact with each other, the second rigid attachment portion of the first coupler portion is one of a rigid hook and a rigid engagement loop, and the second rigid attachment portion of the second coupler portion is the other of the rigid hook and the rigid engagement loop, the rigid hook being sized and shaped to removably hook onto the rigid engagement loop.

* * * * *